United States Patent
Skupin et al.

(10) Patent No.: US 10,623,753 B2
(45) Date of Patent: Apr. 14, 2020

(54) COMPOSITE SCALABLE VIDEO STREAMING

(71) Applicant: Fraunhofer-Gesellschaft zur Foerderung der angewandten Forschung e.V., Munich (DE)

(72) Inventors: Robert Skupin, Berlin (DE); Yago Sánchez De La Fuente, Berlin (DE); Thomas Schierl, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 15/809,570

(22) Filed: Nov. 10, 2017

(65) Prior Publication Data
US 2018/0098077 A1   Apr. 5, 2018

Related U.S. Application Data

(63) Continuation of application No. PCT/EP2016/060243, filed on May 6, 2016.

(30) Foreign Application Priority Data

May 12, 2015  (WO) ................. PCT/EP2015/060480

(51) Int. Cl.
*H04N 7/14*   (2006.01)
*H04N 19/187*   (2014.01)
(Continued)

(52) U.S. Cl.
CPC ....... *H04N 19/187* (2014.11); *H04N 5/23238* (2013.01); *H04N 5/265* (2013.01);
(Continued)

(58) Field of Classification Search
CPC .. H04N 19/105; H04N 19/139; H04N 19/152; H04N 19/187; H04N 19/196;
(Continued)

(56) References Cited

U.S. PATENT DOCUMENTS

| | | | | |
|---|---|---|---|---|
| 8,436,889 B2 * | 5/2013 | Eleftheriadis | .......... | H04N 7/152 348/14.09 |
| 9,077,964 B2 * | 7/2015 | Cipolli | ................. | H04L 1/1607 |

(Continued)

FOREIGN PATENT DOCUMENTS

| WO | 2007076486 A2 | 7/2007 |
|---|---|---|
| WO | 2016026526 A2 | 2/2016 |

OTHER PUBLICATIONS

Bivolarski, Lazar et al., "VP8 encoder technical overview", 104. MPEG Meeting; Apr. 22, 2013-Apr. 26, 2013; Incheon; (Motion Picture Expert Group or ISO/IEC JTC1/SC29/WG11),, (Apr. 22, 2013), No. m29158, XP030057689 [A] 11,41 * paragraph [2.1.2] *, Apr. 22, 2013.

(Continued)

*Primary Examiner* — Khai N. Nguyen
(74) *Attorney, Agent, or Firm* — Perkins Coie LLP; Michael A. Glenn

(57) ABSTRACT

Video streaming concepts are presented. In a first aspect, the video stream is formed as a multi-layered data stream with forming a set of one or more layers of the multi-layered data stream by copying from the coded version of the video content, while a composition of the at least one video is synthesized in at least a portion of pictures of a predetermined layer of the multi-layer data stream by means of inter-layer prediction. In a second aspect, inter-layer prediction is used to either substitute otherwise missing referenced pictures of a newly encompassed video by inserting replacement pictures, or portions of the newly encompassed video referencing, by motion-compensated prediction, pictures (Continued)

which are missing are replaced by inter-layer prediction. In a third aspect, output pictures inserted into the composed video stream so as to synthesize the composition of the video content by copying from a no-output portion of the composed data stream by temporal prediction, are inserted into the composed data stream so that output pictures are arranged in the data stream in the presentation time order rather than the coded picture order.

10 Claims, 24 Drawing Sheets

(51) Int. Cl.
| | | |
|---|---|---|
| H04N 7/15 | (2006.01) | |
| H04N 19/30 | (2014.01) | |
| H04N 19/105 | (2014.01) | |
| H04N 21/2343 | (2011.01) | |
| H04N 19/597 | (2014.01) | |
| H04N 19/503 | (2014.01) | |
| H04N 19/139 | (2014.01) | |
| H04N 19/152 | (2014.01) | |
| H04N 19/196 | (2014.01) | |
| H04N 19/577 | (2014.01) | |
| H04N 5/232 | (2006.01) | |
| H04N 5/265 | (2006.01) | |
| H04N 21/234 | (2011.01) | |
| H04N 21/236 | (2011.01) | |
| H04N 21/2365 | (2011.01) | |
| H04N 19/51 | (2014.01) | |

(52) U.S. Cl.
CPC ............... *H04N 7/15* (2013.01); *H04N 7/152* (2013.01); *H04N 19/105* (2014.11); *H04N 19/139* (2014.11); *H04N 19/152* (2014.11); *H04N 19/196* (2014.11); *H04N 19/30* (2014.11); *H04N 19/503* (2014.11); *H04N 19/577* (2014.11); *H04N 19/597* (2014.11); *H04N 21/2365* (2013.01); *H04N 21/23424* (2013.01); *H04N 21/23605* (2013.01); *H04N 21/234327* (2013.01); *H04N 19/51* (2014.11)

(58) Field of Classification Search
CPC ...... H04N 19/30; H04N 19/503; H04N 19/51; H04N 19/577; H04N 19/597; H04N 21/23424; H04N 21/234327; H04N 21/23605; H04N 21/2365; H04N 5/23238; H04N 5/265; H04N 7/15; H04N 7/152
USPC ......... 348/14.01, 14.02, 14.03, 14.04, 14.05, 348/14.06, 14.07, 14.08, 14.09, 14.1, 348/14.11, 14.12, 14.13, 14.14, 15.15, 348/14.16; 382/275; 379/265.03; 455/414.1, 566; 704/270
See application file for complete search history.

(56) References Cited

U.S. PATENT DOCUMENTS

| | | | | |
|---|---|---|---|---|
| 9,154,785 | B2* | 10/2015 | Wang | H04N 19/70 |
| 9,319,703 | B2* | 4/2016 | Wang | H04N 19/70 |
| 9,380,317 | B2* | 6/2016 | Wang | H04N 19/70 |
| 9,838,702 | B2* | 12/2017 | Lee | H04N 19/184 |
| 10,057,588 | B2* | 8/2018 | Lee | H04N 19/30 |
| 10,104,386 | B2* | 10/2018 | Suehring | H04N 19/70 |
| 2002/0021761 | A1* | 2/2002 | Zhang | H04N 19/89 |
| | | | | 375/240.27 |
| 2005/0157164 | A1* | 7/2005 | Eshkoli | H04N 7/147 |
| | | | | 348/14.07 |
| 2007/0200923 | A1* | 8/2007 | Eleftheriadis | H04N 7/152 |
| | | | | 348/14.08 |
| 2007/0206673 | A1* | 9/2007 | Cipolli | H04L 1/1607 |
| | | | | 375/240.1 |
| 2008/0211901 | A1* | 9/2008 | Civanlar | H04N 7/152 |
| | | | | 348/14.09 |
| 2014/0098894 | A1* | 4/2014 | Wang | H04N 19/70 |
| | | | | 375/240.26 |
| 2014/0098895 | A1* | 4/2014 | Wang | H04N 19/70 |
| | | | | 375/240.26 |
| 2014/0098896 | A1* | 4/2014 | Wang | H04N 19/70 |
| | | | | 375/240.26 |
| 2014/0219346 | A1* | 8/2014 | Ugur | H04N 19/105 |
| | | | | 375/240.12 |
| 2014/0247878 | A1* | 9/2014 | Xu | H04N 19/52 |
| | | | | 375/240.16 |
| 2014/0369415 | A1* | 12/2014 | Naing | H04N 19/159 |
| | | | | 375/240.16 |
| 2015/0304667 | A1* | 10/2015 | Suehring | H04N 19/70 |
| | | | | 375/240.02 |
| 2016/0119632 | A1* | 4/2016 | Lee | H04N 19/184 |
| | | | | 375/240.12 |
| 2016/0286241 | A1* | 9/2016 | Ridge | H04N 19/186 |
| 2017/0134747 | A1* | 5/2017 | Lee | H04N 19/105 |
| 2017/0142428 | A1* | 5/2017 | Lee | H04N 19/105 |
| 2018/0098077 | A1* | 4/2018 | Skupin | H04N 7/15 |
| 2019/0020883 | A1* | 1/2019 | Suehring | H04N 19/70 |

OTHER PUBLICATIONS

Cheung, G. et al., "Interactive Streaming of Stored Multiview Video Using Redundant Frame Structures", IEEE Transactions on Image Processing, IEEE Service Center, Piscataway, NJ, US, (Mar. 1, 2011), vol. 20, No. 3, doi:10.1109/TIP.2010.2070074, ISSN 1057-7149, XP011374171 [A] 10-32,40-47,54,56 * the whole document *, Mar. 1, 2011, pp. 744-761.

Cheung, Gene et al., "On media data structures for interactive streaming in immersive applications", Visual Communications and Image Processing; Jul. 11, 2010-Jul. 14, 2010; Huang Shan, An Hui, China,, (Jul. 11, 2010), XP030082173 [A] 10-32,40-47,54,56 *the whole document*, Jul. 11, 2010.

Fujibayashi, A. et al., "Random access support for HEVC", JCTVC-D234, 4th JCT-VC Meeting, Daegu, (Jan. 2011, Jan. 2011.

Grunheit, C. et al., "Efficient representation and interactive streaming of high-resolution panoramic views", Proceedings. 2002 International Conference on Image Processing, (2002), vol. 3, 2002.

Hannuksela, Miska M. , "MV-HEVC/SHVC HLS: On slice temporal mvp enabled flag", 17. JCT-VC MTG; Mar. 27, 2014-Apr. 4, 2014; Valencia; (JT Collaborative Team on Video Coding of ISO/IEC JTC1/SC29/WG11 and ITU-T SG.16 ); URL:http://wftp3.itu.int/av-arch/jctvc-site/,, (Mar. 30, 2014), No. JCTVC-Q0189-v2, XP030116141 [I] 49-52 * the whole document *, Mar. 30, 2014.

Hendry, et al., "MV-HEVC/SHVC HLS: On indication of the use of temporal motion vector prediction", 18. JCT-VC MTG; Jun. 30, 2014-Jul. 9, 2014; Sapporo; (Joint Collaborative Team on Video Coding of ISO/IEC JTC1/SC29/WG11 and ITU-T SG.16 ); URL:http://wftp3.itu.int/av-arch/jctvc-site/,, (Jun. 21, 2014), No. JCTVC-R0226, XP030116526 [A] 49-52 * the whole document *, Jun. 21, 2014.

Kimoto, T. et al., "CE3: Unrestricted temporal decomposition", 18. JVT Meeting; 75. MPEG Meeting; Jan. 14, 2006-Jan. 20, 2006; Bangkok,TH; (Joint Video Team of ISO/IEC JTC1/SC29/WG11 and ITU-T SG.16 ),, (Jan. 10, 2006), No. JVT-R036, ISSN 0000-0410, XP030006303 [I] 33-38,48,55 * the whole document *, Jan. 10, 2006.

Said, Hany et al., "An adaptive reference frame re-ordering algorithm for H.264/AVC based multi-view video codec", 21st European Signal Processing Conference (EUSIPCO 2013), EURASIP, (Sep. 9, 2013), pp. 1-5, XP032593528 [A] 32 * the whole document*, Sep. 9, 2013, pp. 1-5.

(56) References Cited

OTHER PUBLICATIONS

Sanchez, Y. et al., "Low complexity cloud-video-mixing using HEVC", Consumer Communications and Networking Conference (CCNC), 2014 IEEE 11th. IEEE,, (2014), 2014.
Skupin, R. et al., "Compressed Domain Video Compositing with HEVC", Picture Coding Symposium (PCS), 2015 IEEE 31th. IEEE,, (2015), 2015.
Smolic, A. et al., "Applications and Requirements for 3DAV", 65. MPEG Meeting;Jul. 21, 2003-Jul. 25, 2003; Trondheim; Motion Picture Expert Group or ISO/IEC JTC1/SC29/WG11),, (Jul. 26, 2003), No. N5877, ISSN 0000-0357, XP030012958 [A] 10-32,40-47,54,56 * the whole document *, Jul. 26, 2003.
Sullivan, Gary J. et al., "Overview of the high efficiency video coding (HEVC) standard", Circuits and Systems for Video Technology, IEEE Transactions, (2012), vol. 22. 12, 2012, pp. 1649-1668.

* cited by examiner

COMPOSITE SCALABLE VIDEO STREAMING

CROSS-REFERENCE TO RELATED APPLICATIONS

This application is a continuation of copending International Application No. PCT/EP2016/060243, filed May 6, 2016, which is incorporated herein by reference in its entirety, and additionally claims priority from International Application No. PCT/EP2015/060480, filed May 12, 2015, which is also incorporated herein by reference in its entirety.

BACKGROUND OF THE INVENTION

The present application is concerned with a video streaming concept suitable for composing a video stream out of a coded version of a video content.

There are a number of applications and use cases where a composited form of multiple videos is simultaneously transmitted to and displayed to a user. While a first approach is to send all videos independently encoded so that multiple decoders are simultaneously used and the composited video is displayed by arranging all the videos once decoded, a problem is that many target devices incorporate only a single hardware video decoder. Examples of such devices are low-cost TV sets and Set-Top-Boxes (STBs) or battery powered mobile devices.

In order to generate a single video bitstream from the multiple videos, a second approach is pixel-domain video processing (e.g. composing such as stitching, merging or mixing), where the different video bitstreams are transcoded into a single bitstream to be transmitted to the target device. Transcoding can be implemented using a cascaded video decoder and encoder, which entails decoding the incoming bitstreams, composing a new video from the input bitstreams in the pixel-domain and encoding the new video into a single bitstream. This approach can also be referred to as traditional full transcode that includes processing in the uncompressed domain. However, full transcoding has a number of drawbacks. First, the repeated encoding of video information is likely to introduce signal quality degradation through additional coding artifacts. Second and more important, a full transcoding is computationally complex through the multiple de- and subsequent encoding of the in- and outgoing video bitstreams. Therefore, a full transcode approach does not scale well.

Using High Efficiency Video Coding (HEVC) [1], a technique is introduced in [2] that allows for achieving video compositing in the compressed domain for single-layer video codecs. However, there are some applications where using a scalable video coding might be advantageous. In [3], a technique is described that allows for video stitching in the compressed domain for a scalable coded video that can be used for applications such as multi-party video conferencing.

Problems incurred in video conferencing applications are described in the following.

In particular, FIG. 23 represents a typical video composition of a multi-party video conference. The pictures of the composed video, one of which is exemplarily shown in FIG. 23, are spatially stitched together. In the scenario of FIG. 23, the speaker is shown in a bigger picture area 900 of the output picture while the non-speakers are shown in smaller areas 902 and 904 of the output picture. FIG. 24 exemplarily shows how the composed video bitstream is obtained by video processing 906 on the basis of coded data streams representing the individual videos shown in the areas 900 to 904. In FIG. 24, data stream 908 shall denote the data stream having encoded thereinto the video shown at area 900, i.e. the video concerning the speaker, while data streams 910 and 912 shown in FIG. 24 have encoded thereinto the videos concerning the non-speakers presented in areas 902 and 904, respectively. In order to illustrate the way the videos are encoded into data streams 908 to 912, FIG. 24 illustrates pictures of these videos, namely pictures thereof belonging to two consecutive times instants $t_0$ and $t_1$ and belonging to two different layers L0 and L1, respectively. The arrows shown in FIG. 24 represent prediction dependencies between the pictures. As can be seen, temporal prediction (horizontal errors) and inter-layer prediction (vertical errors) are used for encoding the videos into data streams 908 to 912. Scalable video coding standards such as H.264/SVC have been used previously in video conferencing systems and have proven to be very valuable, and so are the expectations for SHVC in the area.

In accordance with the technique outlined in [3], the video processing 906 may allow for generating a single scalable bitstream out of the multiple bitstreams 908 to 912 by stitching all input bitstreams 908 to 912 in the compressed domain. The resulting single scalable bitstream is shown in FIG. 24 at 914, also by way of illustrating a fraction consisting of four pictures thereof, namely pictures belonging to different pairs of time instant and layer. The technique applied by video processing 906 in accordance with [3] involves rewriting a couple of fields in the high level syntax, such as slice header and parameter sets, so that each picture in each layer from the different input streams 908 to 912 is combined into a single picture for each layer containing the data from all streams.

Alternatively, if not all input streams 908 and 912 have the same amount of layers, as it is depicted in FIG. 25, where input bitstreams 910 and 912 are illustratively shown as being single-layered, the lower layers of the output bitstream 914, namely layer L0 in the case of FIG. 25, has no correspondent data from the latter data streams 910 and 912. Accordingly, these lower layers, i.e. L0 in FIG. 25, of the output data stream 914, will not be generated with data from all input bitstreams 908 to 912, but some dummy data will be added to the pictures of this layer L0 as needed, as shown by white boxes 916 in FIG. 25.

For the method described in [3], whenever a layout change event occurs, e.g. such as during a speaker change, the sizes of the blocks in the picture change as a result and a significant bitrate peak occurs. More concretely, there is a need to send an Intra Decoding Refresh (IDR) or I-frame to change the picture layout or size. On a layout change event, IDRs are used for the bitstreams that switch roles from speaker to non-speaker and vice versa, which results in a momentary significant bitrate increase. This is illustrated in FIG. 26, which shows the output bitstream 914, here exemplarily a fraction thereof encompassing four consecutive time instants $t_0$ to $t_3$. As shown in FIG. 26, temporal prediction is disabled 918 when such a layout change event occurs, which is time instant $t_2$ in the case of FIG. 26, from which time onwards the speaker changes, i.e. the speaker video in one of the non-speaker videos changes its position or area within the composed video pictures. However, the disablement uses a transmission of relatively more intra data, which is independently coded from other pictures, and increases the data that is transmitted at such points in time which is a burden in many use cases, e.g. real-time communication.

Thus, it is the object of the present invention to provide a concept for video streaming of a video stream composed of a coded version of a video content which is more efficient, such as more efficient in terms of the freedom to change the composition without, or with less, penalties in terms of bitrate consumption.

SUMMARY

An embodiment may have a video streaming apparatus for composing a video stream out of a coded version of video content encompassing one or more videos, the coded version having, for each video, a portion into which the respective video is coded, the video streaming apparatus being configured to form the video stream as a multi-layered data stream by forming a set of one or more layers of the multi-layered data stream by copying from the coded version of the video content; and synthesizing a composition of the at least one video in at least a portion of pictures of a predetermined layer of the multi-layer data stream using inter-layer prediction from at least a portion of the set of one or more layers.

Another embodiment may have a video conferencing system having a video streaming apparatus as mentioned above, wherein each video belongs to a respective participant of the video conference.

According to another embodiment, a video streaming apparatus may have: an input for receiving a coded version of a video content, the coded version of the video content having a first portion having encoded thereinto a collection of videos at a base quality, and a second portion having encoded thereinto the videos at an enhanced quality, and a composer configured to compose a video stream representing a composition of a subset of the videos at the enhanced quality so that the video stream is a multi-layered video stream, wherein the composer is configured to form one or more base layers of the multi-layered video stream by copying from the first portion of the coded version of the video content, and one or more enhancement layers of the multi-layered video stream by copying a fraction of the second portion of the coded version of the video content which relates to the subset of the videos into the one or more enhancement layers, wherein the composer supports a change of the subset at a predetermined time-instant so that the subset newly encompasses a newly encompassed video or the videos not encompassed by the subset before the predetermined time instant, by substituting a reference picture of the newly encompassed video not comprised by the fraction of the second portion of the coded version copied into the one or more enhancement layers referenced, via motion prediction, by a referencing picture of the newly encompassed video comprised by the fraction of the second portion of the coded version copied into the one or more enhancement layers by a replacement picture, by inserting the replacement picture into the multi-layered video stream, redirecting the temporal prediction of the referencing picture so as to reference the replacement picture and fill the replacement picture with an approximation of the reference picture, via inter-layer prediction, on the basis of the base layer; or replacing portions of the newly encompassed video comprised by the fraction of the second portion of the coded version so as to be copied into the one or more enhancement layers which reference, via temporal prediction, a reference picture of the newly encompassed video not comprised by the fraction of the second portion of the coded version copied into the one or more enhancement layers with an approximation of the replaced portions, via inter-layer prediction, from the base layer.

Another embodiment may have a video streaming apparatus for composing a video stream out of a coded version of a video content having, for each of at least one video, a portion into which the respective video is coded using temporal prediction and using a coded picture order which deviates from a presentation time order, the video streaming apparatus being configured to form the video stream by forming a non-output portion of the data stream by copying from the coded version of the content; and synthesizing a composition of the video content by inserting output pictures into the data stream which copy from the non-output portion by temporal prediction, wherein the video streaming apparatus is configured to insert the output pictures in the data stream so that the output pictures are arranged in the data stream in presentation time order.

Another embodiment may have a video stream composed out of a coded version of video content encompassing one or more videos, the coded version having, for each video, a portion into which the respective video is coded, the video streaming being a multi-layered data stream having a set of one or more layers formed by copying from the coded version of the video content; and a predetermined layer having portion into which a composition of the at least one video is synthesized using inter-layer prediction from at least a portion of the set of one or more layers.

Still another embodiment may have a video stream having been composed out of a coded version of a video content having a first portion having encoded thereinto a collection of videos at a base quality, and a second portion having encoded thereinto the videos at an enhanced quality, the video stream being is a multi-layered video stream; representing a composition of a subset of the videos at the enhanced quality; having one or more base layers formed by copying from the first portion of the coded version of the video content; and having one or more enhancement layers formed by copying a fraction of the second portion of the coded version of the video content which relates to the subset of the videos into the one or more enhancement layers, wherein a change of the subset at a predetermined time-instant so that the subset newly encompasses a newly encompassed video or the videos not encompassed by the subset before the predetermined time instant, occurs with a reference picture of the newly encompassed video not comprised by the fraction of the second portion of the coded version copied into the one or more enhancement layers referenced, via motion prediction, by a referencing picture of the newly encompassed video comprised by the fraction of the second portion of the coded version copied into the one or more enhancement layers being substituted by a replacement picture, the temporal prediction of the referencing picture being redirected so as to reference the replacement picture and the replacement picture being filled with an approximation of the reference picture, via inter-layer prediction, on the basis of the base layer; or portions of the newly encompassed video comprised by the fraction of the second portion of the coded version so as to be copied into the one or more enhancement layers which reference, via temporal prediction, reference pictures of the newly encompassed video not comprised by the fraction of the second portion of the coded version copied into the one or more enhancement layers being replaced with an approximation of the replaced portions, via inter-layer prediction, from the base layer.

Another embodiment may have a video stream composed out of out of a coded version of a video content having, for each of at least one video, a portion into which the respective video is coded using temporal prediction and using a coded picture order which deviates from a presentation time order, the video stream having non-output portion of the data stream formed by copying from the coded version of the content; and output pictures inserted into the data stream which copy from the non-output portion by temporal prediction so as to synthesize a composition of the video content, wherein the output pictures are inserted in the data stream so that the output pictures are arranged in the data stream in presentation time order.

Another embodiment may have a video stream having multiple layers and a signaling indicating multi-layered pictures of the video stream not using in a highest layer TMVP, or indicating multi-layered pictures of the video stream not using in any layer TMVP.

Another embodiment may have a video streaming method for composing a video stream out of a coded version of video content encompassing one or more videos, the coded version having, for each video, a portion into which the respective video is coded, the video streaming having forming the video stream as a multi-layered data stream by forming a set of one or more layers of the multi-layered data stream by copying from the coded version of the video content; and synthesizing a composition of the at least one video in at least a portion of pictures of a predetermined layer of the multi-layer data stream using inter-layer prediction from at least a portion of the set of one or more layers.

According to another embodiment, a video streaming method may have the steps of: receiving a coded version of a video content, the coded version of the video content having a first portion having encoded thereinto a collection of videos at a base quality, and a second portion having encoded thereinto the videos at an enhanced quality, and composing a video stream representing a composition of a subset of the videos at the enhanced quality so that the video stream is a multi-layered video stream, wherein the composing has one or more base layers of the multi-layered video stream by copying from the first portion of the coded version of the video content, and one or more enhancement layers of the multi-layered video stream by copying a fraction of the second portion of the coded version of the video content which relates to the subset of the videos into the one or more enhancement layers, wherein a change of the subset at a predetermined time-instant so that the subset newly encompasses a newly encompassed video or the videos not encompassed by the subset before the predetermined time instant, is performed by substituting reference pictures of the newly encompassed video not comprised by the fraction of the second portion of the coded version copied into the one or more enhancement layers referenced, via motion prediction, by a referencing picture of the newly encompassed video comprised by the fraction of the second portion of the coded version copied into the one or more enhancement layers by a replacement picture, by inserting the replacement picture into the multi-layered video stream, redirecting the temporal prediction of the referencing picture so as to reference the replacement picture and fill the replacement picture with an approximation of the reference picture, via inter-layer prediction, on the basis of the base layer; or replacing portions of the newly encompassed video comprised by the fraction of the second portion of the coded version so as to be copied into the one or more enhancement layers which reference, via temporal prediction, reference pictures of the newly encompassed video not comprised by the fraction of the second portion of the coded version copied into the one or more enhancement layers with an approximation of the replaced portions, via inter-layer prediction, from the base layer.

Still another embodiment may have a video streaming method for composing a video stream out of a coded version of a video content having, for each of at least one video, a portion into which the respective video is coded using temporal prediction and using a coded picture order which deviates from a presentation time order, the video streaming method having forming the video stream by forming a non-output portion of the data stream by copying from the coded version of the content; and synthesizing a composition of the video content by inserting output pictures into the data stream which copy from the non-output portion by temporal prediction, wherein the output pictures are inserted in the data stream so that the output pictures are arranged in the data stream in presentation time order.

Another embodiment may have a non-transitory digital storage medium having stored thereon a computer program for performing the above methods, when said computer program is run by a computer.

In accordance with a first aspect, a video streaming concept for streaming a video stream composed out of a coded version of a video content is rendered more efficient by forming the video stream as a multi-layered data stream with forming a set of one or more layers of the multi-layered data stream by copying from the coded version of the video content, while a composition of the at least one video is synthesized in at least a portion of pictures of a predetermined layer of the multi-layer data stream by means of inter-layer prediction from at least a portion of the set of one or more layers. In other words, the at least one video which is coded into a respective portion of the coded version of the video content is conveyed or multiplexed into the set of one or more layers of the multi-layered data stream so as to form a kind of "reservoir" from which the composition may be synthesized at the video streaming apparatus' discretion with almost no restrictions concerning the composition. The formation of the set of one or more layers of the multi-layer data stream by copying, i.e. in the compressed or coded domain, may be such that the predetermined layer is one of the one or more layers, namely the highest one, or is separate therefrom. In any case, areas of videos to be inherited into the pictures of the predetermined layer in order to synthesize the composition may exploit all available tools for inter-layer prediction, such as up-sampling, filtering and so forth.

In accordance with a second aspect, a video streaming concept for streaming a video stream composed out of a coded version of a video content is rendered more efficient by conveying within a multi-layered video stream a base layer derived by copying from a first portion of the coded version of the video content, having encoded thereinto a collection of videos at a base quality, and one or more enhancement layers derived by copying from a fraction of a second portion of the coded version of the video content, the second portion having encoded thereinto the videos at an enhanced quality, and the fraction of the second portion relating to a proper subset of the videos. Whenever a change of the proper subset at a predetermined time instant occurs so that a proper subset newly encompasses a newly encompassed video of the videos not encompassed by the proper subset before the predetermined time instant, then inter-layer prediction is used to either substitute otherwise missing reference pictures of the newly encompassed video by inserting replacement pictures, or replace portions of the newly encompassed video referencing, by motion-compensated prediction, pictures which are missing as they lie prior to the predetermined time instant. By this measure, the tradeoff between a quality degradation of the change of a currently transmitted subset of videos at the enhanced quality by not restricting the predetermined time instant to take place at intra-coded pictures of the videos on the one hand and the benefit of having the freedom to freely select the temporal position of the predetermined time instant on the other hand may be improved in that a quality degradation is kept low. The additional overhead is relatively low as the base layer is derived merely by copying from the first portion of the coded version of the video content which has encoded thereinto the collection of videos at base quality. Moreover, the video content may even be coded into the coded version forming the basis for the composition, using an open GOP structure though no pictures exist in such structure where temporal prediction to the past would be interrupted so that the new encompassing of a video could be waited for.

In accordance with a third aspect, a video streaming concept for streaming a video stream composed out of a coded version of a video content is rendered more efficient by changing the order of output pictures inserted into the composed video stream so as to synthesize the composition of the video content by copying from a no-output portion of the composed data stream by temporal prediction. In particular, the coded version of the video content has, for each of at least one video, a portion into which the respective video is coded using temporal prediction and using a coded picture order which deviates from the presentation time order and the non-output portion of the composed data stream is formed by copying from the portion of the coded version of the video content, but the output pictures are inserted into the composed data stream so that output pictures are arranged in the data stream in the presentation time order rather than the coded picture order. By this measure, coded picture buffer demands are kept lower as the output pictures do not unduly consume expensive memory in the coded picture buffer.

BRIEF DESCRIPTION OF THE DRAWINGS

Embodiments of the present application will be set forth below with respect to the figures, among which:

FIG. 16 shows a schematic diagram illustrating the structure of the multi-layered video data stream generated by the apparatus of FIG. 14 in accordance with an alternative embodiment according to which the proper subset of videos are multiplexed into several enhancement layers rather than spatially stitched into one enhancement layer shown in FIG. 15a;

DETAILED DESCRIPTION OF THE INVENTION

Figure 1:
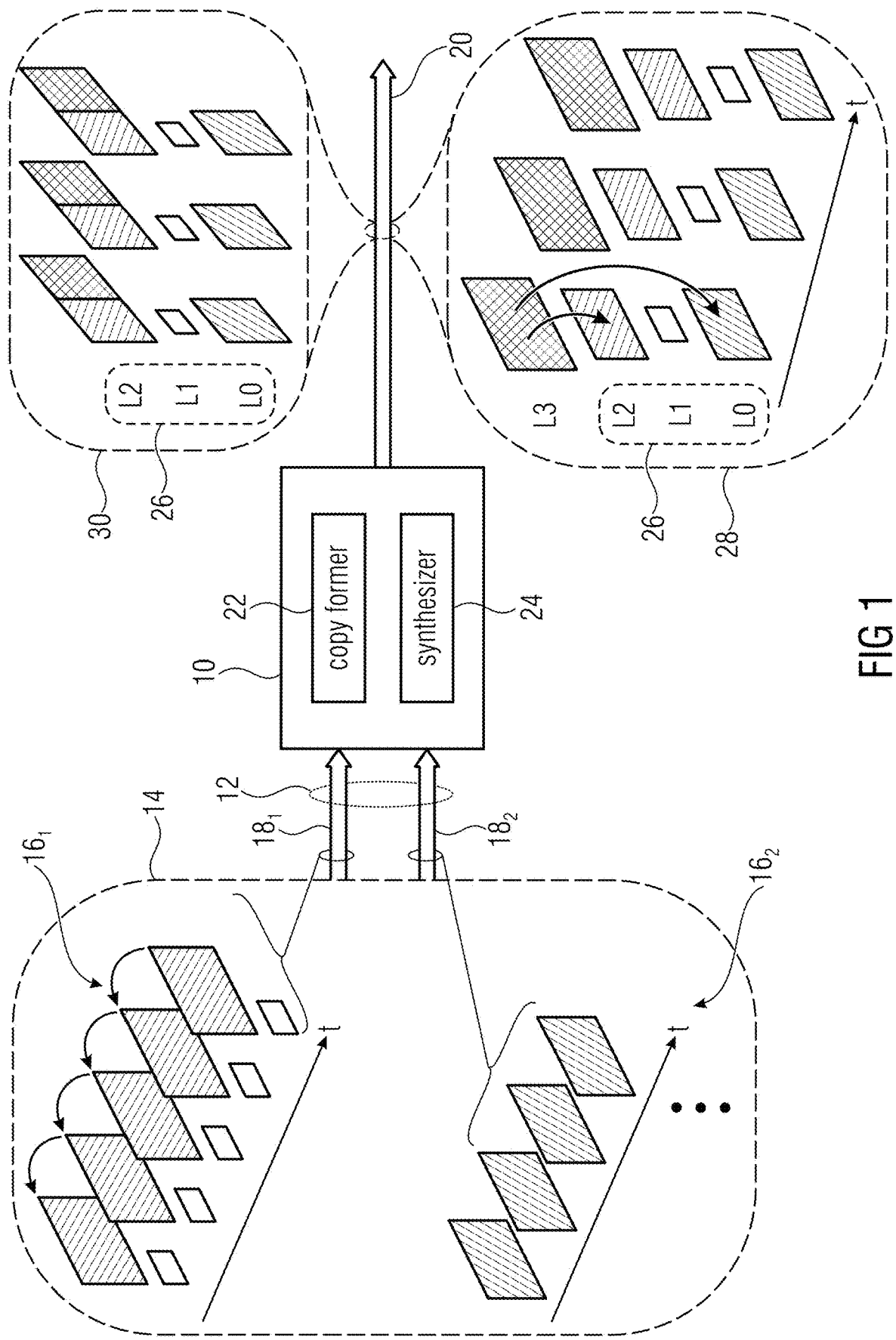
FIG. 1 shows a block diagram of a video streaming apparatus using video composition synthesis in a predetermined layer of a multi-layered compositing video stream in accordance with an embodiment.

FIG. 1 shows a video streaming apparatus in accordance with an embodiment for a first aspect. The video streaming apparatus of FIG. 1 is shown at 10 in a situation where the video streaming apparatus receives a coded version 12 of a video content 14. The video content of FIG. 1 exemplarily encompasses two videos $16_1$ and $16_2$, but the advantageous functionality of video streaming apparatus 10 may also be exploited in case of merely one video or more than two videos conveyed by video content 14. The coded version 12 encompasses, for each video $16_1$, $16_2$, a portion $18_1$, $18_2$, into which the respective video $16_1/16_2$ is coded. FIG. 1 illustrates the case where the coded version 12 is composed of one video data stream per video $16_1/16_2$, i.e. separate streams, but this does need to be the case. Later on, the number of videos 16 is denoted using variable I. Further, it is noted that the indices for reference signs 16 and 18 are used in FIG. 1 so as to distinguish between individual videos and this concept is also maintained with respect to the description of the following figures. However, the indices used in one figure are not related to indices used in other figures unless otherwise stated in the following description. Moreover, FIG. 1 illustrates the case that video $16_1$ is exemplarily encoded into portion $18_1$ in a layered manner, but the advantages resulting from the functionality of the video streaming apparatus 10 described next also manifests themselves in the absence of any layered-encoded video in the video content 14.

As described in more detail below, the apparatus 10 is configured to form a video stream 20 out of the coded version 12 in such a manner that the video stream 20 is a multi-layered data stream. Thus, multi-layer data stream 20 comprises several layers L #. These layers L # have, for example, a hierarchy defined thereamong in that a lower layer $L_i$ may form an interlayer prediction reference with respect to another layer $L_j$ with i<j, i.e. layer $L_j$ may be coded using inter-layer prediction from a co-located portion of layer $L_i$.

Internally, the apparatus 10 of FIG. 1 is shown to comprise two or more modules which assume responsibility for respective functionalities of apparatus 10 described in more detail below. In particular, apparatus 10 comprises a copy former 22 and a synthesizer 24. As described in the end of the description, apparatus 10 may, for instance, be implemented in hardware, programmable hardware or software and accordingly, modules 22 and 24 may represent different portions of a computer program, different portions of a programmable hardware or different parts of an integrated circuit, for example.

Copy former 22 forms a set 26 of one or more layers L0 to L2 of the multi-layered data stream 20 by copying from the coded version 12 of the video content 14. That is, copy former 22 forms set 26 in, i.e. without leaving, the coded or compressed domain. That is, copy former does not perform a detour via decoding the set 26 of videos into the pixel domain. In even other words, the forming of the set of one or more layers of the multi-layer data stream is performed by copying from the coded version of the video content in compressed or coded domain.

For example, imagine videos $16_1$ and $16_2$ were encoded into portions $18_1$ and $18_2$, respectively, using motion-compensated prediction and a coding of the prediction residual. In that case, copy former 22 would simply copy the motion compensation prediction parameters and residual data from the coded version 12, i.e. from the portions $18_1$ and $18_2$, respectively, into the layers of set 26 of multi-layer data stream 20 without any loss, i.e. without any re-quantization. The same applies, for example, if present, to inter-layer prediction parameters contained, for example, in portion $18_1$ so as to describe the inter-layer prediction of the upper layer from the lower layer of video $16_1$. Copy former 22 may even perform the copying of layers of set 26 in a manner maintaining an entropy compressed format of portion $18_1$ and $18_2$. That is, copy former 22 may operate on portions $18_1$ and $18_2$ in the compressed domain with not even transitioning from the this compressed bit domain by entropy decoding into a syntax domain of portions $18_1$ and $18_2$. Accordingly, the inter-prediction dependencies between the pictures of videos $16_1$ and $16_2$ remain in the multi-layer data stream 20. In other words, the copy former 22 forms layers of set 26 in such a manner that same have videos $16_1$ and $16_2$ of video content 14 encoded thereinto using the same inter prediction dependencies, i.e. temporal prediction and, if any, inter-layer prediction, for example. However, in forming the set 26 of layers of the multi-layered data stream 20 from the coded version 12, copy former 22 may modify higher level syntax elements which are, for example, not entropy encoded in portions $18_1$ and $18_2$ such as, for example, high level syntax elements describing or defining the layer index of the respective pictures, the layer index of pictures referenced via inter-layer prediction, or others.

The synthesizer 24 performs the actual video composition. The synthesizer 24 synthesizes the composition of the video content 14, i.e. of videos $16_1$ and $16_2$ in the case of FIG. 1. The synthesizer 24 performs this synthesis in at least a portion of pictures of a predetermined layer of the multi-layer data stream by inter-layer prediction from at least a portion of the set of one or more layers. In order to illustrate this, FIG. 1 distinguishes the pictures of the layers of video $16_1$ and the pictures of video $16_2$ mutually using different hatchings and no-hatching, respectively. The aforementioned portion within which synthesizer 24 performs the synthesis by inter-layer prediction is shown using crosshatching, thereby differentiating this portion from those portions of the layers of the multi-layer data stream 20 having been created by copying by copy former 22.

FIG. 1 illustrates substantially two alternatives for performing the synthesis and for positioning the cross-hatch portion. It should be noted, however, that the alternatives depicted in FIG. 1 are not the only ones and that other alternatives could be assessed as well.

According to the alternative shown at 28, the portion within which the synthesis is performed by inter-layer prediction is formed by pictures of a layer L3 which is separate from the layers within set 26 and forms a higher layer relative to layers within set 26, respectively—in terms of dependency order so that the higher layer may by codded using inter-layer coding relative to layer set 26, but not vice-versa. In other words, in accordance with the alternative of 28, the predetermined layer within which the synthesis is at least partially performed by prediction from layers within set 26 is separate from set 26 and higher than the layers within set 26. The whole pictures of this predetermined layer L3 may be synthesized by way of inter-layer prediction from layers within set 26, in which case the cross-hatched portion spatially encompasses the whole pictures of layer L3 as illustrated in FIG. 1. Alternatively, merely a sub-portion of the pictures of layer L3 may be predicted from layers within set 26 using inter-layer prediction. A remaining portion of the pictures of layer L3 may be synthesized by synthesizer 24 by other means, such as by using intra- and temporal prediction, for instance. For example, a background may be added by synthesizer 24 in this manner. However, FIG. 1 illustrates the example according to which the composition of videos 16$_1$ and 16$_2$ is such that the pictures of the predetermined layer L3 are subdivided horizontally in two halves, one of which is coded using inter-layer prediction from layer L2, which conveys the upper layer of video 16$_1$, and the other half of which is coded using inter-layer prediction from layer L0 of the multi-layer data stream 20 which conveys video 16$_2$.

In accordance with alternative 30 shown in FIG. 1, the portion within which the synthesis is performed by synthesizer 24 using inter-layer prediction from layers of set 26 is within the highest layers of the layers of set 26 itself, i.e. layer L2 in the case of FIG. 1. That is, in case of alternative 30, the layer of multi-layer data stream 20, within which the synthesis is performed by inter-layer prediction is part of set 26 itself, and the portion within which the synthesis is performed by inter-layer prediction is a spatial subarea of pictures of the highest layer of set 26, namely layer L2, with the other area of the pictures of layer L2 having been obtained by copy former 22 by way of copying from coded version 12. While in the case of alternative 28 all layers of set 26 are available for synthesis by inter-layer prediction, in the case of alternative 30, synthesis by inter-layer prediction may merely refer to the lower layers of set 26, i.e. layers L1 and L0 in the case of FIG. 1. Other areas of pictures of layer L2 could, in accordance with alternative 30, be synthesized by synthesizer 24 in an even other manner, i.e. neither by copying from coded version 12 nor by inter-layer prediction from subordinate layers L1 or L0, but by using intra-prediction and/or temporal prediction in order to, for instance, provide the composition with a background.

Figure 2:
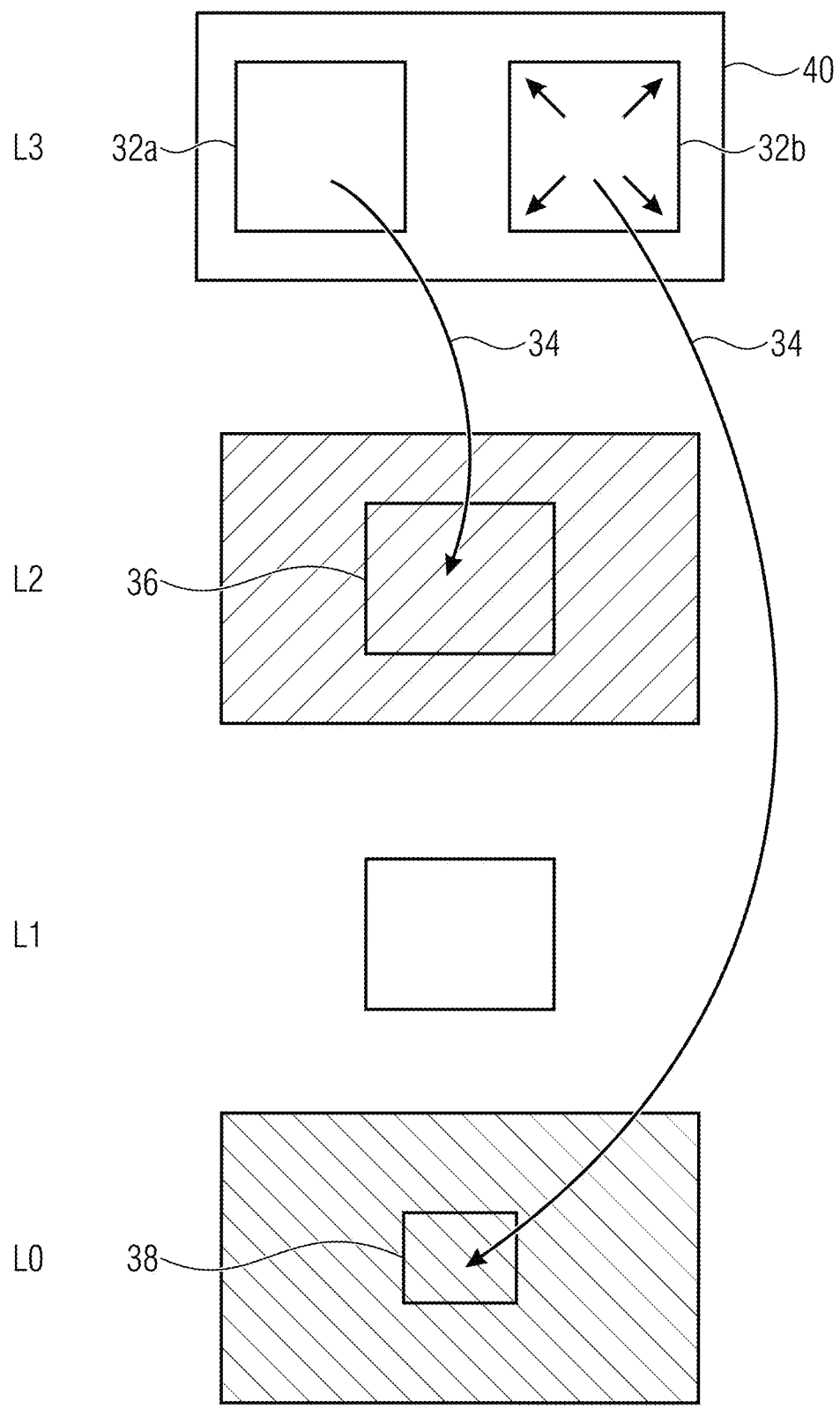
FIG. 2 shows a schematic diagram of an access unit or a multi-layered picture out of the multi-layered composition data stream of FIG. 1 in accordance with the alternative 28 shown in FIG. 1.

In order to illustrate the low complexity and high degree of freedom in synthesizing the composition, FIG. 2 illustrates a time instant of the pictures of the multi-layered data stream 20 at a certain time instant for the alternative 28 where the actual video composition is conveyed within an extra layer, namely layer L3 in the example of FIGS. 1 and 2. FIG. 2 illustrates the picture of layer L3 to be composed of three areas, areas 32$_a$ and 32$_b$ are synthesized using inter-layer prediction as shown by arrows 34. These portions thus form the cross-hatched portion of FIG. 1 in the case of alternative 28. Area 32$_a$ is inter-layer predicted from a subarea 36 of the picture of layer L2. The size of areas 32$_a$ and 36, respectively, might the same when measured in units of samples, pels or pixels. In the case of area 32$_a$, the inter-layer prediction accordingly does not involve any upsampling. In accordance with the example of FIG. 2, areas 32$_b$ is coded using inter-layer prediction from a respective subarea 38 of the picture of layer L0. Here it is illustrated that the size of area 32$_b$ measured in samples is higher than area 38 and that accordingly upsampling process may be involved in inter-layer predicting area 32$_b$ from layer L0. Areas 32$_a$ and 32$_b$ are exemplarily shown to be embedded into an area 40 of the picture of layer L3, which area 40 might be synthesized by synthesizer 24 using, for instance, intra coding or using temporal prediction on the basis of a corresponding or even co-located area in a preceding picture of layer L3.

As becomes clear from FIG. 2, the synthesizer 24 of FIG. 1 is readily able to change a position, number, size or shape of areas 32$_a$ and 32$_b$ and the area 40 which may represent, for example, a kind of background content, may optionally be left off. In positioning areas 32$_a$ and 32$_b$ and the contours thereof, synthesizer 24 might merely be restricted to register same to a block grid allowed by the underlying codec of multi-layered data stream 20. Even the positioning of the corresponding areas 36 and 38 may be varied and/or be freely chosen. That is, these areas 36 and 38 might, as illustrated in FIG. 2, encompass the whole pictures of layers L2 and L0, i.e. the inter-layer predictively referenced pictures are the whole pictures. In order to compensate for the offset in position between the referencing areas 32$a$ and 32$b$, respectively, on the one hand and the referenced areas 36 and 38, respectively, on the other hand, apparatus 10 or synthesizer 24 may signal within the data stream 20 offset parameters indicating an offset of a position of the referencing areas relative to a position of the referenced areas such as, for example, in units of pixels of the referenced picture, i.e. the picture of any layer referenced by a current picture of L3. Let vector (x, y) be a position within area 32$_a$, measured from the upper left corner of the picture of L3 in pixels of the picture of L3 itself, then the offset parameters may indicate the offset p so that the collocated position (X, Y) within the picture of the referenced layer, such as L2, within area 36, measured from the upper left corner of this picture, so as to be used as a source for inter-layer prediction, is (X, Y)=(q$_x$·x+P$_x$, q$_y$·y+p$_y$) where $$q = \begin{pmatrix} q_x \\ q_y \end{pmatrix}$$

is the pixel scene pitch ratio between the referencing layer L3 and the referenced layer (such as L2). The offset parameters may signal p for each non-highest layer, i.e. each of L0-L2 in the example of FIG. 1. The offset parameters may additionally signal $$q = \begin{pmatrix} q_x \\ q_y \end{pmatrix}$$

and a general scene offset $$o = \begin{pmatrix} o_x \\ o_y \end{pmatrix}$$

between the referencing and referenced pictures so that (X, Y)=(q$_x$·(x+o$_x$)+p$_x$, q$_y$·(y+o$_y$)+p$_y$). The offset parameters, may, for instance signaled, in units of pixels of the highest layer, here L3, via the offset $$o^{TL} = \begin{pmatrix} o_x^{TL} \\ o_y^{TL} \end{pmatrix}$$

between the top-right and the offset $$o^{BR} = \begin{pmatrix} o_x^{BR} \\ o_y^{BR} \end{pmatrix}$$

between the bottom left corners of the referencing pictures of this highest layer and the referenced layers in addition to offset p, so that $$q = \begin{pmatrix} (N_x + o_x^{BR} - o_x^{TL})/N'_x \\ (N_y + o_y^{BR} - o_y^{TL})/N'_y \end{pmatrix}$$

and $o=o^{TL}$ and $(X, Y)=(q_x \cdot (x+o_x)+p_x, q_y \cdot (y+o_y)+p_y)$ where $N_x$ and $N_y$ denote the size of the referencing pictures in layer L3 measured in pixels horizontally and the size of the referencing pictures in layer L3 measured in pixels vertically, respectively, and $N'_x$ and $N'_y$ denote the size of the referenced pictures, e.g. in layer L2, measured in pixels horizontally and the size of the referenced pictures measured in pixels vertically, respectively.

Figure 3:
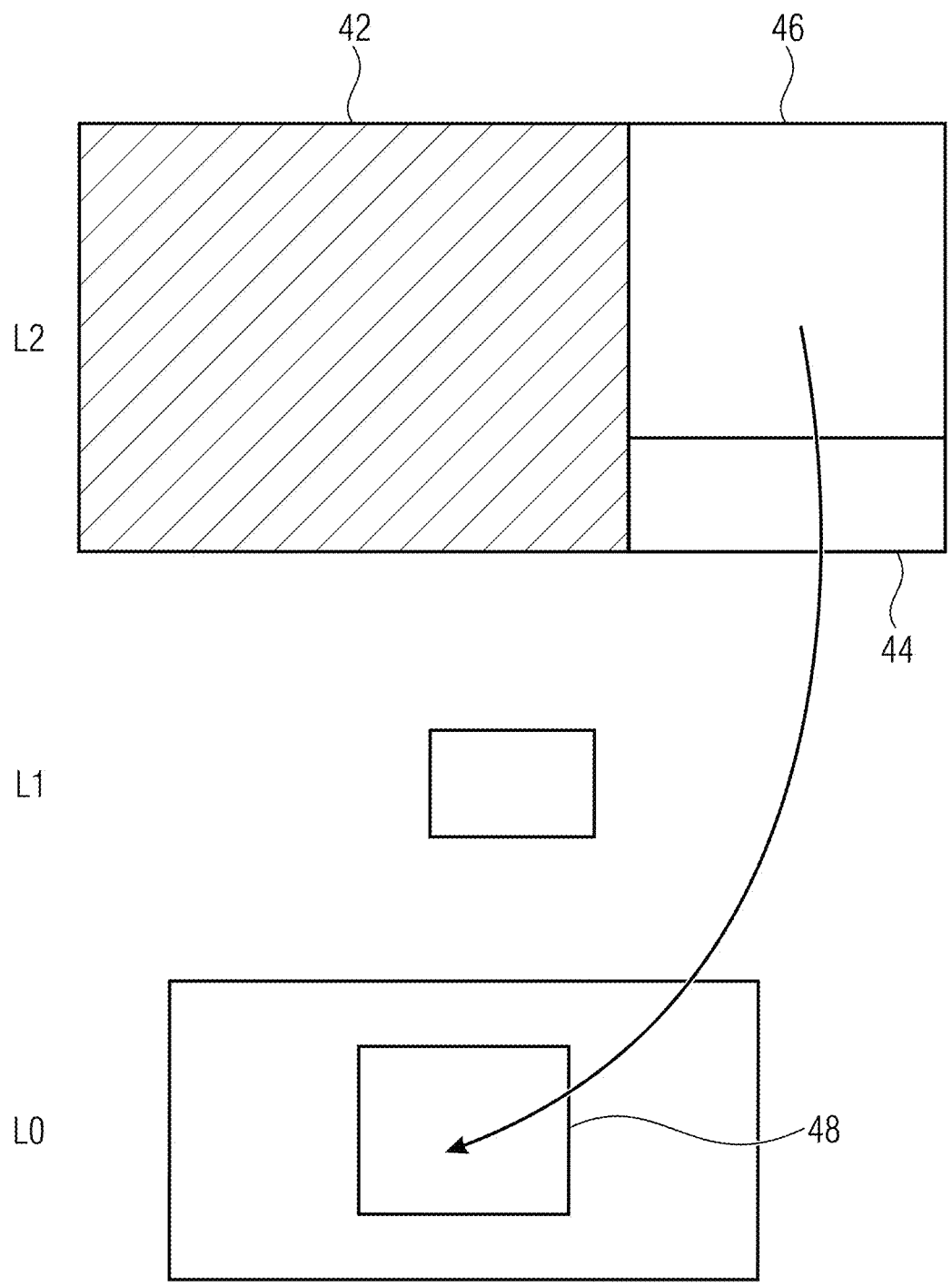
FIG. 3 shows a schematic diagram of a multi-layered picture out of the multi-layered composition data stream of FIG. 1 in accordance with the alternative 30 depicted in FIG. 1.

FIG. 3 shows an example for a composition just in line with FIG. 2, but this time for alternative 30 of FIG. 1. Again, the pictures of the highest layer, here layer 2, is shown to be synthesized such that same is subdivided into three areas. Area 42 is copied from portion 18₁ of the coded version 12. Area 42 may contain the whole picture content of the pictures of video 16₁. However, a cropping-out may be feasible as well. In that case, for example, the pictures of video 16₁ are already coded in such a manner that cropping-out is possible. For example, the pictures of the upper layer of video 16₁ may be coded into portion 18₁ in tiles, and one or a subset of these tiles may be put into area 42 of layer L2 of the multi-layer output data stream 20. Another area 44 may have been synthesized by synthesizer 24 by way of intra coding and/or temporal prediction in a manner similar to area 40 of FIG. 2. An area 46 forms the cross-hatched portion of FIG. 1 and is synthesized by inter-layer prediction from a corresponding area 48 of layer L0. Again, synthesizer 24 or apparatus 10 may use offset parameters in order to leave the motion vectors by way of which video 16₂ is coded into layer L0 of the multi-layer data stream 20 untouched and unamended while nevertheless correctly inserting the picture content within subarea 48 of the pictures of layer L0 into area 46 of the picture of layer L2.

In accordance with the alternative 30 depicted as in FIGS. 1 and 3, the synthesizer 24 may have to amend a coding/decoding path along which pictures of layer L2 are coded into data stream 20. In other words, synthesizer 24 may synthesize the pictures of L2 such that the copied area 42 is not split-up in accordance with the just mentioned coding/decoding order. In other words, synthesizer 24 may have to code the pictures of layer L2 in such a manner that the coding/decoding order traverses the copied portion 42 in a contiguous manner and in a manner coinciding with the coding/decoding order at which the corresponding picture content is coded into the corresponding portion 18₁ of the coded version 12. By this measure it is possible that copy former 22 fills area 42 by the aforementioned copying in the compressed or coded domain. Synthesizer 24 may manage to achieve this by aligning the contours of copied area 42 with tile boundaries with tiles denoting portions of a picture encoded into data stream 20 separately and, most importantly, sequentially: the first tile of a picture is coded into data stream 20 first, followed by a next tile in tile order and so forth. Thus, structuring a picture into tiles allows for adjusting the coding/decoding order at which a picture is traversed in encoding/decoding.

However, even in the case of FIG. 3, the composition exemplified in FIG. 3, for instance, may be varied by the apparatus 10 or synthesizer. In accordance with both alternatives 28 and 30 illustrated in FIGS. 2 and 3, the synthesizer is even free to, by way of weighted prediction, perform blendings, overlays, fade-in or fade-out of inter-layer predicted picture content derived from lower layers.

Figure 4:
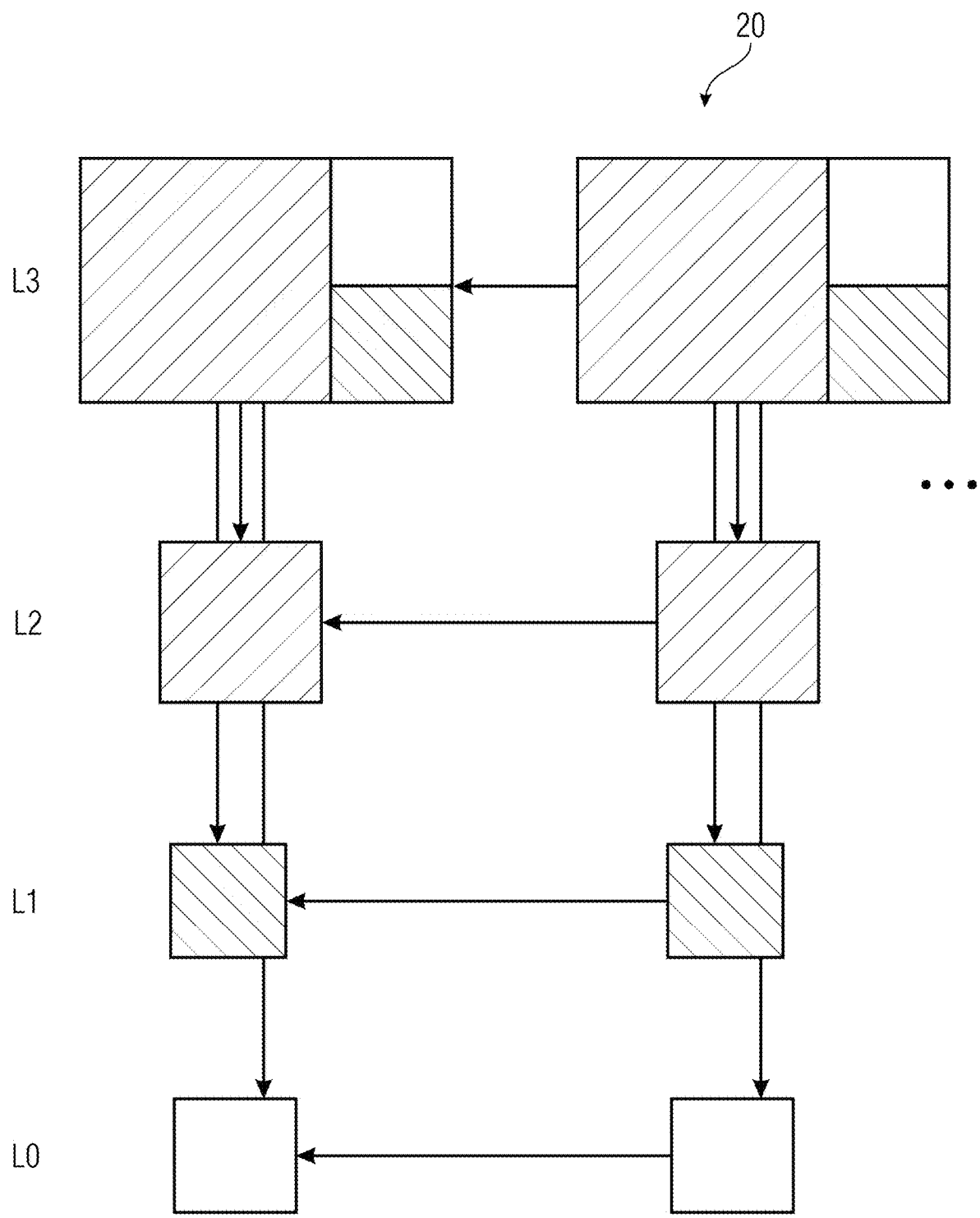
FIG. 4 shows a schematic diagram illustrating an MLCP concept.
Figure 25:
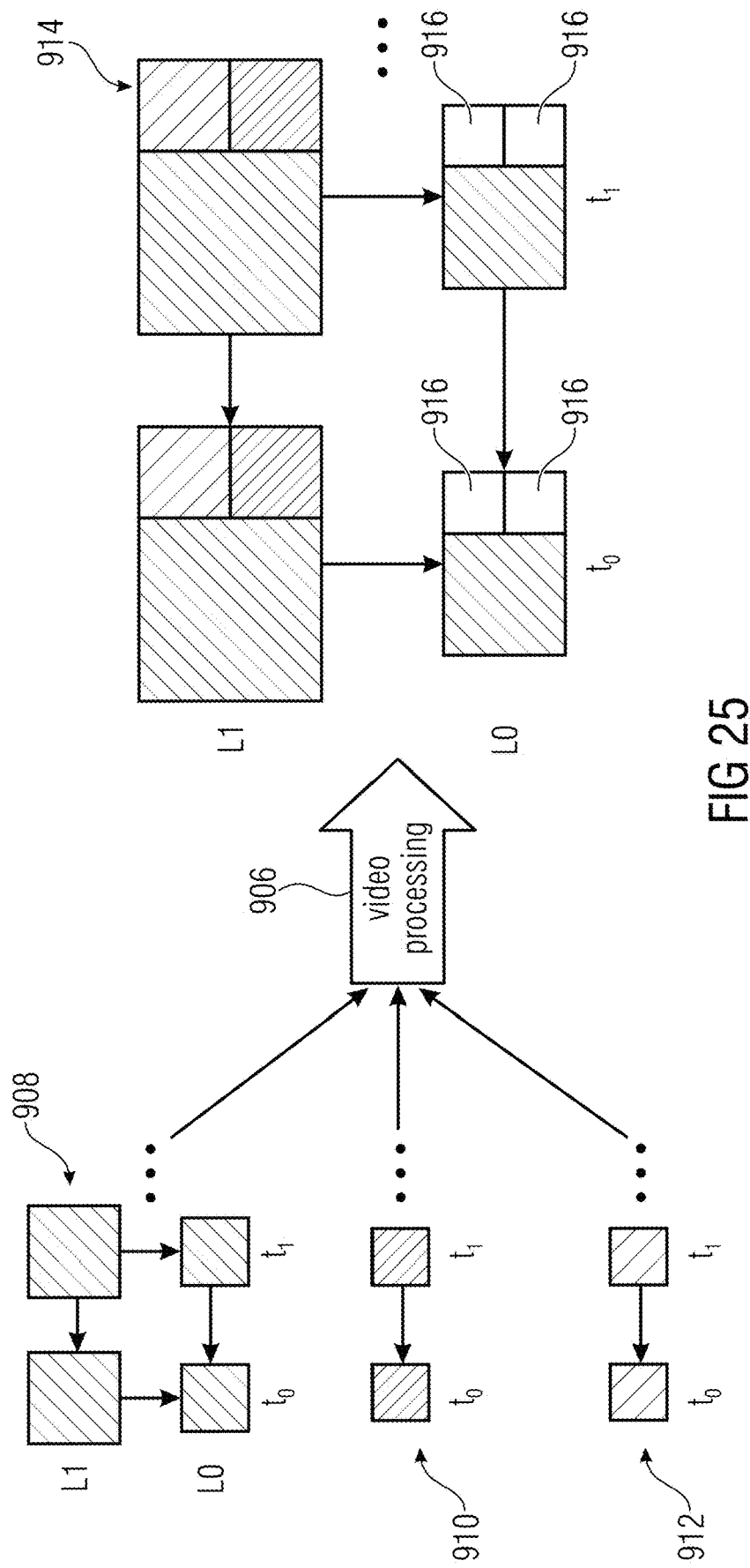
FIG. 25 shows a schematic diagram illustrating bitstream stitching for three input streams with a different amount of layers in the compressed domain as in [3]
Figure 26:
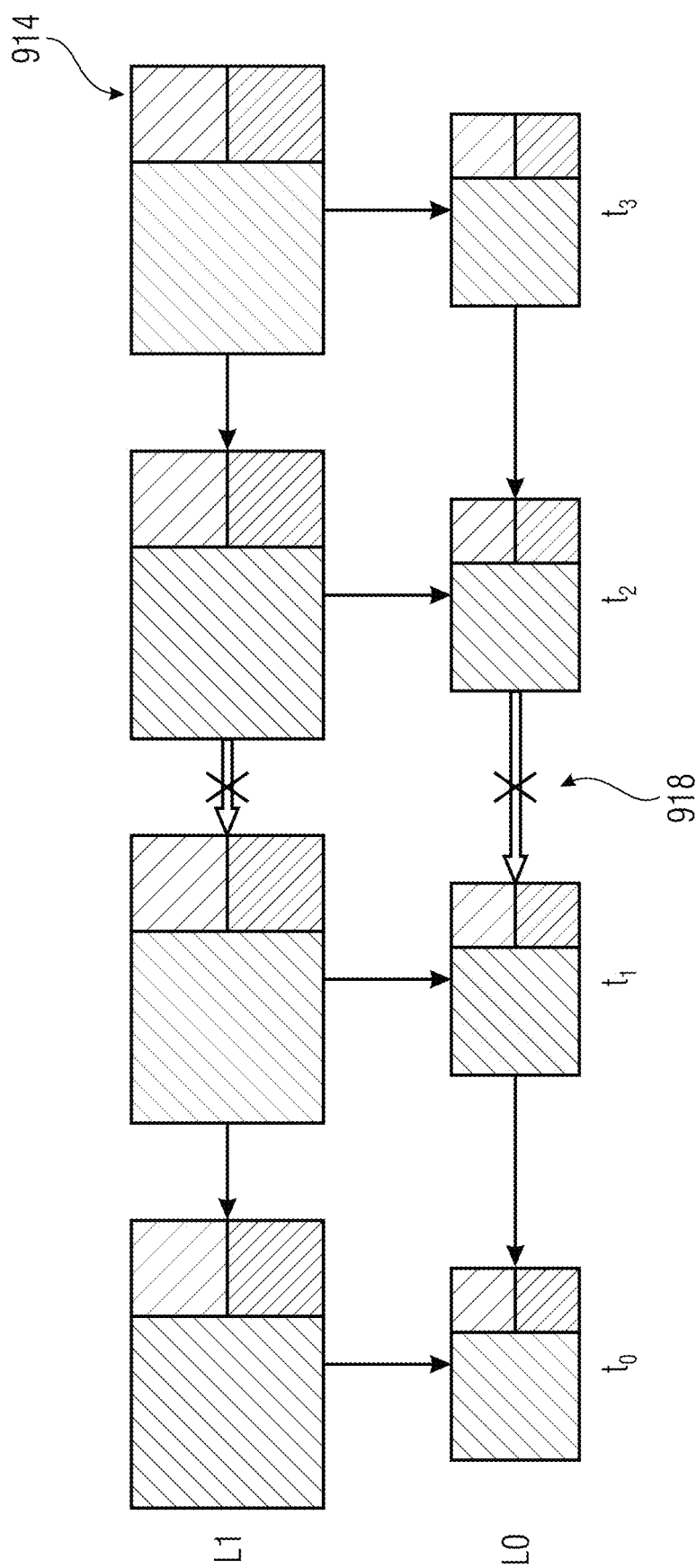
FIG. 26 shows a schematic diagram illustrating a temporal prediction break at layer (speaker) change.

In order to illustrate the advantages involved with the embodiment described above with respect to FIGS. 1 to 3, an application thereof is described in the following which refers to video conferencing, thereby clarifying the advantages over, for example, the concept explained above in the introductory portion of the specification of the present application. For example, FIG. 4 illustrates the resulting multi-layered output data stream 20 in the case of applying the concept outlined above with respect to FIGS. 1 to 3 onto the video conferencing task explained above with respect to FIGS. 23 to 26. That is, three video bitstreams formed the coded version of the video content on the basis of which the composition is to be performed, with two layers being present in the bitstream of the speaker (big block in FIG. 4) and a single layer being present in the other bitstreams (analogous to FIG. 25) for simplicity.

As an example, the embodiments described above with respect to FIGS. 1 to 4 may use the concept of extended scalability or RoI scalability such as, for example, provided in SHVC, where different reference layers can be signaled and some offset can be added to map different regions of a picture to different reference layers. This concept has been mentioned above with respect to FIGS. 2 and 3 when mentioning the offset parameters. In SHVC, for example, the offset parameters are called scaled reference layer offsets and reference region offsets. For example, see FIG. 4: here, for simplicity, the base layer L0, corresponding to one of the three participants, is not modified. In FIG. 4, the video concerning each participant is assigned to a different layer. Participant 1 is assigned the layer_id=0 (L0), participant 2 is assigned layer_id=1 (L1), and participant 3 is assigned layer_id=2 (L2). The additional layer is the one where the synthesis takes place, i.e. the predetermined layer. In the case of FIG. 4, this additional layer has layer_id=3 (L3). The remaining input data from a corresponding portion of the coded version 12 of the video content 14 is inserted Into this layer, namely residual and/or prediction data of the enhancement layer of the respective input video of participant 2. In this layer L3, there is also the compositing performed. The compositing uses the above-outlined MLCP concept, i.e. the concept of multi-layer composition pictures. This concept as outlined above processes a number of input video bitstreams which are potentially scalable and a compressed domain to create a single output scalable video bitstream, i.e. multi-layer data stream, that when fed to a single scalable decoder produces a spatial composition of the multiple input video bitstreams.

Figure 5:
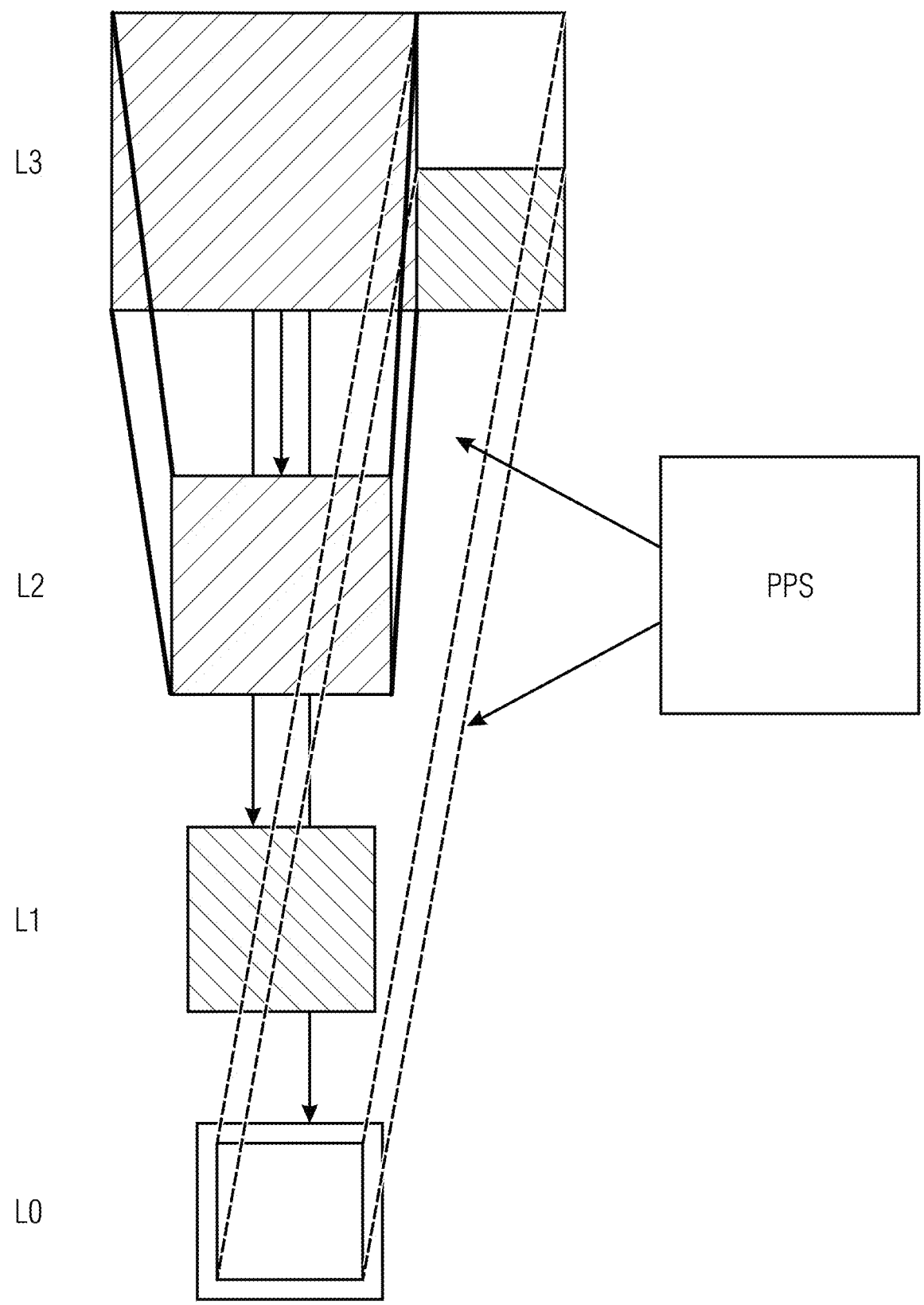
FIG. 5 shows a schematic diagram illustrating a usage of scalable offsets, i.e. offset parameters.

The just mentioned offset parameters may be included in high-level syntax of the multi-layered output data stream 20. For example, a picture parameter set (PPS) may be generated by the video streaming apparatus or the synthesizer thereof, for the highest (predetermined) layer of the multi-layered output data stream 20, which PPS includes the offset parameters, such as scaled reference layer offsets and referenced region offsets. The latter correspond to the composition layout. That is, as many scaled reference layer offsets and potentially referenced region offsets are included as input videos 16 (or participants in case of FIG. 4) to describe the regions/areas in the output picture of the highest layer that corresponds to, or shows, each of the participants, for example. FIG. 5 illustrates the effect of using scalable offsets (offset parameters) for the teleconferencing application example of FIG. 4, here exemplarily used for two of the participants. For the participant, the video of which is conveyed via layers L3 and L2, the left most region of the output picture uses the picture in L2 for prediction using spatial scalability (inter-layer prediction). However, the right part of the picture of L3 uses a concept provided by the synthesizer of FIGS. 1 to 3, i.e. a direct-copy of the picture content of the picture in L0 via inter-layer prediction. Such a direct copy slice may consist of large prediction blocks with a constant zero motion vector that, in combination with the specified scaled reference layer offsets and reference region offsets in the respective PPS, point to the samples of the intended region/area of the picture in L0. As shown in FIG. 5, this can also be a copy of only a subarea of the content to emphasize the most important part (by including the referenced region offsets), e.g. by choosing the part of the picture that used most of the bitrate in the bitstream that may indicate an area of interest or determined by some external means of signaling. The embodiments described above allow flexible compositing of the layout, since parts of the original content can virtually be "cropped out", i.e. the composition of all participants can fit a determined resolution that does not match the resolution of a regular stitching procedure, where the complete pictures are stitched together.

In the case of implementing the embodiments described before using SHVC, for example, the slices concerning pictures of videos of participants whose base layer is assigned a layer-ID larger than 0, namely L1 and L2 in FIG. 5, may be modified so that extensions of the respective slice header for SHVC are included in the slice headers. Inter-layer prediction from lower layers is not applied/used for these layers since they are independent, i.e. they are independent base layers in the respective input streams.

Whenever a layout change event occurs, i.e. whenever the composition (layout) changes, a new PPS is inserted with the respective reference layer offsets and referenced region offsets, i.e. offset parameters, updated to match the new layout configuration. There will be as many scale offsets as the number of participants, each for reference layer which corresponds to the base layer of each participant. Alternatively, if a more complex structure with more layers is used compared to the one depicted in FIG. 4, more layers can be kept without further modification apart from assigning a valid layer identifier (nuh_layer_id syntax element in SHVC).

The above described embodiments are flexible in that they allow to keep all individual input layers and separate non-output (lower) layers with different values of nuh_layer_id, thus avoiding any input residual and/or prediction data in the MLCP, but use the MLCP solely to perform the compositing in the highest layer, i.e. the MLCP solely consists of direct copy slices that copy picture content of lower output layers including the highest input layers. This has been described above as alternative 28.

Figure 6:
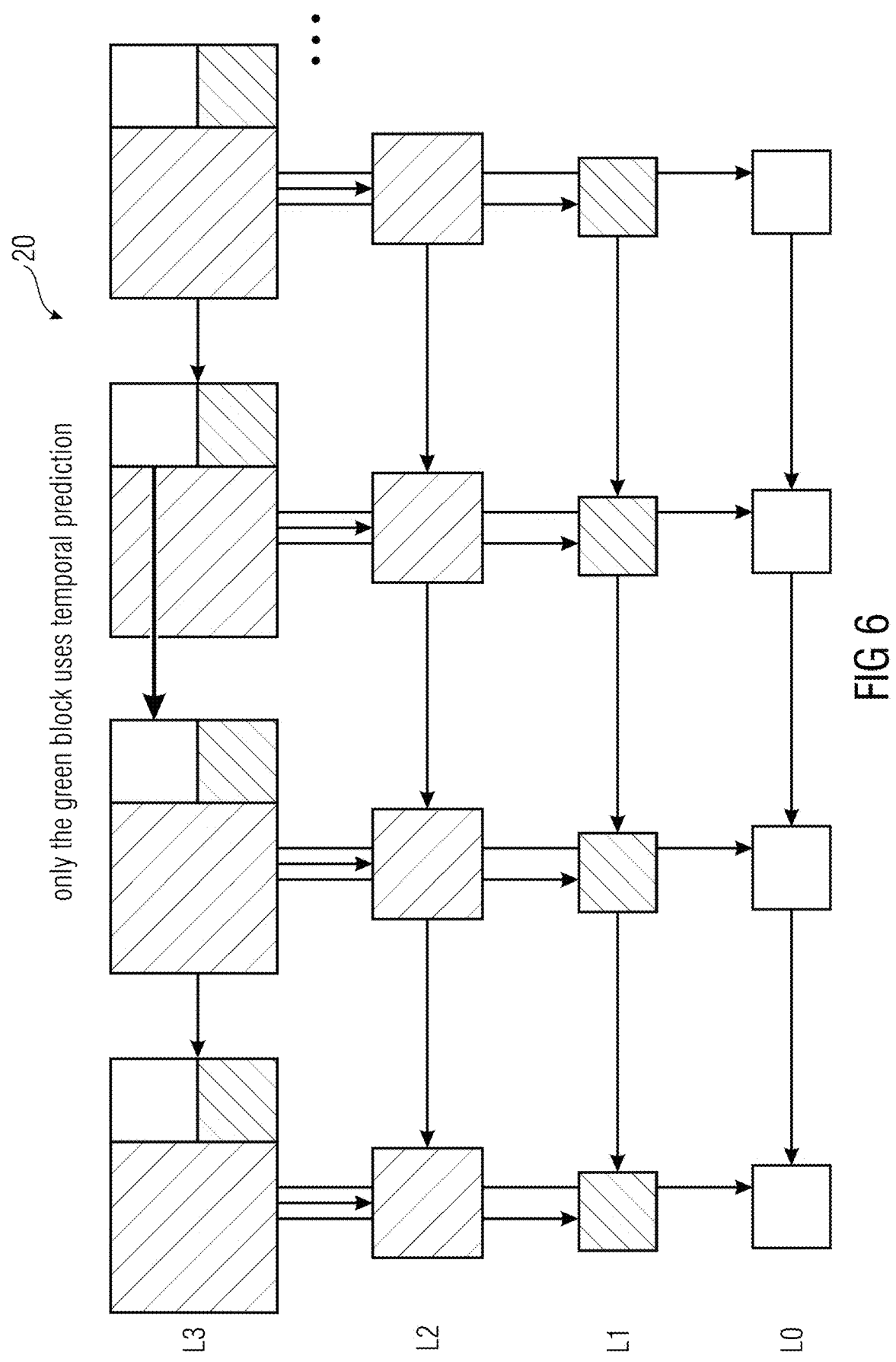
FIG. 6 shows a schematic diagram illustrating a layout change using the MLCP concept in accordance with an embodiment.

All layers of the multi-layered output data stream 20 not included in the MLCP (low resolution base layers in the example of FIGS. 4 and 5) of the videos (participants in the case of FIGS. 4 and 5) are allowed to use temporal prediction at any time. For residual and/or prediction data of input pictures included in the MLCP layer, i.e. predetermined layer, and effected through displacement at a layout change event, temporal prediction is disallowed. For those MLCP regions affected by the layout change only inter-layer prediction is allowed. FIG. 6 shows an exemplary layout change event in which MLCPs with residual and/or prediction data of input pictures are used and it can be seen how temporal prediction is not broken for lower layers and for the green region in MLCP, thus leading to a very good compression efficiency, which is better than when MLCPs are not used.

Note that in the example of FIG. 6, it is considered that the MLCPs contain the residual and/or the prediction data of the highest input layer of the video concerning the speaker, which is shown in the highest resolution. Therefore, in this example, MLCPs can have slices with the additional information of the speaker that allows for decoding a higher resolution video and direct copy slices that simply inherit the sample values of the low-resolution video layers of the non-speakers per inter-layer prediction. This was the alternative mentioned above with respect to reference sign 30. Here, the number of layers is reduced compared to the alternative according to 28.

Thus, in effect it is a design choice to choose alternative 28 or 30. While in the alternative according to 28, all layers are kept independent of the MLCP, where residual and/or prediction data of the input data streams is not included into the MLCPs of the predetermined or highest layer of the multi-layered output data stream 20, this is not the case with respect to the alternative according to 30. In accordance with the alternative 28, the MLCPs are solely constructed out of direct copy slices that use reconstructed sample data from lower layers via inter-layer prediction. The layers of all scalable input video bitstreams, irrespective of the respective number of layers, would be kept unaltered with the exception of writing an appropriate nuh_layer_id. All of the MLCP slices, i.e. direct copy slices, are encoded in such a way that the first CU uses inter-layer prediction with no additional (input) residual data and the following CUs are encoded as skip mode, i.e. they simply copy the prediction mode, i.e. inter-layer prediction, while skipping residual coding. In the alternative 28, prediction in the temporal domain can be exploited without any restrictions with respect to all input layers in set 26.

The MLCP concept described above can be used further under loss circumstances. Assuming that the highest layer (output) of the speaker is lost, a direct copy slice (potentially performing scaling of the lower layer) could be introduced that generates the unavailable content of the output layer. Such an insertion might have severe effects for following pictures if TVMP were used since the MVs of the copy slices would be completely different from the MVs of the original lost slice. Therefore, further slices corresponding to the substituted participant at the highest layer would be dropped and substituted by further copy slices until a "TMVP random access" (a picture that resets the TMVP prediction) happens.

In the following, some description is provided on bitstream constraints and properties concerning the embodiments described so far.

In particular, as described above, MLCPs denote the pictures of the highest layer or output layer (predetermined layer) of the multi-layered output data stream 20 by way of which the actual composition of the input videos is achieved. In case of implementing the above identified embodiments using SHVC, i.e. in the case of using SHVC in order to represent the output data stream, MLCPs are SHVC EL pictures that are composited from input bitstream EL pictures (in the case of alternative 30) and/or copy slices. Copy slices in that context mean slices that (fully or partially) copy (and potentially resample) picture content of lower layers at the same time instant via means of inter-layer-prediction from source pictures of lower layers. In case temporal inter-prediction is used within the input bitstream EL, two approaches can be used for creation of the MLCP as described above. When the layers of all input bitstreams are put into individual layers of the output bitstream 20 and MLCPs are created solely via copy slices, thereby forming an extra predetermined layer according to alternative 28, the use of temporal inter-prediction within the input bitstream EL pictures, i.e. the pictures of layers 26, imposes no specific constraints. In the other case 30, however, where the MLCP contains slice data of input bitstream EL pictures and these slices perform temporal inter-prediction, these pictures need to fulfill switching constraints as described in the following. The following is a short summary of the constraints for HEVC coded bitstreams as input bitstreams 18 as detailed in [4], but apply to the multi-layer case analogously: 1) MV Constraints: motion vectors should not point to samples outside the picture borders or sub-pel sample positions, for which the encoder-side invoked sub-pel interpolation filter kernel overlaps with the picture borders. 2) Prediction Units: the rightmost prediction units within a picture shall not use the motion vector prediction candidate that corresponds to a temporal motion vector prediction (TMVP) candidate or the spatial motion vector candidate at the position of a non-existent TMVP candidate. 3) In-loop filters: Slice segment and tile borders (if present) shall not be crossed by in-loop filters such as the deblocking and SAO filter.

The insertion of PPSs for the MLCP and its references at the time of switching (or tune-in or speaker change) with appropriate scaled reference layer offset and reference region offset parameters is a further characteristic of MLCP bitstreams. The parameters need to reflect the current MLCP layout, layer hierarchy and picture dimensions.

Figure 7:
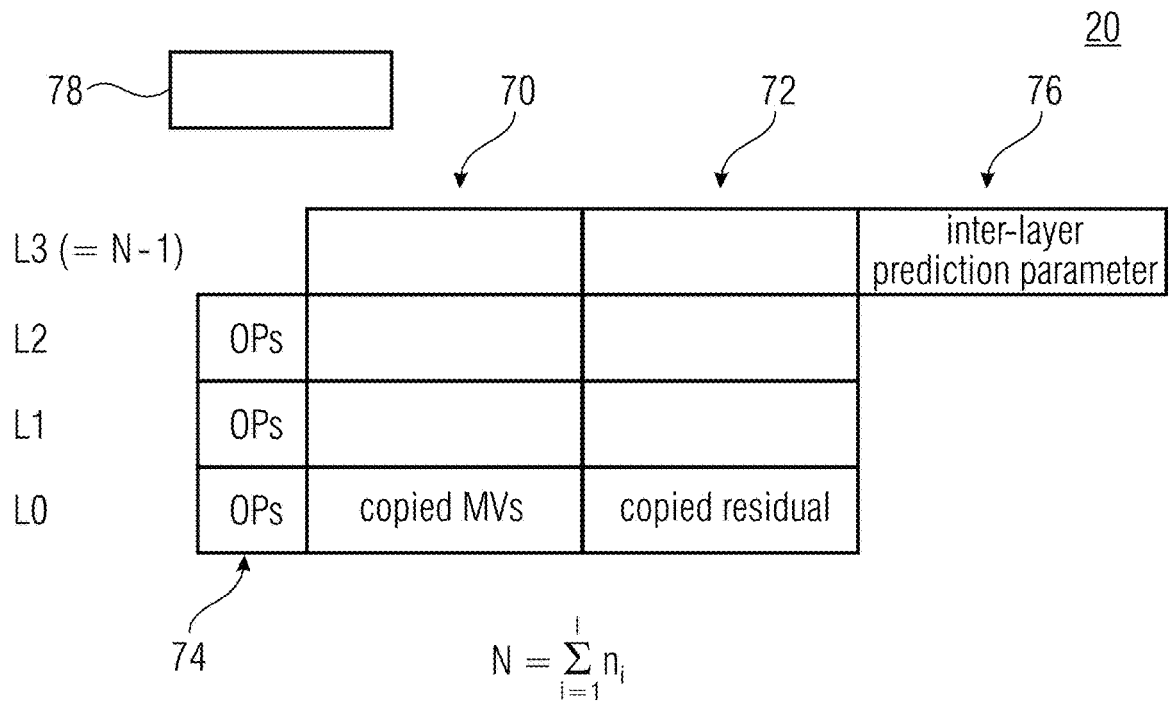
FIG. 7 shows a schematic illustrating the composition of a multi-layer data stream as output by a video streaming apparatus according to FIG. 1 in accordance with an embodiment conforming to the alternative 30.

For the sake of completeness, FIG. 7 shows a resulting multi-layer data stream 20 in accordance with the alternative 30 of FIG. 1. It comprises several layers L #, here exemplarily four layers 0 to 3, but any other number greater than one would be feasible as well. The lower layers, here L0 to L2, comprise prediction parameters such as motion vectors 70, which are copied from the coded version 12 of the input videos 14, and residual data 72 describing the prediction residual with same also being copied from the coded version of the video content. In accordance with the embodiment of FIG. 7, which relates to the alternative 30, the highest layer also comprises these types of information, i.e. copied prediction parameters such as motion vectors 70 and residual data 72, also copied from the coded version 12 of the input videos 14. Further, the multi-layer data stream 20 of FIG. 7 comprises offset parameters 74 for each of the lower layers, here L0 to L2, in order to describe how the pictures of the predetermined or highest layer L3 comprised of the MLCPs are scaled and located relative to the pictures of the lower layers L0 to L2. Last but not least, the multi-layer data stream 20 comprises, for the highest or predetermined layer L3, inter-layer prediction parameters 76 synthetically creating the composition in that they spatially add to the areas of the pictures of the highest or predetermined layer L3 coded by the copied prediction parameters 70 and residual data 72, picture content from lower layers L0 to L2. In the case of FIG. 7, the number of layers N, here N=4, corresponds to the sum of the number n=i of layers at which the I input videos are encoded into the coded version 12, i.e. $N=\Sigma_i n_i$. In particular, each layer L # of the multi-layer data stream 20 is associated with exactly one input video i, 0<i<I+1, and if applicable to exactly one of several layers of the respective input video i, with the mapping between layers L # of the multi-layer data stream 20 and the layers of the input videos being bijective. As far as the lower layers 0 to n−1 are concerned, they are interlinked via inter-layer prediction merely in units of groups of one or more layers belonging to the same input video. The highest or predetermined layer LN corresponds here to the highest layer of one of the input videos. As shown in FIG. 7, the multi-layered data stream 20 may additionally comprise a higher side information 78, an option content of which is explained in the following.

Figure 8:
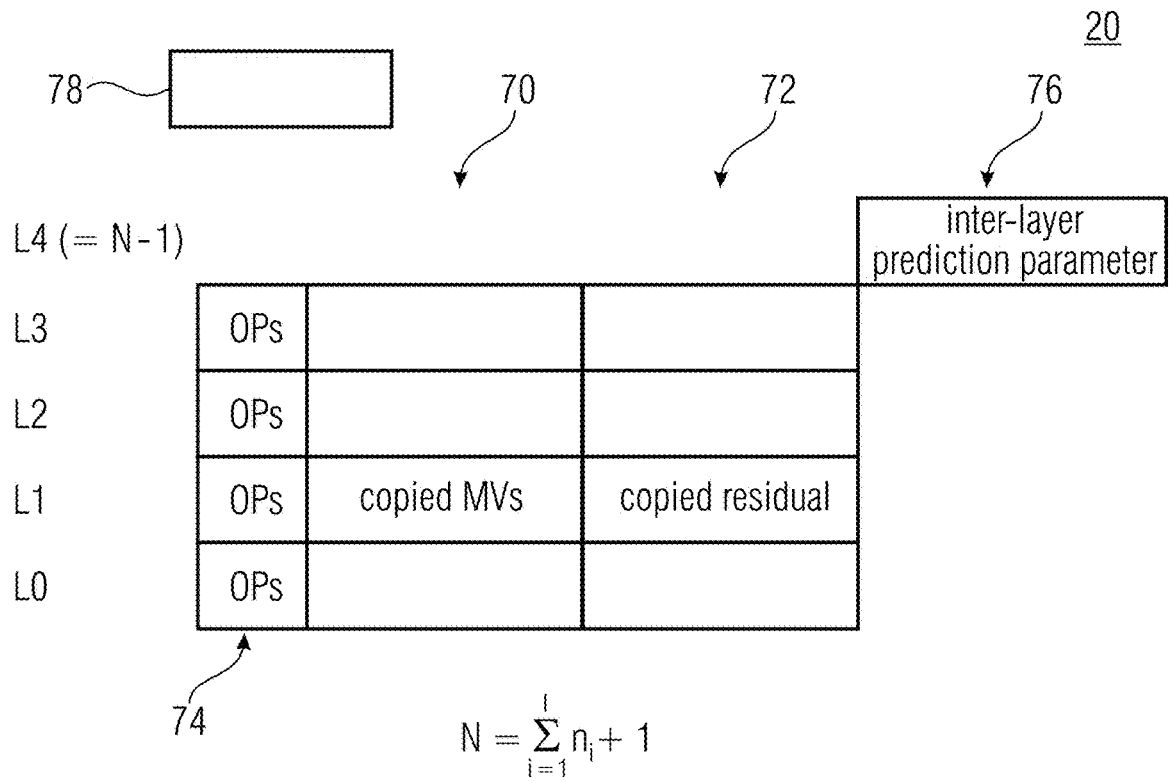
FIG. 8 shows a schematic illustrating the composition of a multi-layer data stream as output by a video streaming apparatus according to FIG. 1 in accordance with an embodiment conforming to the alternative 28.

FIG. 8 shows the content of a multi-layer data stream 20 as resulting in accordance with the alternative 28: the content almost coincides with the one shown in FIG. 7, except for the highest layer, which is layer L4 in the example of FIG. 8, which does not comprise copied prediction parameters or copied residuals 70 and 72, respectively. As the highest layer L4 is added in addition to those lower layers L0 to L3 obtained by copying prediction parameters 70 and residuals 72 from respective portions of the coded version 12 of the video content 14, the number of layers N of the multi-layer data stream 20 relative to the number of layers $n_i$ of the individual input videos i, with 0<i<I+1 is $N=\Sigma_i n_i+1$.

With respect to FIGS. 7 and 8 it should be noted that the relationship described with respect to these figures, namely between the number of layers of the multi-layered output data stream 20 and the number of layers of the input videos 14 may be, alternatively, such that the number of layers N of the multi-layered data stream 20 is lower than as shown in FIGS. 7 and 8. Some of the input videos may be stitched together spatially, for example, thereby reducing the number of layers of the multi-layer data stream.

Thus, in other words, a video stream comprising multiple layers and a signaling indicating multi-layered pictures of the video stream not using in a highest layer, i.e. highest layer of the video stream, or not using in any layer, i.e. in none of the layers of the video stream, TMVP. In addition to the signaling, a further signaling may be comprised by the video stream which indicates multi-layered pictures of the video stream coded using without motion-compensated temporal prediction. Additionally, the video stream may comprise, in addition to the signaling, an even further signaling indicating fur each multi-layered picture of the video stream, or at least the one not indicated as being coded without (in the respective layer (see above) TMVP, as to how far, measured in multi-layered pictures of the video stream in coding order, the next multi-layered picture of the video stream coded using without temporal motion vector prediction is away. The video stream may be a composed video stream according to any of the embodiments of the present application.

As described with respect to FIGS. 7 and 8, the multi-layer data stream 20 may be generated by apparatus 10 in such a manner that same comprises high-level side information 78. For instance, this side information 78 may, for example, signal the association of the layers of the multi-layered data stream 20 to the input videos 14 or, if any of same are coded in a layered manner into a respective portion 18 of the coded version 12 of the video content 14, to the layers of the input videos 16. Additionally or alternatively, the high level side information 78 may comprise a high level signaling providing a valuable piece of information, namely information on the current layout of the composition of the video content 14, i.e. on the current layout of the MLCPs in the predetermined layer of the multi-layer data stream 20.

That is, this information could signal which speaker, input video or group of one or more output layers of the multi-layer data stream 20 is associated with which area or region of the pictures (MLCP) of the highest (predetermined) layer of the multi-layer data stream 20. Additionally or alternatively, the high level side information 78 could comprise information about which input video 16 or speaker is available at which resolution or quality within the multi-layer data stream 20 in order to control recipient-controlled speaker or layout changes. Another valuable piece of information which could be comprised by the high-level side information 78, either additionally or alternatively, could concern the above-described "TMVP random access" issue. This is described with respect to FIG. 9.

Figure 9:
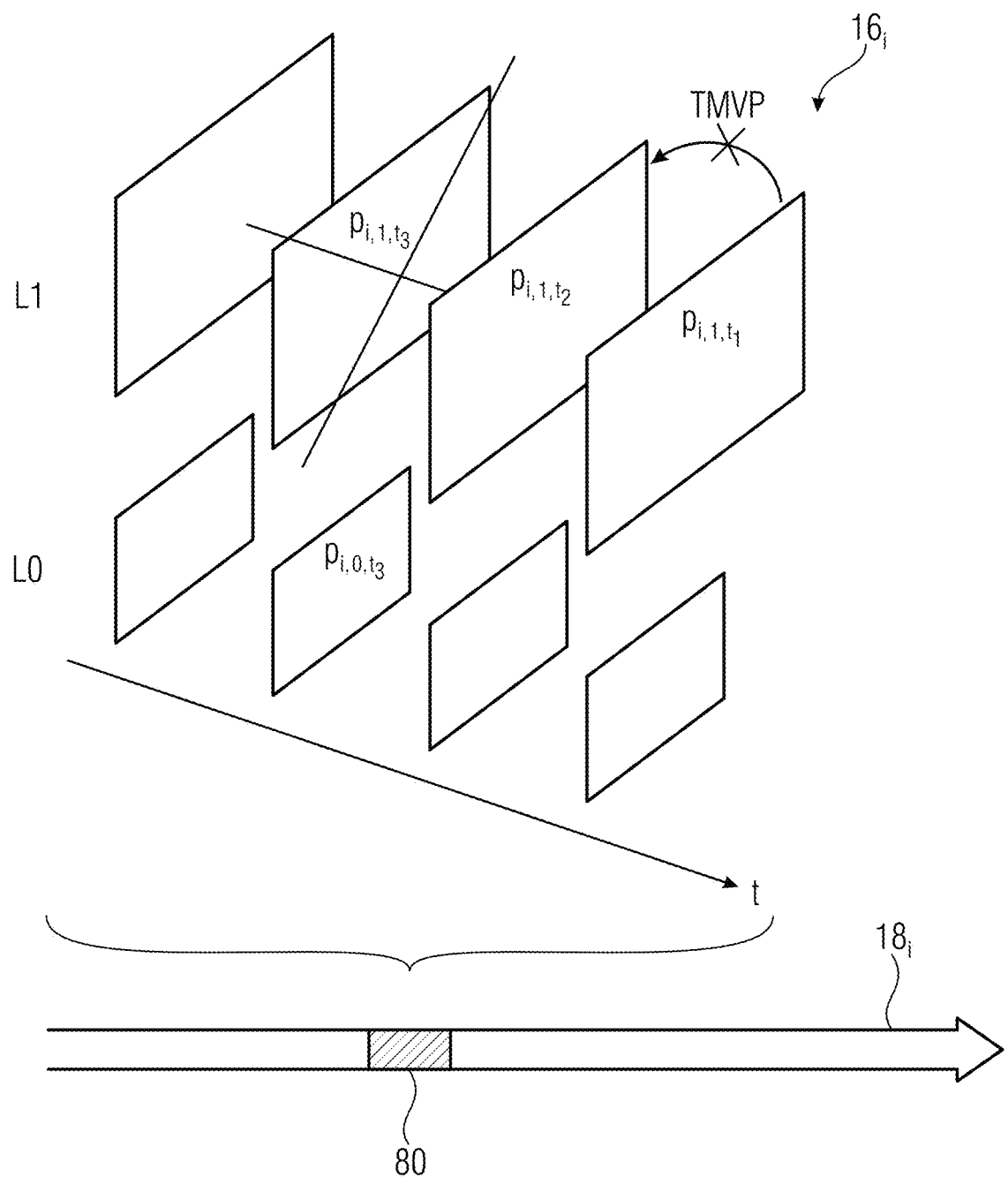
FIG. 9 shows a schematic diagram of an inbound stream of the video content of FIG. 1 illustratively encoded, in two layers, into a respective version of the coded version on the basis of which the video streaming apparatus of FIG. 1 performs the video composition, with illustrating the data stream as comprising side information indicating pictures in the highest layer not using TMVP, with the same side information possibly used in the multi-layered data stream output by the apparatus of FIG. 1.

FIG. 9 shows one exemplary input video 16, encoded into a respective portion 18, of the coded version 12 of the video content 14 in a layered manner, namely here exemplarily involving two layers $n_i=2$. In order to distinguish the layer indices of input video $16_i$ from the layer indices of the layers into which the layers of video $16_i$ are multiplexed into the layers L # of the multi-layered output data stream 20 by copy former 22 of apparatus 10, the layers of input video $16_i$ are indicated with I #. The pictures of video $16_i$ as encoded into portion $18_i$ shall be denoted $p_{i,I,t}$ with index i denoting/indexing the video $16_i$, index I indexing the input video's layer, i.e. exemplarily I0 or I1, and index t indexing the time instant of the picture. Let us further assume that the pictures of the highest layers, here I1, of input video $16_i$ are coded into portion $18_i$ using temporal prediction as well as inter-layer prediction, and that even temporal motion vector prediction (TMVP) is used, i.e. the motion compensation prediction data for one picture $p_{i,I,t_1}$ is temporally predicted from the motion compensation prediction parameters for picture $p_{i,I,t_2}$ with $I=n_i-1$, i.e. the higher layer, here I1 in the case of FIG. 9. Portion $18_i$, such as for example the layered input data stream conveying video $16_i$, may indicate by way high level side information 80 pictures of its highest layer, I1, for which TMVP is not used. The apparatus 10 of FIG. 1 may use this information 80 advantageously: imagine, during the transmission of portion $18_i$ to apparatus 10, data within portion $18_i$ concerning picture $p_{i,1,t_3}$ would get lost. Picture $p_{i,1,t_3}$ would use TMVP on the basis of picture $p_{i,1,t_3}$ but side information 80 would signal that picture $p_{i,1,t_1}$ would not use TMVP. As layer I1 is the highest layer of video $16_i$, a picture content thereof participates in the composition of the content of multi-layered video stream 20, either by way of inter-layer prediction copying according to alternative 28 or according to alternative 30 for the cross-hatched portion of the highest output layer of the multi-layered data stream, or directly in that layer I1 is multiplexed by copy former 22 to the highest layer of the multi-layered data stream 20 directly in accordance with the alternative 30. It is a relatively easy task for synthesizer 24 to compensate for the loss of picture $p_{i,1,t_3}$, the synthesizer 24 may alternatively use the lower layer picture $p_{i,0,t_3}$ for the composition synthesis. That is, the respective area into which the picture content of picture $p_{i,1,t_3}$ would have been coded by copy former 22 directly or by way of inter-layer prediction by synthesizer 24 would be replaced by an inter-layer prediction copy from lower layer picture $p_{i,0,t_3}$ instead. Now, the apparatus 10 would inspect information 80 and realize that picture $p_{i,1,t_2}$ uses TMVP, i.e. is not indicated as not using TMVP. However, since the motion vector prediction parameters for picture $p_{i,1,t_3}$ is lost and has merely been "substituted" with respect to its picture content, synthesizer 24 keeps on substituting the composition synthesis on the basis of the lower layer also with respect to this picture $p_{i,1,t_2}$, i.e.

synthesizer 24 uses picture $p_{i,0,t_2}$ for the composition synthesis as a substitute. As information 80 indicates, however, that picture $p_{i,1,t_1}$ does not use TMVP, synthesizer 24 may stop substituting the composition synthesis on the basis of the highest layer of input video $16_i$ at picture $p_{i,1,t_1}$, i.e. synthesizer 24 may use the picture content of the picture in the composition synthesis directly.

Additionally, side information 80 could indicate for each picture $p_{i,J=1,t}$ not being indicated as not using TMVP as to how many pictures within layer I1 separate this picture from the next picture of layer I1 not using—in the highest layer or in any layer—TMVP. By this manner, apparatus 10 may more easily plan the substitution process just described. In a communication service scenario, for example, presence of information 80 could prevent a communication end point from requesting other end points to send bitrate-wise costly IDR pictures, i.e. reset the of the complete prediction tool chain, as a bitrate-wise less costly TMVP resetting picture can be expected soon thereafter.

The apparatus 10, in turn, may copy this side information 80, embedded into side information 78, into the multi-layered output data stream 20. A decoder which receives data stream 20 may, on the basis of this information 80 in data stream 20, extend the substitution procedure in the decoding process of decoding the multi-layered data stream 20.

Alternatively, side information 80 is not already comprised by portion $18_i$ generated by apparatus 10 so that this information is contained within high-level side information 78 of the multi-layer data stream 20.

The information 80 may be present in the form of SEI messages. The SEI message may describe when the TMVP reset occurs. Even further SEI messages may describe how many pictures may be further decoded when the copy slice is used at the highest layer as referenced instead of the original EL slice so that after so many pictures if no random access happens the content of the highest EL is substituted by copy slices.

Figure 10:
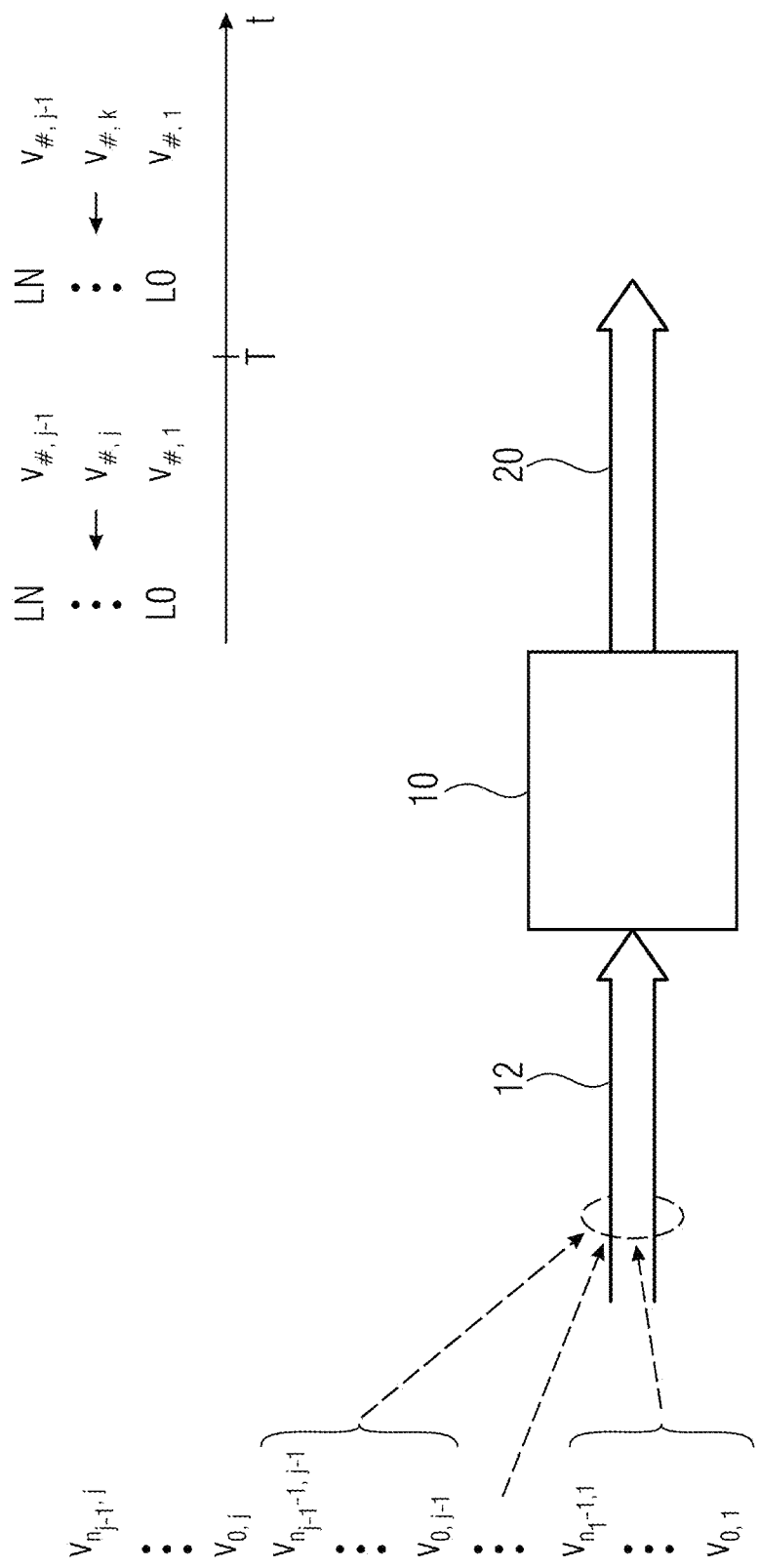
FIG. 10 shows a block diagram illustrating the video streaming apparatus of FIG. 1 in accordance with an alternative where the videos participating the video composition change.

For the sake of completeness, FIG. 10 shows that the apparatus 10 may be configured such that this apparatus is able to cope with a new video to be incorporated into the composition represented by the outbound multi-layered video data stream 20. FIG. 10 depicts apparatus 10 as receiving coded representations of J videos, each of the videos comprises $0>n_j$ layers with $0<j<j+1$. In synthesizing the composition, however, apparatus 10 changes the set or subset of videos participating in making up the composition. FIG. 10, for example, illustrates that at some predetermined point in time T the participating videos change. While before time instant T, exemplarily videos J−1, j and 1 participate in forming the multi-layer data stream 20 in accordance with the technique outlined above with respect to FIGS. 1 to 9, videos J−1, k≠j, and video 1 participate after time instant T. For example, an operator, such as the video conference leader, decides to switch from non-speaker associated with video j to another non-speaker associated with video k. In that case, apparatus 10 may be configured to execute the operator's command to newly encompassed video k in the subset of participating videos at the next occasion, from the receipt of the operator's command on, where video k is intra coded, i.e. without any temporal prediction. By this measure, apparatus 10 is able to seamlessly switch from the composition involving videos J−1, j and 1, to the composition involving videos J−1, k and 1.

The issue of including a new video into the subset of videos participating in compositing the composition of a certain video content is the subject of the subsequently exemplified aspect of the present application. In the following description, this problem is generalized and exemplified with respect to a certain application, namely an application concerning the streaming of a composited video stream showing a time-variant fraction out of a panorama view, the panorama view being distributed over a plurality of videos. However, the embodiments described next could also be suitable for allowing apparatus 10 of FIGS. 1 to 10 to change the subset of participating videos at time instances where actually no intra-coded random access situation/time instant exists. The subsequently outlined embodiments are even applicable in case of applying video composition onto one or more videos coded using an open GOP structure where intra-coded pictures which merely form references for pictures following in presentation time order, do not even exist. Rather, as explained below, in open GOP structures, such intra-coded pictures serve both as temporal prediction reference for pictures preceding and succeeding in presentation time order. Here, the embodiments described below form the only possibility to seamlessly transition from one set of participating videos to another set of videos participating in the composition synthesis.

In order to express the problems just outlined in more detail, a brief introduction to multi-layer panorama streaming is presented. Panoramic video describes video content with a viewing angle larger than used in traditional 2D video services and up to 360°, for example. The transport of such content, or the relevant parts thereof, to end points such as browsers, video walls or head mounted displays, is a challenge for established transport schemes and systems in terms of bandwidth and latency. The respective applications in entertainment, gaming or surveillance further narrow down the surrounding conditions under which the transport of such content may occur, e.g. live streaming.

For a large-scale panorama streaming service, it is vital to minimize per-user processing of the media for the sake of scalability. Therefore, the concept of tile based streaming in HEVC [1] and different approaches for related compressed domain processing were established. For example, instead of video live-encoding for every user depending on his region of interest, i.e. the transmitted and/or displayed area of the panoramic video, an equivalent video can be stitched together in the compressed domain out of adequately encoded HEVC video tiles with very few computational resources. Further techniques as introduced in [2], allow handling changes of the region of interest (RoI switching) efficiently, i.e. with transmission of additional video content, i.e. panorama video areas that were previously not visible, under the latency constraints of a live service can easily disrupt the user experience.

Approaches using simulcast of a low- and a high-resolution panorama have been used previously in such systems and have proven to be very valuable to deal with latency and bandwidth demands [5]. Therefore, scalable video codecs such as SHVC are expected to provide benefits in the area.

Figure 11:
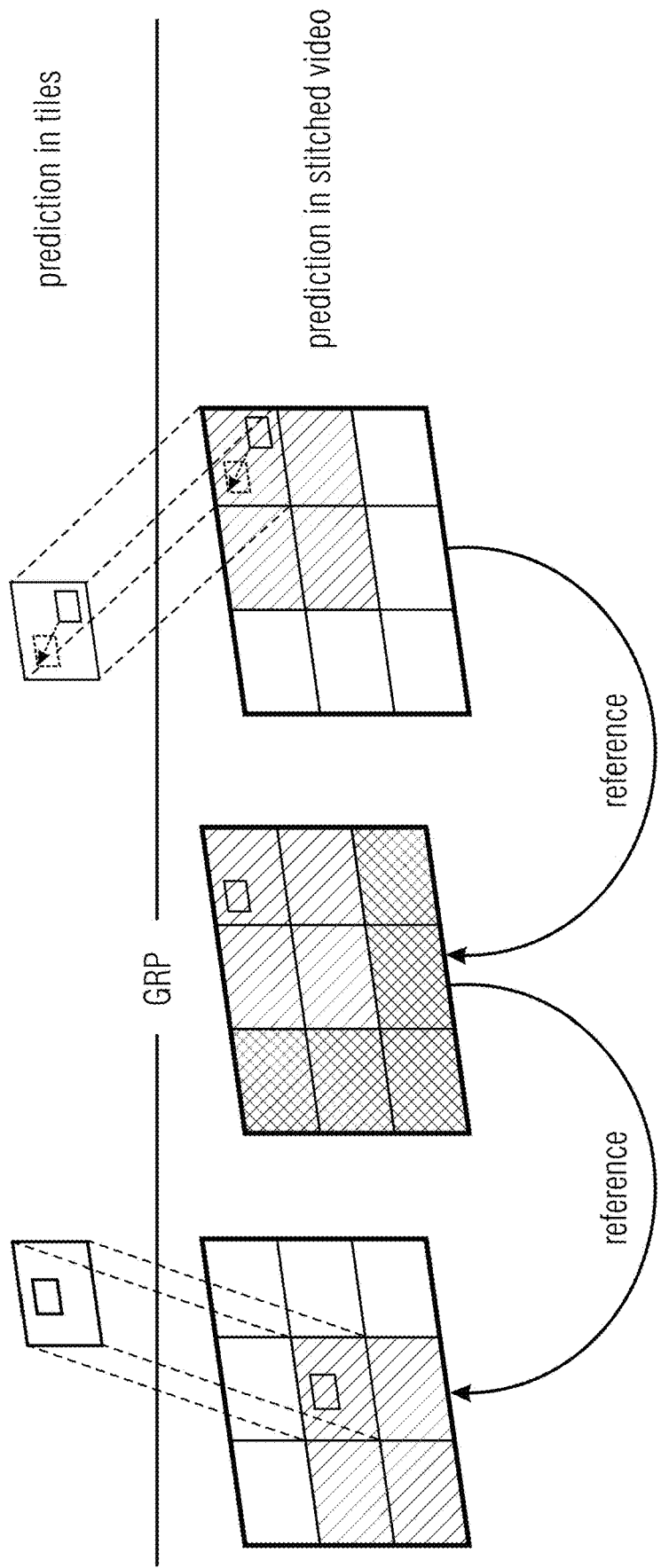
FIG. 11 shows a schematic diagram illustrating the GRP concept.

The embodiments outlined further below introduce the concept of generated reference pictures as explained in the following to multi-layer video codecs and allow for more efficient handling of RoI switching in terms of bandwidth or latency. In [2] the concept of Generated-Reference-Pictures (GRPs) was introduced in the context of single layer Panoramic Streaming to reduce the bitrate increase in RoI switching points when tile-based panoramic streaming is used. FIG. 11 illustrates the principle of GRPs, i.e. pictures that perform a displacement of the content of a regular reference picture so that following pictures can use temporal prediction of the tiles (i.e. regions of the video) that were previously received and are subject to a spatial displacement in the composed/stitched video (dashed blocks) during the streaming switching point. GRPs are only used for reference and are not output.

Thus, by using GRPs, the necessity of sending a full intra picture for all displaced tiles is avoided and temporal prediction can be used for some tiles, namely those concerned with picture content already present before the RoI change, but at a different position, thus reducing the transmission bitrate used.

Figure 12:
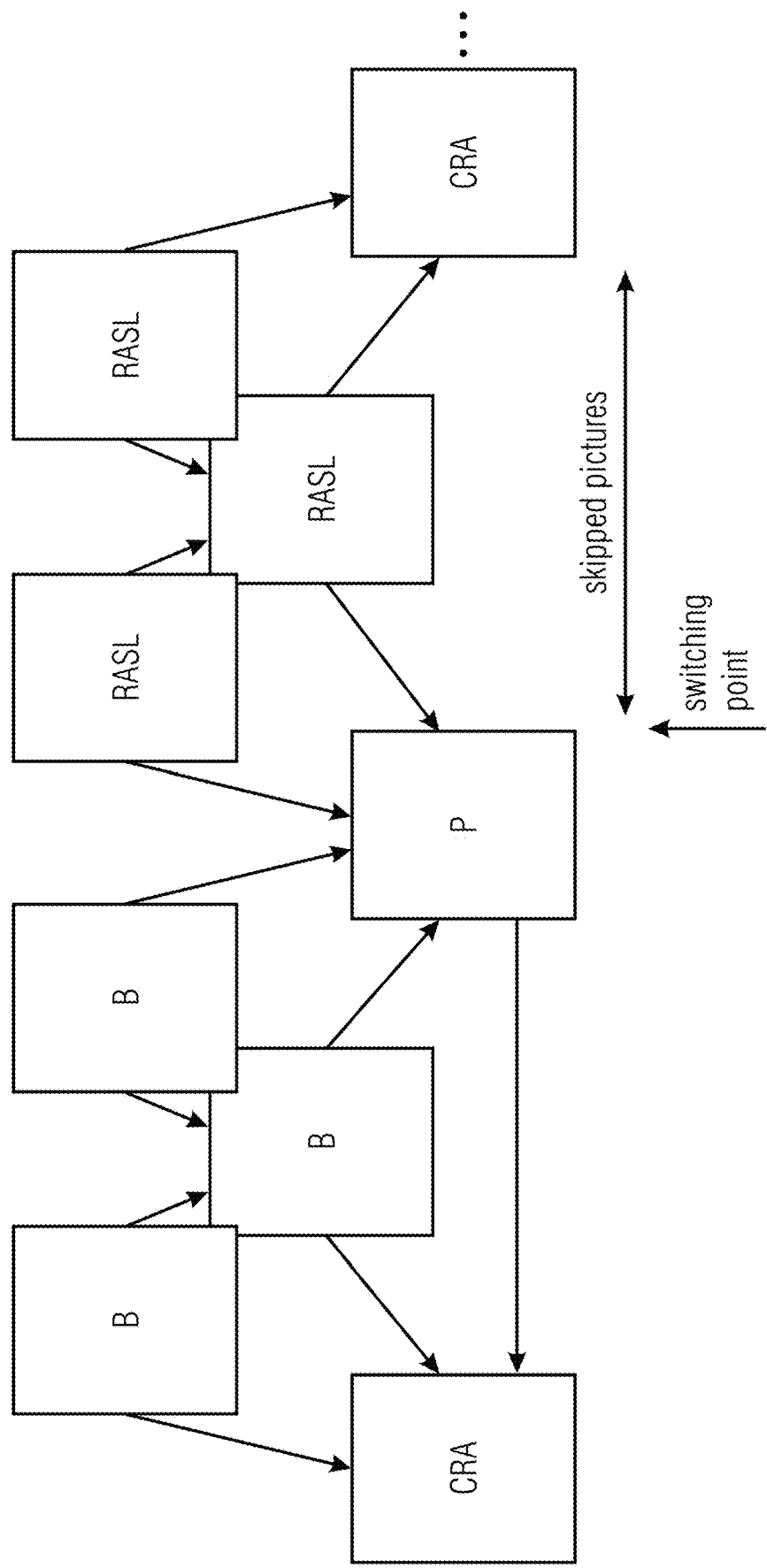
FIG. 12 shows a schematic diagram illustrating an open GOP structure following HEVC picture naming.

The embodiments described further below thus provide a solution, inter alias, for panorama streaming. They use scalable or multi-layer video technology. Particularly, these embodiments also provide a solution for the case that open GOP structures are used. Such open GOP structures allow, for example, a higher compression efficiency [6] of the streams while providing mid-stream decoding access, i.e. so-called random access. FIG. 12 shows a possible encoding (GOP) structure for open GOP. The pictures of the video are shown in FIG. 12 in their presentation time order from left to right. Arrows are used in order to show temporal predictions. As in the other figures, the arrows point from the reference sink or inheritor to the reference source, i.e. from the picture predicted using temporal prediction to the picture referenced by temporal prediction. An exemplary event of tuning-in or joining the service, i.e. start of decoding the video in FIG. 12, may be referred to as random access and is exemplarily depicted in FIG. 12 as "switching point". As can be seen from FIG. 12, if a random access event occurs at the second CRA picture (the right one in FIG. 12) all pictures preceding it in presentation time order, but that depend on the CRA and additionally on a previous picture (marked as P in FIG. 12), are skipped picture that are not decoded or shown. Such an approach has shown to be very efficient and provides a higher compression efficiency in comparison to what is called closed GOP structures that use IDRs for the same functionality and break prediction to the past. Although for resuming decoding mid-stream as in tuning-in to a new channel such an approach is very useful, skipping pictures is not a valid procedure when switching is performed in context of adaptive or interactive streaming. Each time such a switching event, i.e. change of displayed Region of Interest (RoI), occurs it is not acceptable to use a technique that forces to discard pictures as continuous video is displayed throughout the switching event, albeit displaced through the switching event.

Figure 13:
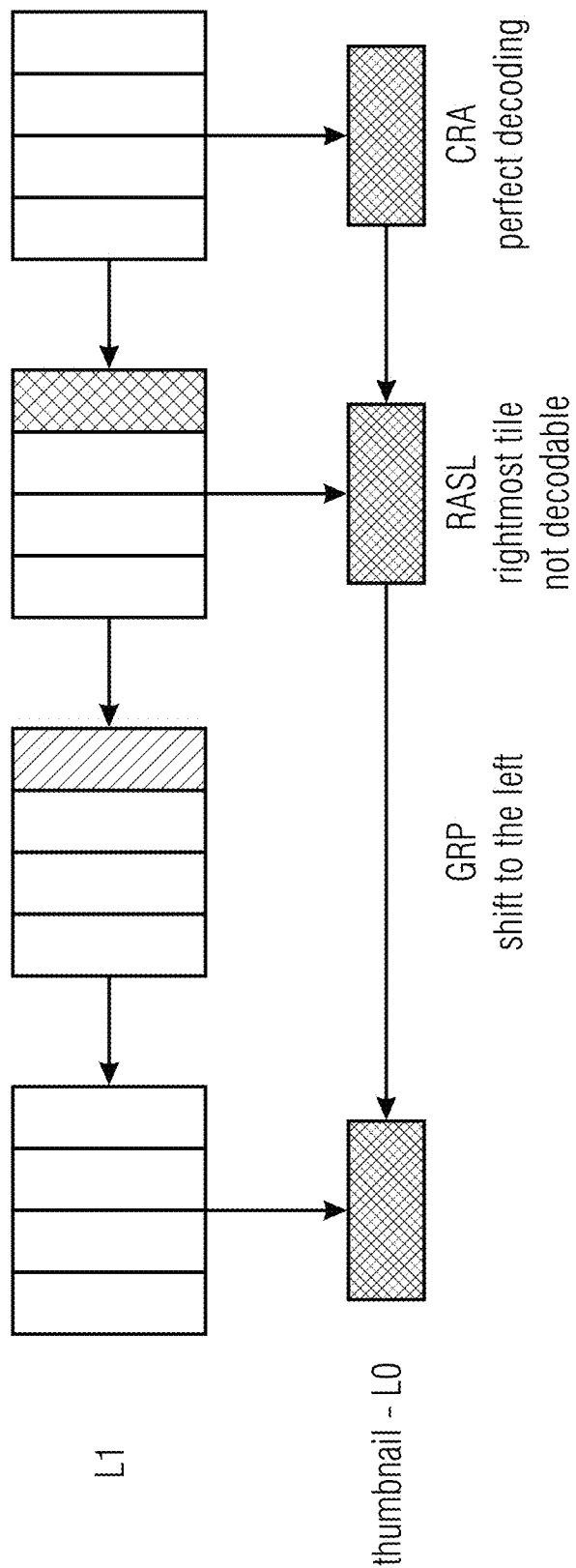
FIG. 13 shows a schematic diagram of an open GOP structure in order to illustrate the problem of open GOP in connection with tile-based panorama streaming with GRPs.

FIG. 13 shows the effect open GOP would have in panorama streaming when tile-based streaming with GRPs would be considered. In this case a scalable video is considered where the base layer (L0) corresponds to a thumbnail representation of the whole panorama video that is used as reference for the RoI, which is formed by the selected tiles in L1. As shown in FIG. 13, where the figures of layer L1 are horizontally subdivided into four tiles, the GRP would perform a shift to the left at the highest layer (L1 in the figure) of the original tiles. As explained in [2], the rightmost tile, depicted in a hatched manner, would contain the picture border extension of the former reference frame or other meaningless content. This corrupted area cannot be used as meaningful reference for the new tile added in the following picture in presentation time order (RASL) picture, depicted in a cross-hatched manner. Therefore, a closed GOP representation with RAP functionality for the rightmost tile depicted in a cross-hatched manner would be entailed, which would force to also use a closed GOP structure for all tiles so that stitching can be performed, at the cost of reduced coding efficiency. If an open GOP structure would be used, the picture area depicted in cross-hatched manner of the following RASL picture (the second from the right hand side) would use the corrupted area as reference represented by the normally hatched box in FIG. 13 leading to a further corrupted content or decoding drift. In order to tackle this problem and allow for open GOP switching, the subsequently explained embodiments use the base layer as a reservoir from which the regularly hatched one in FIG. 13 may be derived by inter-layer prediction using, for example, copy slices. A direct copy slice is, as outlined above, a direct copy of the picture content of the picture in a lower layer via an inter-layer prediction. Such a direct copy slice may consist of large prediction blocks with a given static motion vector that points to the samples of the intended region of the lower layer picture.

Figure 14:
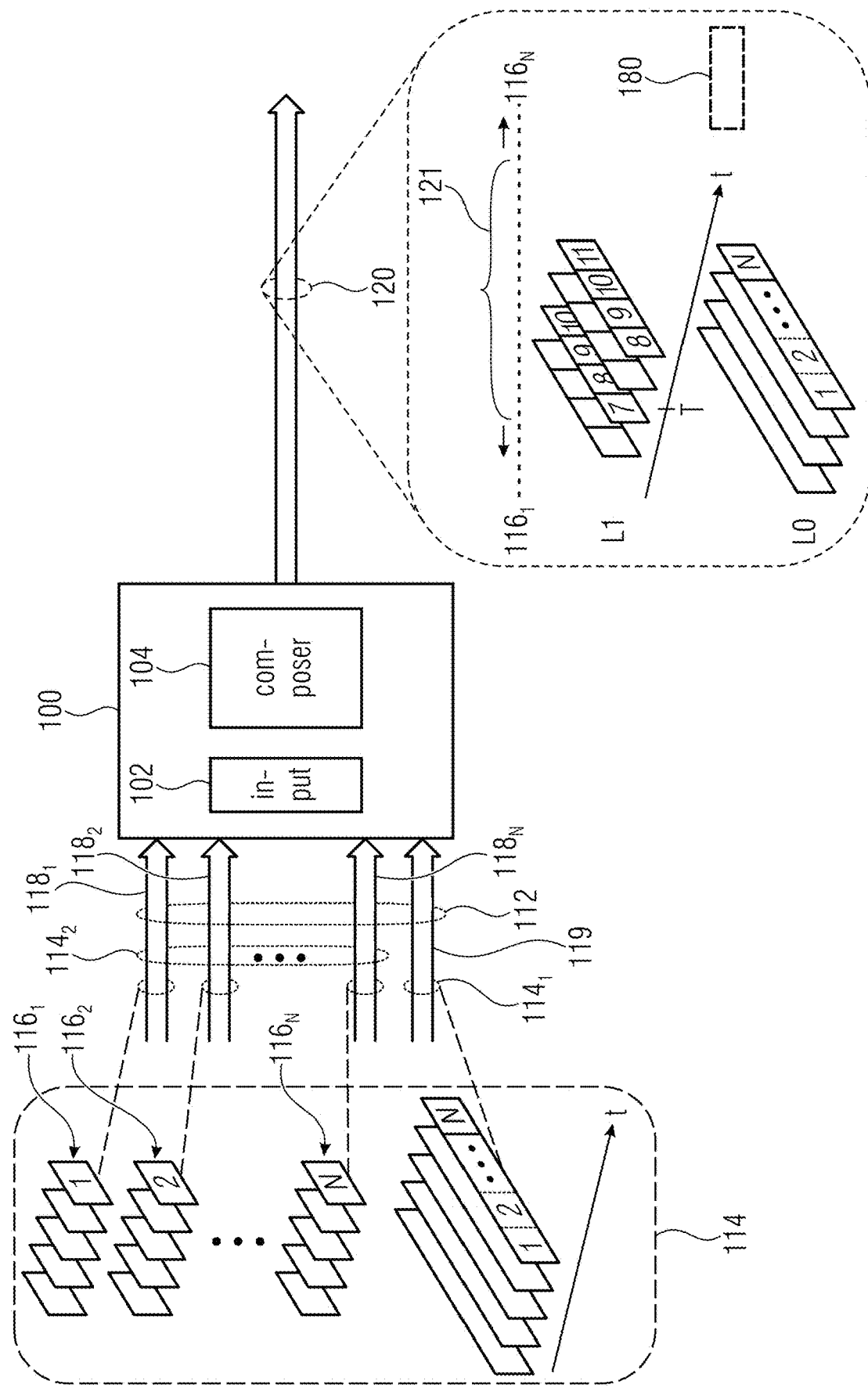
FIG. 14 shows a block diagram of a video streaming apparatus using a multi-layered composition video stream accompanying a subset of enhanced quality videos with a base layer containing a collection of the videos at base quality so as to allow for temporally changing the proper subset of videos carried in the enhancement layer without picture loss.

FIG. 14 shows a video streaming apparatus 100. It comprises an input 102 and a composer 104. As far as the implementation is concerned, the notes provided above with respect to FIG. 1 are valid for FIG. 14 as well. That is, the video streaming apparatus of FIG. 14 may be implemented in hardware, programmable hardware or software. For example, the input 102 may form a software interface with composer 104 representing a portion of a computer program implementing the functionality thereof. Alternatively, input 102 may be one or more video inputs with module 104 being implemented in software, programmable hardware or as an application specific integrated circuit.

The input 102 receives a coded version 112 of a video content 114, the coded version 112 comprising a first portion $114_1$ having encoded thereinto a collection/set of videos $116_1$ to $116_N$ and a second portion $114_2$ having encoded thereinto the videos $116_1$ to $116_N$ at an enhanced quality, e.g. increased resolution measured in, for example, number of pixels, compared to the base quality at which the collection of videos is encoded into the first portion $114_1$. The videos $116_1$ to $116_N$ may be encoded into the second portion $114_2$ using or not using inter-layer prediction from the first portion $114_1$.

Similar to the description of FIG. 1, the second portion $114_2$ may be composed of one video data stream $118_1$ to $118_N$ per video $116_1$ to $116_N$ and the first portion $114_1$ may comprise a video data stream 119 having encoded thereinto pictures of the videos in a manner spatially stitched together as illustratively shown in FIG. 14. In particular, FIG. 14 shall illustrate a possible situation according to which each of the videos $116_1$ to $116_N$ is associated with a respective fraction of a panorama view, i.e. a situation according to which the videos belong to a common scene, each video capturing a certain fraction of the panorama view. That is, the videos $116_1$ to $116_N$ may have a spatial interrelationship inherently defined thereamong, such as the fact that these videos capture a sequence of horizontally distributed fractions of a common panorama scene.

The composer 104 is configured to compose a video stream 120 representing a composition of a proper subset of the videos $116_1$ to $116_N$ at the enhanced quality. As illustrated in FIG. 14, the proper subset 121 may, for instance, be of a constant cardinality, i.e. may have a constant number n<N of the videos $116_1$ to $116_N$, such as n videos pertaining to fractions of the panorama view neighboring each other so as to form a contiguous portion of the panorama view. For example, the index of the videos $116_1$ to $116_N$ coincide with the order of the fractions of the panorama view captured by the respective video, then the subset 121 covers a contiguous subsequence of the sequence of videos $116_1, 116_2 \ldots 116_N$. However, it should be recalled that the videos $116_1$ to $116_N$ could not have any spatial relationship defined thereamong, such as, for example, in the case of the videos pertaining to different participants of a video conference call.

The composer 104 is configured to compose the video stream 120 as a multi-layered video stream comprising a base layer L0 derived by copying from the first portion $114_1$, and one or more enhancement layers, with merely one layer L1 being shown in FIG. 14 for illustration purposes, derived from copying from a fraction of the second portion $114_2$ which relates to the proper subset 121 of the videos. For example, the fraction of the second portion $114_2$ is made up of those video data streams $118_1$ to $118_N$ into which the videos of proper subset 121 are encoded. That is, composer 104 operates in the compressed or coded domain so as to multiplex the subset 121 of videos into the one or more enhancement layers of data stream 120. In principle, the number of videos in subset 121 may vary in time. In any case, the number of videos in subset 121 may be equal to 1 or may be greater than 1. In composing the video stream 120 so as to represent a composition of the proper subset 121, composer 104 may act similar to the video streaming apparatus of FIG. 1: multiplexing the videos of subset 121 in decoded or compressed domain into respective lower layers of the enhancement layers of data stream 120 with either spending an additional highest layer or reusing a highest layer of these enhancement layers as MLCP domain, i.e. as the predetermined layer within which the composition of the proper subset 121 is synthesized. Alternatively, composer 104 spatially multiplexes the videos of subset 121 into the pictures of the enhancement layer L1, i.e. in the one enhancement layer, as it is exemplarily depicted in FIG. 14. For example, composer 104 spatially subdivides the pictures of this enhancement layer L1 into tiles so as to steer the coding order traversing the pictures of enhancement layer L1 in a manner so that the majority of the encoded representations 118 of the videos within proper subset 121 may simply be copied into the enhancement layer of data stream 120 so as to result into the composition of the proper subset 121.

The composer 104 of FIG. 14 supports a change of the proper subset 121, i.e. supports at time variance of proper subset 121 as illustrated by arrows besides the curly bracket illustrating the proper subset 121 in FIG. 14. In particular, composer 104 supports a change of the proper subset 121 at a predetermined time instant so that the proper subset newly encompasses a newly encompassed video not encompassed by the proper subset 124 before the predetermined time instant. For example, see FIG. 14, where time instant T shall denote a time instant from which onwards video 11 is newly encompassed by the proper subset 121, whereas this video is not encompassed by proper subset 121 before the time instant T.

As already described above, the problem with such newly encompassed videos or newly participating videos is that reference pictures of that video needed for temporal prediction purposes are missing, namely those which lie, in temporal coding order, prior to the unsent picture of the newly encompassed video. In the case of open GOP structures being used for encoding videos $116_1$ to $116_N$, the missing of such reference pictures may even be unavoidable.

Accordingly, in order to address this issue, composer 104 supports the just mentioned change of proper subset 121 in one of the following two manners.

Figure 15A:
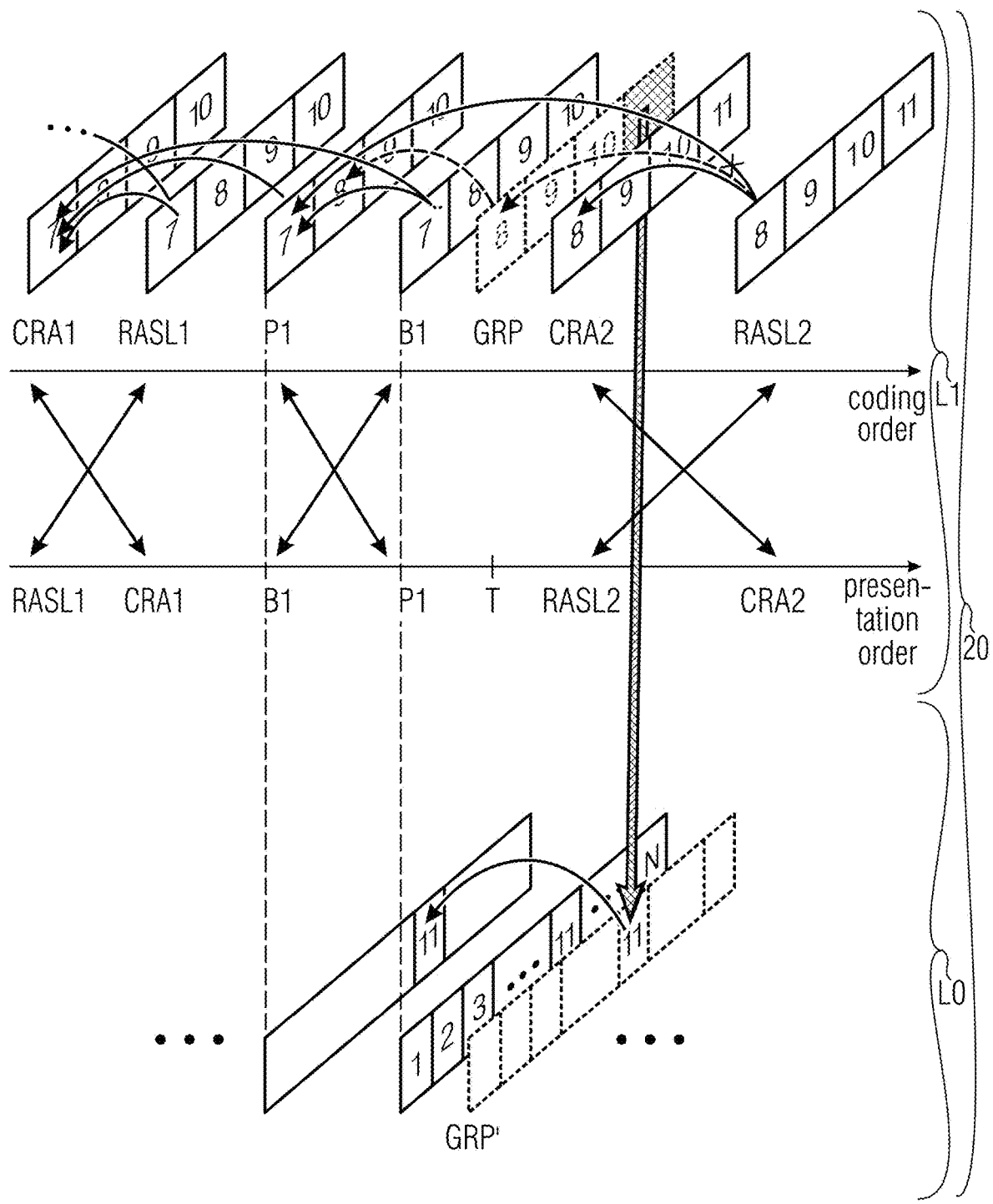
FIG. 15a shows a schematic diagram illustrating the structure of the multi-layered video data stream generated by the apparatus of FIG. 14 in accordance with an embodiment.

In order to illustrate the first alternative according to which composer 104 operates, reference is made to FIG. 15a, which shows the composed video stream 20 in accordance with the example depicted in FIG. 14. That is, the data stream 20 is generated by composer 104 such that same comprises one enhancement layer L1 in addition to the base layer L0, wherein the proper subset of videos is conveyed within the enhancement layer in a spatially stitched manner, i.e. the proper subset of videos is multiplexed into spatial subportions of the pictures of the enhancement layer L1. FIG. 15a shows a temporal interval of the composed video of data stream 120 involving six consecutive pictures of enhancement and base layer in presentation time order. In FIG. 15a, the videos 116 are assumed to have been coded using an open GOP structure, even though, as indicated above, the advantages of the embodiment of FIG. 15a are not restricted to open GOP structures. All inbound videos 116 are assumed to have been coded using the same open GOP structure. In presentation time order, the depicted temporal interval encompasses pictures RASL1, CRA1, B1, P1, RASL2, CRA2. CRA # pictures are intra coded. RASL # pictures reference, via temporal prediction, a CRA # as well as a P # picture, wherein the respective RASL # picture switches its position with the referenced CRA picture as far as the coding order is concerned. B # pictures also reference, via temporal prediction, a CRA picture as well as a P picture, but switch their position with the referenced P picture as far as the coding order in data stream 20 is concerned. In FIG. 15a, it is assumed for illustration purposes that a change of the proper subset of videos changes at time instant T, namely along presentation time order between pictures P1 and RASL2. While before this instant T videos 7 to 10 participate in the composition of the enhancement layer L1 of the output data stream 20, the proper subset comprises videos 8 to 11 after this temporal time instant T. Up to the composition change time instant T, the composer simply multiplexes videos 7 to 10, in the compressed or coded domain, i.e. by copying from the coded version 12, onto respective spatial tiles of the pictures of enhancement layer L1. Each video 7 to 10 retains its position within these pictures prior to, in presentation order, the switching time instant T. Accordingly, the copied motion vector parameters copied from the coded version 112 are correctly applied. The videos are spatially stitched in the pictures of the enhancement layer. Again, other methods of multiplexing several layers within the proper subset into the data stream 20 would be feasible as well and the number of videos within the proper subset may also be one. In the present example, however, which could be used for changing the RoI in a panoramic scene, three of the videos, namely videos 8 to 10, remain within their participating videos, i.e. within the proper subset 121, whereas video 7 is no longer a member of the subset and video 11 is newly encompassed by the subset. As far as the picture CRA2 is concerned, the spatial shift in the position where videos 8 to 10 are depicted in the pictures of the enhancement layer L1 after the time instant T is of no issue, because motion prediction is not applied to encode the picture content of videos 8 to 10 in picture CRA2. Synthesizer 24 may, however, adjust offset parameters in order to perform a spatial alignment between the areas within which videos 8 to 10 are located in picture CRA2 relative to the pictures of the base layer in case of videos 8 to 10, also using inter-layer prediction from the base layer. The newly encompassed picture of video 11 in CRA2 of enhancement L1 may also be performed by direct copying while remaining in the compressed or coded domain due to the intra-coding, i.e. non-temporal coding, thereof. The situation changes with picture RASL2. Picture RASL2 also belongs to a presentation time instant after the switching time instant T and has picture CRA2 as well as picture P1 as temporal prediction reference picture. Among pictures CRA2 and RASL2, there is no problem since there is change of the composition between these pictures. However, this is different with respect to the pair P1 and RASL2. Here, videos 8, 9 and 10 are present in both pictures P1 and RASL2, but at spatially displaced locations, and video 11 is present in RASL2, but it is not in picture P1. In order to account for the location displacement, composer 104 inserts a picture GRP into the data stream 20, which is a no-output picture, i.e. it is indicated in the data stream 20 as being not to be presented. Rather, it shall merely serve as a reference picture. In particular, the picture GRP shall substitute picture P1 as far as the latter's role as reference picture for picture RASL2 is concerned. That is, as shown by a cross of the respective curved arrow drawn with a continuous line in FIG. 15a, composer 104 adjusts the data stream 20 such that RASL2 uses picture GRP as a reference picture instead of picture P1. The picture GRP is synthesized or filled by composer 104 at the areas at which videos 8 to 10 are located after the switching time instant T within the pictures of the enhancement layer L1 by temporal copying, i.e. by means of temporal prediction from the corresponding area of the substituted reference picture P1, within which videos 8 to 10 are located prior to the temporal time instant T. The filling or synthesis of picture GRP as far as the areas of videos 8 to 10 after time instant T is concerned, is readily performable at relatively low bit consumption, as merely a translatory shift of the areas of videos 8 to 10 from before to after the switching time instant T is to be coded.

The task of filling the remaining area of GRP indicated in a cross-hatched manner in FIG. 15a, which area corresponds to the position of video 11 in RASL2, is solved by composer 104 in the following manner. In particular, composer 104 fills this area by coding using inter-layer prediction from a corresponding portion of the picture of the base layer L0, i.e. the panoramic picture. To this end, synthesizer 24 inserts, for example, a corresponding GRP base layer picture called GRP' in FIG. 15a into the base layer L0, fills this picture GRP' using temporal prediction using a constantly zero motion vector field from the picture content of the base layer picture corresponding to P1 and copies/fills the cross-hatched area of GRP of layer L1 using inter-layer prediction from the portion of GRP' corresponding to video 11. The effect is that the area corresponding to video 11 in picture RASL2 which is coded, via temporal prediction, on the basis of the content of picture GRP within the cross-hatched area now has at least a good approximation of this content via the portion corresponding to video 11 in the base layer picture corresponding to the time instant of the formerly appointed reference picture of video 11, which is, however, not present in data stream 20 due to the composition change at time instant T.

With respect to FIG. 15a it should be noted that composer 104 may alternatively be construed such that same splits up the GRP shown in FIG. 15a into two GRPs, one performing the area shift of videos 8 to 10 with a cross-hatched area remaining uncoded, which serves as reference picture for the coded areas of picture RASL2 carrying videos 8 to 10, and another GRP picture filled in a "don't care" manner as far as the areas concerning the new locations of videos 8 to 10 are concerned, but filled using inter-layer prediction on the basis of the base layer as outlined above as far as the cross-hatched area is concerned, i.e. the area at which video 11 is depicted in the pictures of enhancement layer L1 after the switching time instant T so as to assume the role of the reference picture for the coded area of picture RASL2 carrying video 11.

That is, in the case of composer 104 of FIG. 14 operating in accordance with the example of FIG. 15a, the composer 104 subdivides the pictures of enhancement layer L1 of the output multi-layer data stream 120 into a fixed number s<N, here exemplarily s=4, regions or tiles into which the time varying proper subset 121 of s videos of videos $116_1$ to $116_N$ is multiplexed. The just mentioned tiles are filled by composer 104 in the compressed or coded domain, i.e. without transcoding. This may be done as described above with respect to FIGS. 1 to 13, i.e. by adopting the slices describing the videos of subset 121 almost as they are, i.e. at least with respect to prediction parameters and residual data, into the enhancement layer of data stream 120 so as to describe the aforementioned s tiles of the output pictures of the enhancement layer L1 of data stream 120, which are shown using continuous lines in FIG. 15a. Likewise composer 104 forms the base layer L0 of data stream 120, namely by remaining in the compressed or coded domain, so that prediction parameters and residual data, for example, is simply copied into the base layer L0 of data stream 120. Whenever a switching time instant T occurs, composer 104 inserts a multi-layered picture, namely an enhancement layer picture GRP with an associated base layer picture GRP' into data stream 20, among which at least the enhancement layer picture GRP is of the no-output type. In this GRP, the area or tile corresponding to the position of the newly-encompassed video, namely video 11 in the example of FIG. 15a, is synthetically filled. To this end, composer 104 copies into this tile the picture content of a reference picture of the newly encompassed video lying prior to the switching instant T and therefore not available although referenced by a picture of the newly encompassed video succeeding the switching time instant. The composer 104 inserts this GRP/GRP' pair into data stream 120 such that same is referenced by the just mentioned referencing picture of the newly encompassed video in favor of the original reference picture which is actually not comprised by data stream 120. Another GRP or GRP' pair or the remaining tiles of the same pair may be used by composer 104 in order to newly introduce/encompass further videos at the time instant T or spatially rearrange or change the association between continuously encompassed videos across time instant T on the one hand and the tiles of the enhancement layer L1 pictures on the other hand. In particular, to this end, composer 104 uses temporal prediction in order to, in a translatory manner, shift tiles in pictures of the enhancement layer L1 of data stream 120, where these continuously encompassed videos were arranged at another association between videos and tiles so as to replace the latter L1 pictures in their role as reference picture for the continuously encompassed videos. The copying from the base layer is performed, as just outlined, via a detour using GRP': the GRP' provides a copy of the collection of the videos at the base quality and the corresponding portion of the newly encompassed video is copied therefrom via inter-layer prediction in the GRP at the tile associated with the newly-encompassed video.

That is, according to the just-outlined alternative, composer 104 composes the video stream 120 representing the composition of the proper subset 121 of the videos 116 at the enhanced quality so that the video stream 120 is a multi-layered video stream, wherein the composer forms one or more base layers L0 of the multi-layered video stream by copying from the first portion $114_1$ of the coded version 112 of the video content 114, and one or more enhancement layers L1 of the multi-layered video stream by copying a fraction of the second portion $114_2$ of the coded version 112 of the video content 114 which relates to the proper subset of the videos into the one or more enhancement layers L1. The composer 104 supports a change of the proper subset 121 at a predetermined time-instant so that the proper subset 121 newly encompasses a newly encompassed video or the videos 116 not encompassed by the proper subset 121 before the predetermined time instant. The composer 104 is able to perform the change of the proper subset in a flicker free manner, i.e. without picture loss or without blank portions occurring in the composition due to any missing picture content of the newly encompassed video. This is achieved by the composer 104 in accordance with the alternative according to FIG. 14 by substituting reference pictures of the newly encompassed video such as P1 by a no-output picture, namely ones which fulfill two criteria: 1) the respective reference picture is not comprised by the fraction of the second portion of the coded version copied into the one or more enhancement layers (L1). This is true for P1 as it lies prior to the switching time instant T1 in coding order so that it is not transferred in the data stream by the copy former. 2) Secondly, the respective reference picture is one referenced, via motion prediction, by any picture of the newly encompassed video comprised by the fraction of the second portion of the coded version copied into the one or more enhancement layers (L1). This is true for P1 as same is referenced by RASL2, for instance, which in turn lies downstream the switching time instant in coding order and is thus inserted into the data stream by the copy former. The substitution is performed by inserting the no-output pictures into the multi-layered video stream, redirecting the temporal prediction of the referencing pictures, i.e. here RASL2, so as to reference the no-output pictures and fill the no-output pictures with an approximation of the reference pictures, via inter-layer prediction, on the basis of the base layer.

Before describing another embodiment for the functionality of the composer 104 of FIG. 14, it should be noted that contrary to the description brought forward with respect to the apparatus 100 of FIG. 14 so far, according to which it has been suggested that composer 104 conveys within the base layer of the multi-layered output data stream 120 constantly a collection of the complete set of all N videos, at base quality, this does need to be the case. For example, the content of the N videos 116 may be encoded in the pictures of the base layer at base quality in units of tiles and composer 104 may be configured so that this collection conveyed via the base layer contains, in any case, the tiles representing base quality representations of those videos which are liable to be newly encompassed by the proper subset 121, such as the immediately neighboring videos of the videos currently contained in proper subset 121 in accordance with the panoramic view example just outlined, wherein the collection also contains, in any case, the base quality pictures of those videos currently within the proper subset 121 in case of the videos 116 being encoded using inter-layer prediction into the corresponding portions 118 anyway.

Figure 16:
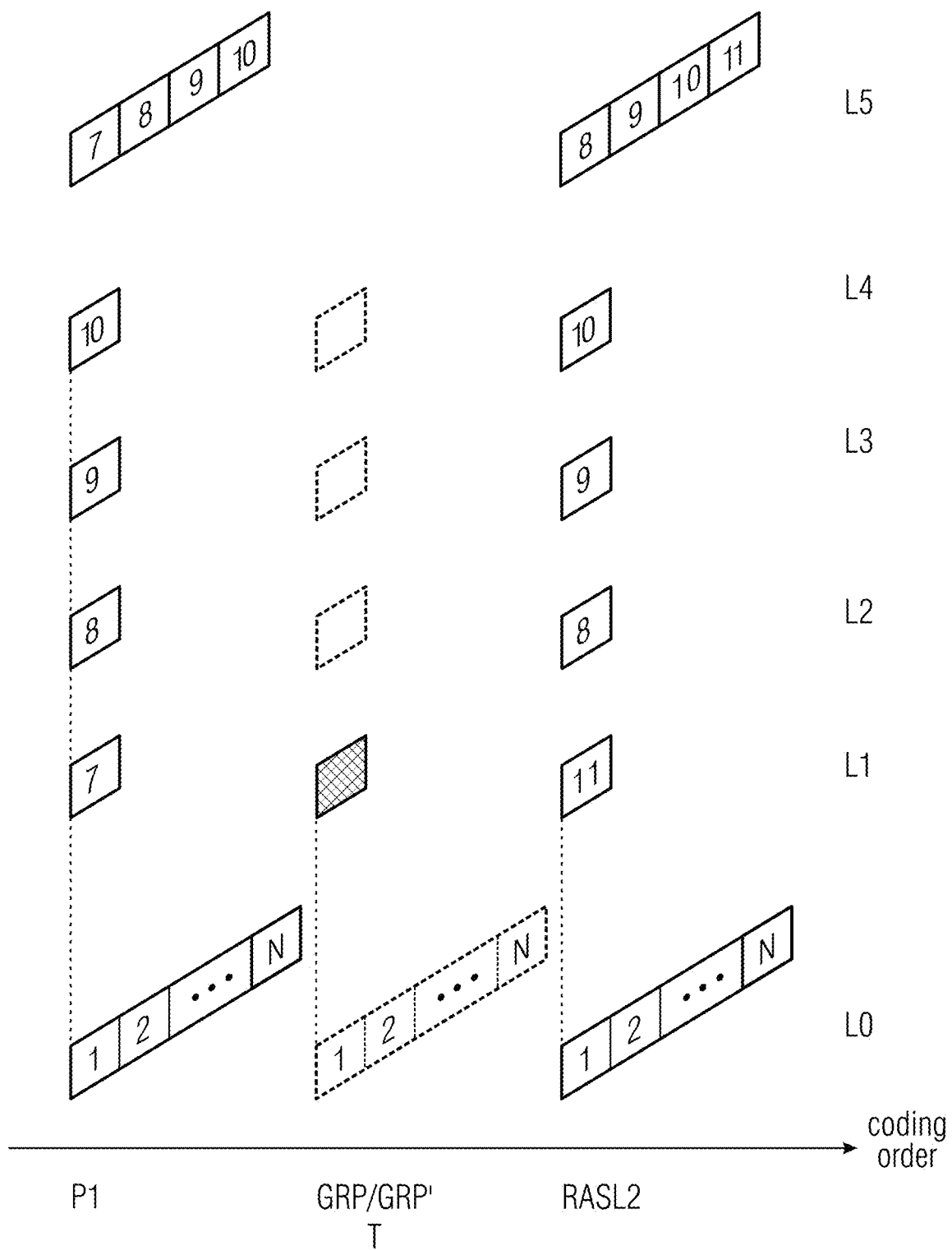

For the sake of completeness, FIG. 16 illustrates what the data stream 120 may look like if composer 104 uses another alternative to multiplex the proper subset 121 of videos into the data stream 120, namely into one enhancement layer L1 to L4 per video within the proper subset 121. At the switching time instant T, composer 104 inserts the just mentioned pair of GRP/GRP'. In particular, the association between videos of the proper subset 121 and the enhancement layers L1 to L4, i.e. the corresponding layer ID—of data stream 120 may, for instance, be selected by composer 104 such that same remains the same for these videos, i.e. is maintained across time instant T as far as the videos are concerned which are member of set 121 before and after T. The newly encompassed video, namely 11 in the example of FIG. 16, kicks off another video so as to be associated with the remaining enhancement layer L1. That is, while prior to time instant T, video 7 was assigned to layer L1, it is video 11 after time instant T. For each missing reference picture of video 11, a GRP picture is inserted into layer L1 by composer 104. This GRP picture is shown cross-hatched in FIG. 16 and is filled by composer 104 via inter-layer prediction, namely by inserting into the base layer L0 a GRP' picture which in turn copies an approximation of the content of the reference picture which the GRP picture in layer L1 replaces by way of temporal prediction. The copying to the GRP' picture is done using a constant motion vector field of zero vectors, and the inter-layer prediction is controlled via respective offset parameters between layers L0 and L1 so as to copy, via inter-layer prediction, the lower resolution content of the substituted reference picture into the GRP picture using upsampling, for example. Composer 104 may also insert GRP pictures into layers L2 to L4 and may let all of these GRP pictures in layers L1 to L4 replace the respective actual reference pictures of the videos associated with layers L1 to L4 after the time instant T, namely videos 8 to 11, but the insertion of the GRP pictures in layers L2 and L4 may be left off, leaving the reference pictures in these layers as they are according to the original coded version 12. The actual composition is then achieved by composer 104 by adding a layer L5 to data stream 120 with the pictures in layer L5 having encoded thereinto the actual composition of a proper subset 121 of videos at the enhanced quality using inter-layer prediction from layers L1 to L4 carrying the videos comprised by the proper subset 121. To this end, composer 104 may adjust in the data stream 120 respective offset parameters adjusting the spatial offset and relative scaling between layer L5 on the one hand and layers L1 to L4, respectively, on the other hand.

Alternatively, instead of using the alternative 28 of FIG. 1 for the composition in the additional layer L5, composer 104 may use the alternative 30 of FIG. 1, while accordingly performing the actual composition in the highest layer among those layers carrying the videos within the proper subset 121.

It has not been especially noted above, but the switching time instant T in the FIG. 14-16 was one where despite diverging presentation time order and coding order of the pictures of the newly-encompassed video, the switching instant T was one where the association of each picture of the newly-encompassed video to either the portion of the newly-encompassed video preceding the switching instant T and, thus, not copied, in the compressed or coded domain, into the data stream 120 or the portion of the newly-encompassed video succeeding the switching instant T and, thus, copied into the data stream 120 is equal with respect to both coding order as well as presentation time order. The apparatus 100 may, for instance, be configured to process an inbound request for a change in subset 121 stemming, for example, from an operator or some external entity or the like, in such a manner that this request is scheduled to take place at, i.e. postponed until, a next point in time where such circumstance occurs. The apparatus 100 may even be configured to process an inbound request for a change in subset 121 in such a manner that this request is scheduled to take place at, i.e. postponed until, a next point in time where not only any deviation, if present, between presentation time order and coding order does not lead any picture preceding and succeeding the respective point in time depending on the order type, but where also a non-temporally coded picture immediately succeeds, in coding order, the time instant as it is the case for time instant T in FIG. 15a for picture CRA2. However, another switching instant may alternatively be chosen. In the latter case, the portion of the newly-encompassed video succeeding the switching instant T and, thus, copied into the data stream 120 may be chosen using coding order or presentation order. If the coding order is chosen, the portion of the newly-encompassed video succeeding, in coding order, the switching instant T and, thus, copied into the data stream 120 extends over a contiguous portion of the coded version pertaining the newly-encompassed video. That is, in accordance with the above embodiments, the copy former merely once per subset change switches to the newly encompassed video.

Figure 15B:
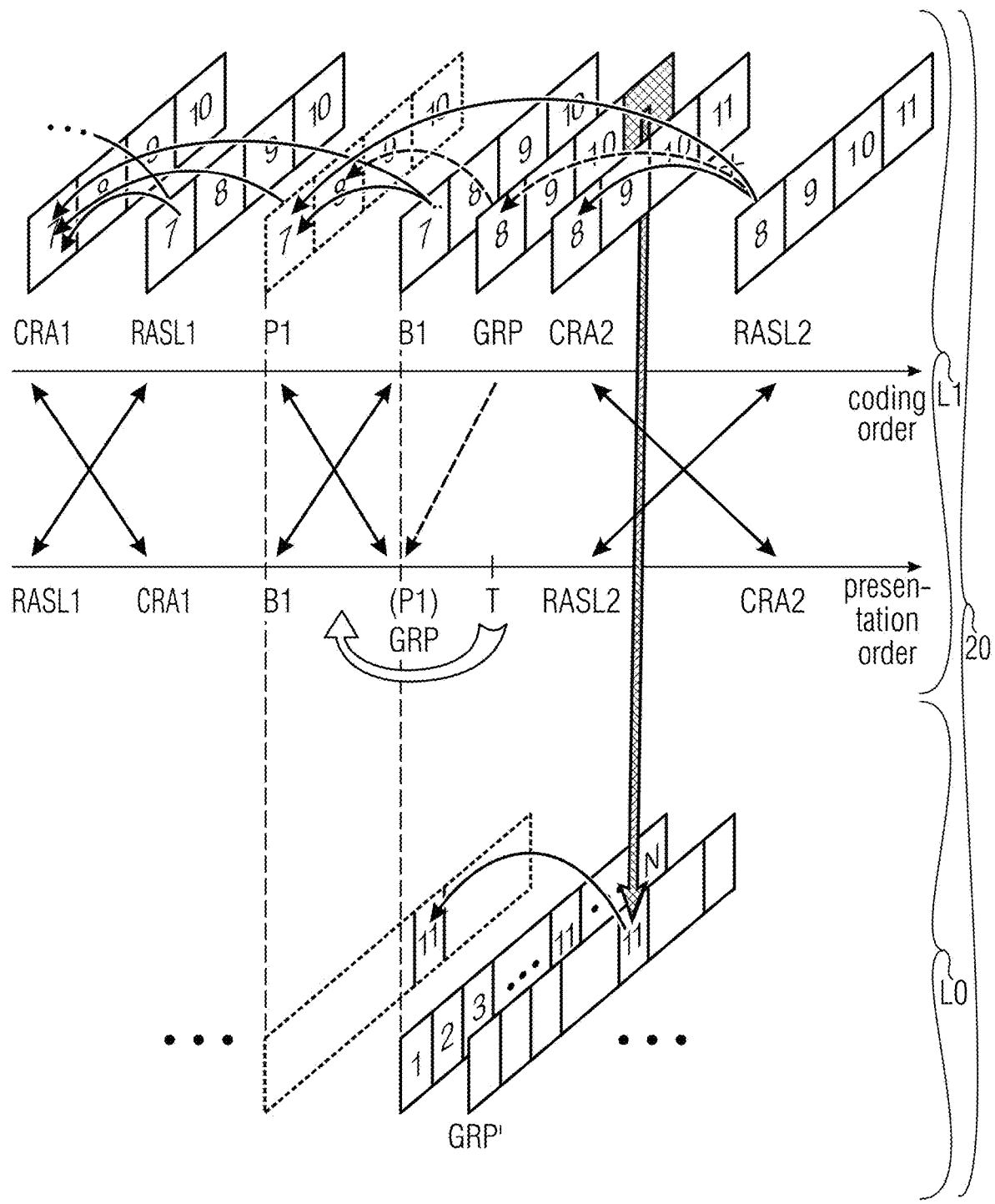
FIG. 15b shows a schematic diagram illustrating the structure of the multi-layered video data stream generated by the apparatus of FIG. 14 in accordance with an embodiment modified compared to FIG. 15a so as to amend the switching time instant to occur earlier.

In case of FIGS. 15a and 16 the picture which has been substituted using the GRP has been P1, i.e. a picture being, in presentation order, one immediately preceding the switching instant T, i.e. the, in presentation order, last one preceding the switching time instant T. The substitution concerned the reference picture role for further pictures contained in the copied portion, namely RASL2 in FIG. 15a, for example. Alternatively, the substitution could be done, however, in terms of output and reference picture role: The replaced picture P1 could be, by composer 104 marked in data stream 120 as non-output picture. Picture GRP/GRP' is inserted marked as an output picture instead so as to substitute the content of picture P1 in play-out at the erstwhile presentation time instant of P1. GRP would also by referred to by RASL2 instead of P1. The fact of substituting P1 in terms of its role as reference picture for pictures subsequent to T and in terms of output is illustrated in FIG. 15b which shows GRP/GRP' in continuous lines and P1 in dashed lines contrary to FIG. 15a—with associating GRP/GRP' the erstwhile presentation time of P1. In the same manner, FIG. 16 could have been modified. By this measure, the effective switching time instant would effectively pre-shifted as illustrated by the curved arrow in FIG. 15b. The overhead in terms of insertion and coding remains substantially the same. I.e., the replacement picture GRP would be no no-output picture. Rather, it would an output picture. The replaced/referenced picture P1, i.e. the one referenced by RASL2, would be marked as no-output picture, i.e. picture to be skipped in reproduction, instead. The latter would serve as reference picture for pictures between P1 and T in terms of presentation time order, namely B1 in FIGS. 15a and 16. It should be mentioned that more than one picture could be treated like P1/GRP per time instant T in the manner depicted in FIG. 15b, thereby pre-shifting T by more than one picture time instant. Depending in the GOP structure of videos 116 there may even be one or more no-output replacement picture and one or more output replacement pictures per switching instance T.

Up to now, the functionality of the composer 104 has been described as filling areas in no-output pictures inserted into the output data stream 120, substitute and/or rearrange reference pictures before the switching time instant T using inter-layer prediction on the basis of the base layer. An alternative consists, however, in the composer 104 replacing each portion or picture of the newly encompassed video referencing, via temporal prediction, a reference picture of the newly encompassed video preceding the predetermined time instant, namely again by coding such a portion using inter-layer prediction from the base layer. For example, in FIG. 15a, instead of approximating the cross-hatched areas of a GRP picture of layer L1, composer 104 could directly approximate the content of the tiles corresponding to video 11 in picture RASL2 of layer L1, i.e. the picture of the newly encompassed video which would have, if filled by copying from the respective video 11 in the coded version 12, referenced the reference picture which the GRP is to replace. Accordingly, in a similar manner composer 104 could even leave off the insertion of any GRP/GRP' pair in FIG. 16, filling/approximating the picture content of video 11 in layer L1, namely the RASL2 picture thereof, directly on the basis of the base layer using inter-layer prediction.

That is, according to the second alternative, composer 104 composes the video stream 120 representing the composition of the proper subset 121 of the videos 116 at the enhanced quality so that the video stream 120 is—or in form of or as—a multi-layered video stream, wherein the composer forms one or more base layers L0 of the multi-layered video stream by copying from the first portion $114_1$ of the coded version 112 of the video content 114, and one or more enhancement layers L1 of the multi-layered video stream by copying a fraction of the second portion $114_2$ of the coded version 112 of the video content 114 which relates to the proper subset of the videos into the one or more enhancement layers L1. The composer 104 supports a change of the proper subset 121 at a predetermined time-instant so that the proper subset 121 newly encompasses a newly encompassed video or the videos 116 not encompassed by the proper subset 121 before the predetermined time instant. The composer 104 is able to perform the change of the proper subset in a flicker free manner, i.e. without picture loss or without blank portions occurring in the composition due to any missing picture content of the newly encompassed video. This is achieved by the composer 104 in accordance with the second alternative by replacing portions of the newly encompassed video for which the following holds true: 1) they are comprised by the fraction of the second portion of the coded version so as to be copied into the one or more enhancement layers (L1). This is true for RASL2. And 2), they reference, via temporal prediction, reference pictures of the newly encompassed video not comprised by the fraction of the second portion of the coded version copied into the one or more enhancement layers (L1). This is also true for RASL2 which references P1 which, in turn, is absent in the data stream 120 as it is not copied by copy former since it is prior to the switching instant T in coding order. The replacement may be performed on the fly, i.e. the copy former may actually not perform the copying of these portions with the synthesizer replacing same afterwards. Rather, the replacement and the non-copying may go hand in hand so that the copy former skips the copying for these portions beforehand. The replacement is done by replacing the portions just-outlined by an approximation of the replaced portions obtained, via inter-layer prediction, from the base layer as described above.

Although not specified further above, the switching at T may be triggered by user input such as, for example, during the user playing a computer game or the like.

Figure 17:
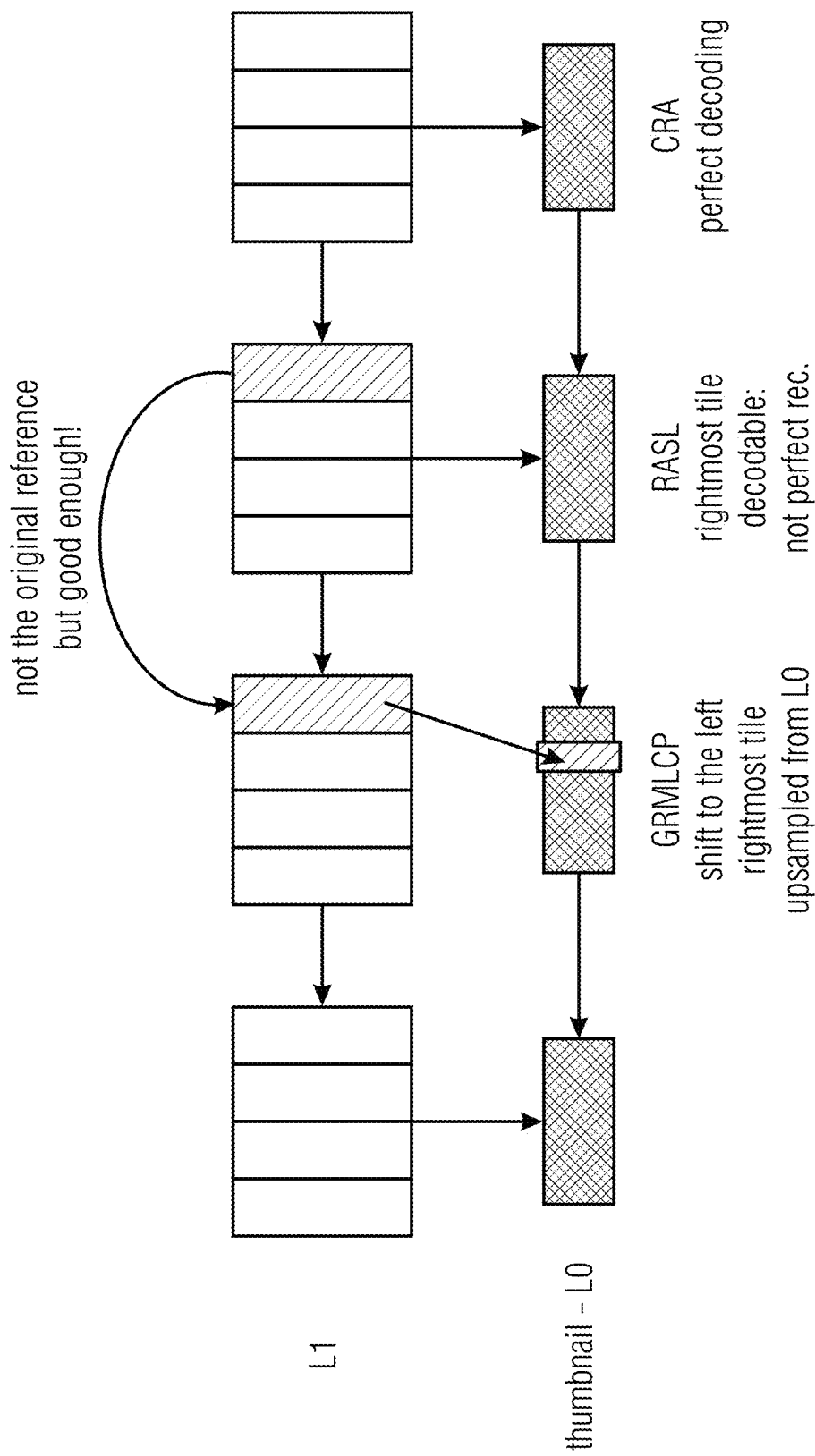
FIG. 17 shows a schematic diagram illustrating the GRM-LCP concept illustrated in FIG. 15a when applied to an open GOP structure in connection with tile based panorama streaming.

Thus, after having described embodiments of the second aspect with respect to FIGS. 14 to 16, the advantages are again described with respect to FIG. 17, which thus illustrates a solution for the problem outlined previously with respect to FIG. 13. In particular, applying the concept of FIG. 14, FIG. 17 suggests that direct copy slices are used in combination with GRP to form a multi-layer generated reference picture (MLGRP). This means that MLGRP would consist of several tiles which contain the GRP information, i.e. movement information to compensate the RoI switching event (screen movement). For those tiles whose information would only consist of samples resulting from a border extension procedure applied to the source picture, instead of using the GRP content, an MLGRP slice would be included which consists of a copy or reference to a lower layer (e.g. thumbnail) that would inherit the sample values from the correct region of this lower layer. This region would probably not only correspond to a copy of the samples but might entail a re-sampling process defined by the scaled reference layer offsets and referenced region offsets defined in, for example, the PPS of data stream 120. The resulting L1 MLGRP picture area could be used as a reference by the RASL picture. Depending on the quality of the MLGRP used as reference by the RASL picture, no noticeable or only minor decoding drift lasting until the next intra coded picture may occur, despite significant coding efficiency gains.

MLGRPs are inserted into the bitstream only at RoI switching events and only for reference by following pictures, i.e. MLGRP are not output by the decoder.

As far as MLGRP bitstream constraints and properties are concerned, the following notes may be made.

MLGRP are SHVC EL pictures that are composited from input bitstream EL pictures and/or direct copy slices. Copy slices in that context mean slices that (fully or partially) copy (and potentially resample) picture content of lower layers at the same time instant via means of inter-layer-prediction from source pictures of lower layers.

The slices contained in the MLGRP may not be used as reference to perform temporal motion vector prediction (TMVP). Furthermore, the input EL picture slices may need to fulfill stitching constraints as described in the following. The following is a short summary of the constraints for HEVC coded bitstreams as detailed in [4] but apply to the multi-layer case analogously: 1) MV Constraints: MVs should not point to samples outside the picture borders or sub-pel sample positions, for which the encoder-side invoked sub-pel interpolation filter kernel overlaps with the picture borders. 2) Prediction Units: The rightmost prediction units within a picture shall not use the MV prediction candidate that corresponds to a TMVP candidate or the spatial MV candidate at the position of a non-existent TMVP candidate. 3) In-loop filters: Slice segment and tile borders (if present) shall not be crossed by in-loop filters such as the deblocking and SAO filter. 4) If in-loop filters across slices and tiles are desired and activated, the MV constraints in 1 should be further constrained so that MVs do not point to samples outside the picture borders or sample positions that are affected by the in-loop filter across slices or sub-pel sample positions, for which the encoder-side invoked sub-pel interpolation filter kernel overlaps with the picture borders or samples that are affected by in-loop filter across slices.

The insertion of PPSs for the MLGRP and its references at the time of RoI switching (or tune-in or speaker change) with appropriate scaled reference layer offset and reference region offset parameters may be a further characteristic of MLGRP bitstreams. The parameters may reflect the current tile layout, layer hierarchy and picture dimensions.

A valuable piece of information to be signaled within the bitstream, e.g. as SEI message, is a notification of the insertion of MLGRP. This information can then be used by advanced decoders to increase post-decoding filter levels, e.g. to minimize the effect on visual quality.

Thus, summarizing the above, the description of FIGS. 14 to 17 showed that composing a video stream representing a composition of a time-varying subset of a plurality of videos is made possible without switching implications of the proper subset due to newly incorporated videos by multiplexing the proper subset of videos into one or more enhancement layers of the composed video stream 120 in the compressed or coded domain and accompanying the one or more enhancement layers with a base layer derived in the compressed or coded domain from a collection of the videos. The collection of the videos at the base quality in the base layer does not need to encompass all videos constantly. Rather, this collection may encompass videos at base quality liable to become members of the proper subset soon. A time variance of the collection of videos conveyed at the base layer of data stream 120 is easier to handle or in a more relaxed manner as "missing reference" problems similar to those occurring with respect to videos newly-encompassed by the proper subset described above, are of no concern with respect to the base layer as the base layer does not represent the actual video content of data stream 120 to be presented to the viewer. It suffices if the collection of videos shown by the base layer of data stream 120 has the approximation of the picture content of missing reference pictures of a newly encompassed video of proper subset 121 in the enhancement layer of data stream 120 at the time of said proper subset switching.

FIG. 14 shows that, optionally, data stream 120 may contain additional side information or signaling 180 added by composer 180 and indicating the contiguous portion of the panorama view currently covered by subset 121 in case of the video content 114 conveying such panorama view set. Then, each of the videos would be associated with a respective fraction of a panorama view. The fractions could be one-dimensionally distributed side by side as illustrated in the figures or two-dimensionally. The proper subset 121 encompasses videos associated with fractions the panorama view which neighbor each other so as to cover a contiguous portion of the panorama view which is displaced from before to after the predetermined time instant. Signaling 180 could indicate the location of the contiguous portion within the panorama view such as, for example, in units of the fractions of the panorama view, i.e. in units of the videos. Interestingly, the signaling 180 may be present in the data stream 120 in addition to offset parameters controlling the inter-layer prediction from the base layer such as the above-mentioned parameters p, $o^{TL}$ and $o^{BR}$. In case of the first portion $114_1$ of the coded version 120 having encoded thereinto the pictures of all videos $116_1 \ldots 116_N$ in a manner spatially stitched together so as to result in panorama pictures showing the whole panorama view the signaling 180 would redundantly, but more easily grant access to the location of the contiguous portion of the panorama view covered by subset 121. As outlined above, however, the first portion of the coded version of the video content may have encoded thereinto a time-varying collection of the videos $116_1$-$116_N$, i.e. a collection of base quality videos including a proper subset of all base layer videos and including, at least, the newly-encompassed video from a time onwards lying sufficiently ahead the predetermined time instant so as to contain the picture content of the referenced picture, as just-outlined, i.e. at least from the referenced picture onwards. In the latter case, the signaling 180 may become a prerequisite for gaining knowledge about the location of the contiguous portion of the panorama view.

As discussed above, composer 104 may use one or both of the above discussed alternatives of using the base layer reservoir, i.e. the collection/set of videos 116—as a means for coping with problems concerning newly encompassed videos: inserting multi-layered pictures into data stream 120, these multi-layered pictures having been called MLGRP in the above description, a base layer picture for copying, in base quality, a collection of videos at the time instant coinciding with the time instants of the reference picture to be substituted by the multi-layered no-output picture MLGRP, and an enhancement layer picture copying, by inter-layer prediction, this base quality approximation of the picture content of the reference picture of the newly encompassed video which is missing because it belongs to a presentation time instant prior to the switching time instant. Alternatively, pictures of newly encompassed video referencing reference pictures missing due to same belonging to a time instant prior to the switching time instant T, are replaced or synthesized by composer 104 by copying from the temporally aligned base layer picture video collection content via inter-layer prediction directly. Composer 104 may, for instance, use both concepts in a mixed manner. For example, see FIGS. 15 and 16. As explained above, the inserted no-output picture GRP shown cross-hatched in these figures has been construed on the basis of the base layer. By this measure, the RASL2 picture of video 11 is a reference basis for temporal prediction. Naturally, however, the picture content derived by the base layer for the cross-hatched picture is merely an approximated substitute for the actual reference picture. Accordingly, drift occurs as long as a chain of temporally predicted pictures of video 11 pass forward motion-compensated coded variants of the reference picture approximation. In that case, composer 104 may avoid too long chains of such temporal prediction forwarding by intermittently performing the reference picture substitution using an MLGRP or substituting the temporally predicted picture of the newly-encompassed video itself from time to time with respect to these temporally-predicted pictures of the newly compassed video. That is, the composer 104 may intermittently repeat the substitution and/or replacement with respect to temporally predicted pictures of the newly encompassed video depending, via a chain of temporal predictions, on any reference picture of the newly encompassed video not comprised by the fraction of the second portion of the coded version copied into the one or more enhancement layers L1. For example, for one or more referenced pictures of the newly encompassed video comprised by the fraction of the second portion of the coded version copied into the one or more enhancement layers (L1) and depending, via the chain of temporal prediction, on any of the reference pictures of the newly encompassed video not comprised by the fraction of the second portion of the coded version copied into the one or more enhancement layers (L1) further no-output pictures might be inserted into the multi-layered video stream with redirecting any temporal prediction by pictures of the newly encompassed video to the one or more referenced pictures so as to reference the further no-output pictures instead of the one or more referenced pictures and fill the further no-output pictures with an approximation of the one or more reference pictures, via inter-layer prediction, on the basis of the base layer. Alternatively, further portions of the newly encompassed video comprised by the fraction of the second portion of the coded version so as to be copied into the one or more enhancement layers (L1) which reference, via the chain of temporal prediction, reference pictures of the newly encompassed video not comprised by the fraction of the second portion of the coded version copied into the one or more enhancement layers (L1) may be directly replaced by an approximation of the replaced portions, via inter-layer prediction, from the base layer.

Before embodiments of a third aspect of the present application are described in the following, it is noted that the number of base layers may, other than the description of embodiments of FIGS. 14 to 17, be more than one. For example, the base quality representations of videos $116_1$ to $116_N$ may be conveyed within the base layer in separate layers, i.e. separate base layers, one for each video or at least one base layer for each video in the collection of videos currently conveyed in the base layer.

In accordance with the embodiments described further below, a composited video stream is generated so as to compose video content on the basis of one or more videos by providing a reservoir of the one or more videos in the output data stream and multiplexing the reservoir temporally in the data stream so as to form no output pictures of the data stream interspersed by output pictures which, via temporal prediction, form the video composition on the basis of the video content conveyed via the no-output pictures of the data stream, i.e. pictures marked as not to be output in playing-out the video by a decoder whilst being available for reference by subsequent pictures of the video stream. The problem here: in the case of using videos as a basis for the composition coded using a structure according to which the coded picture order deviates from the presentation time order, simply placing the compositing output pictures immediately after the no-output pictures forming the reservoir for the respective output picture leads to an increased demand on the buffer capacity of a decoder going to decode the composited video data stream as outlined in more detail below. This problem is solved by way of the subsequently explained embodiments.

The description of the embodiments of the third aspect starts again with a brief introduction to video bitstream insertion. The mixing of given video bitstreams in the compressed domain as described in [7] allows for low-effort compositing from multiple sources of compressed video without the need to do a full (or partial) decoding and encoding cycle, i.e. transcoding. There are numerous use cases where such a technique can be applied, e.g. for picture-in-picture applications, advertisement insertion or overlay of a graphical user interface or other useful information. Imagine a sports program where the actual sport scene, such as basketball, is overlaid with a news ticker on the top or bottom of the pictures of the video of the sports program. Using only lightweight syntax modification operations, the method in [7] mixes the n input video bitstreams into a common output video bitstream (spatially or temporally), while suppressing decoder output of the respective decoded picture content, and further adds so-called composition pictures (CPs) to the common output bitstream (intended for decoder output). The CPs use means of inter-picture prediction to create a composition from the pictures of the n input video bitstreams, i.e. the CPs' associated suppressed pictures. There are other methods entailing insertion of coded pictures into a given coded video bitstream for which the subsequently explained embodiments are relevant to minimize picture buffer requirements. However, in the following the method detailed in [7] is used as an example in order to describe the advantageous aspects of the embodiments described subsequently.

The common output bitstream understandably poses higher computational demands towards the targeted video decoder, which besides decoding of the video data introduced by the n input video streams has to provide additional computational resources to decode the CPs. As the level definitions of HEVC [1] (and any other video codec standard) are designed to serve a handful of common operation points (picture resolution, frame rate, bit rate, picture buffer memory), it is crucial to minimize any increase in computational complexity that the described method might impose on a video decoder.

The complexity burden to be addressed by the embodiments described subsequently is the increase in picture buffer memory demand that is caused by storing the composition pictures in the decoder. The idea behind the subsequently described embodiments is to insert the composition or output pictures into the common output bitstream in output order regardless of the coded picture order (or bitstream order or prediction structure) of the input bitstream, which in turn is multiplexed into no-output pictures of the common output bitstream. Such positioning of the composition pictures reduces the additional picture memory used holding the composition before they can be output on decoder side.

Figure 18:
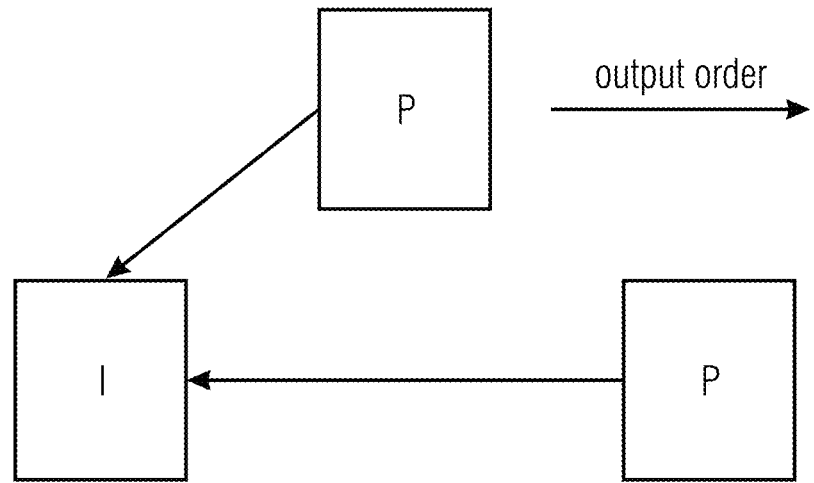
FIG. 18 shows a schematic diagram exemplifying a low delay prediction structure.

As an example, take the prediction structure shown in FIG. 18. Here, two uni-predictive (P-) frames predict information only using pictures preceding in output order, i.e. an intra coded (I-) frame, thus allowing a coding order that is similar to the decoder output order and without the need to keep pictures in the picture buffer memory for later output (after decoding and outputting pictures following in bitstream order).

Figure 19:
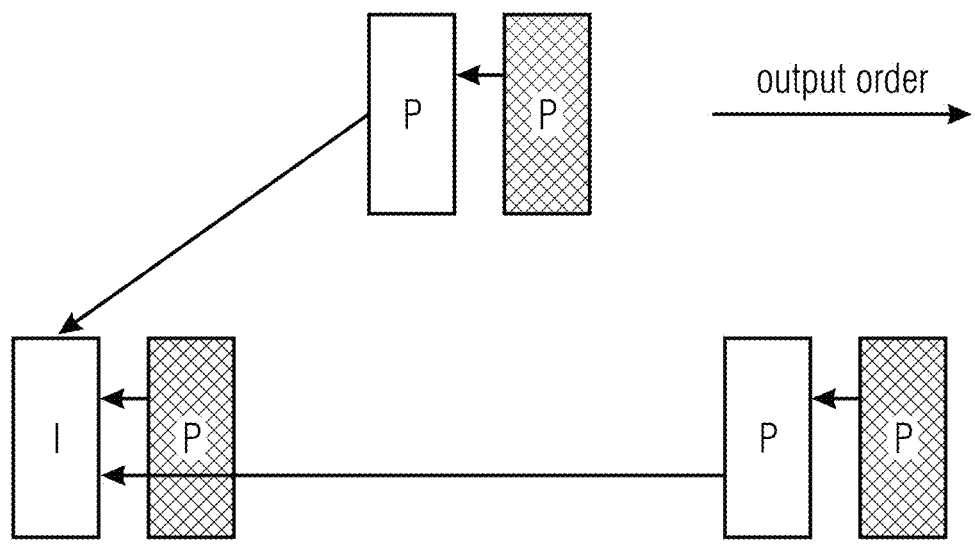
FIG. 19 shows a schematic diagram illustrating a resulting bitstream after insertion of CPs.

When such a coding structure is used in the n input bitstreams of the above described mixing method, the insertion of CPs right after the associated suppressed pictures allows CPs to be output right after decoding, i.e. only a single additional picture buffer is used compared to the bitstream containing only the n input bitstreams. The resulting bitstream using only a single (n=1) input bitstream is shown in FIG. 19, where the dashed boxes represent the CPs (to be output), while the (non-dashed) input bitstream pictures (not to be output) are to be suppressed from output by a video decoder.

Figure 20:
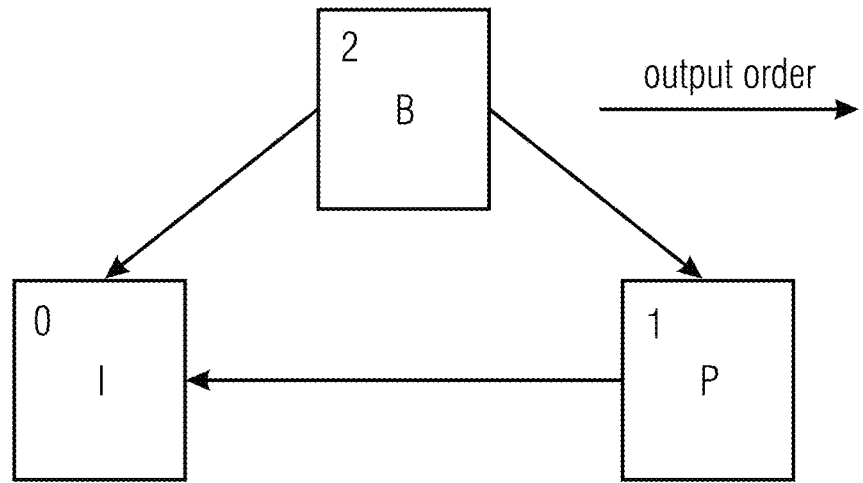
FIG. 20 shows a schematic diagram illustrating a prediction structure with hierarchical bi-predictive B-frames.

As the decoding structure becomes more complex to increase general coding efficiency, e.g. through bi-predictive (B-) frames, coding order and output order may be different, thereby using more picture buffers to store pictures to be used as reference before output as shown in FIG. 20, which indicates coding order as the number in the upper left corner of each box.

Figure 21:
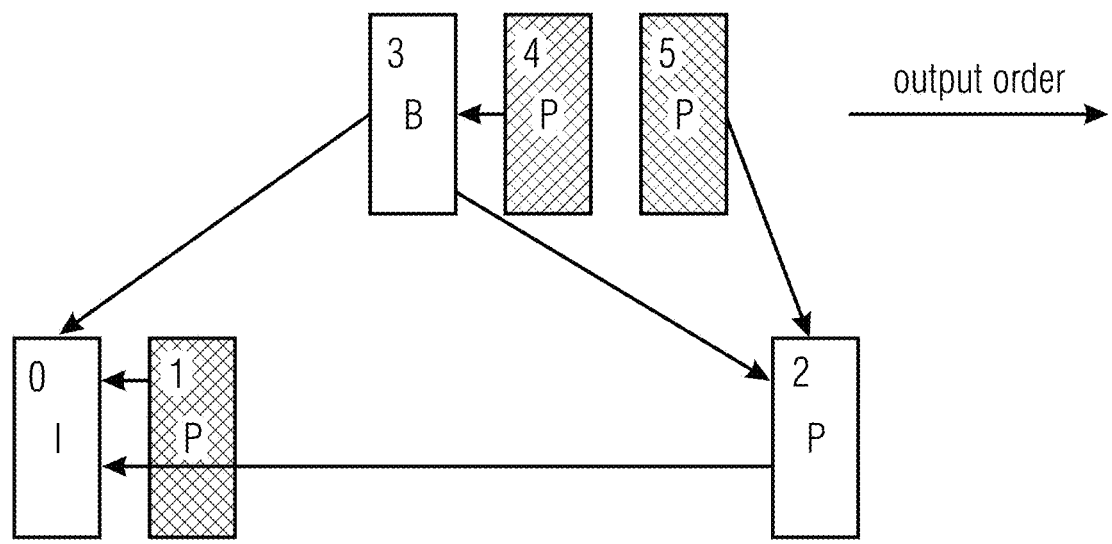
FIG. 21 shows a schematic diagram illustrating CP insertion with reduced picture buffer increase.

Thus, adding CPs to such a bitstream in the same fashion as before (right after their associated suppressed pictures in the bitstream used for composition) forces a video decoder to store some of the CPs before output albeit the CPs are not used as reference for other pictures. To avoid this drawback, the subsequently explained embodiments are constructed to insert these pictures in a fashion that reduce the increase of the picture buffer demands compared to the n mixed input video bitstreams. This can be achieved by adding the CPs in output order to the bitstream regardless of the prediction structure of the input bitstreams. FIG. 21 shows the resulting common output video bitstream where the single (n=1) input video bitstream uses a hierarchical bi-predictive prediction structure.

Figure 22:
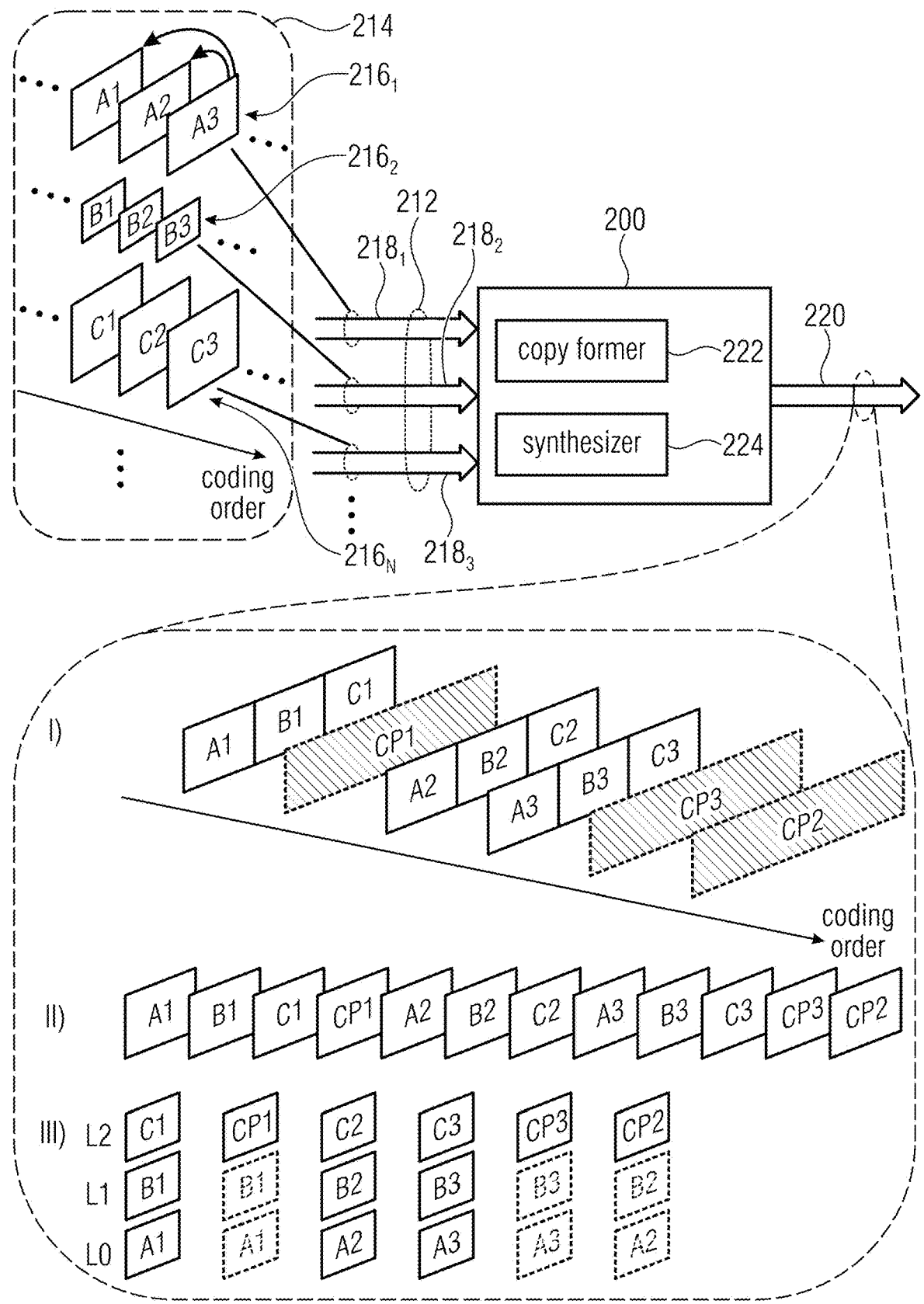
FIG. 22 shows a block diagram of a video streaming apparatus using insertion of output pictures into a non-output portion reservoir of the composited video stream obtained from copying portions of video content having coded thereinto one or more videos with a coding order deviating from a presentation time order, the insertion of the output pictures taking place such that same are ordered in accordance with a presentation time order.
Figure 23:
FIG. 23 shows an example for a composition of videos in the form of one picture out of such composition videos.
Figure 24:
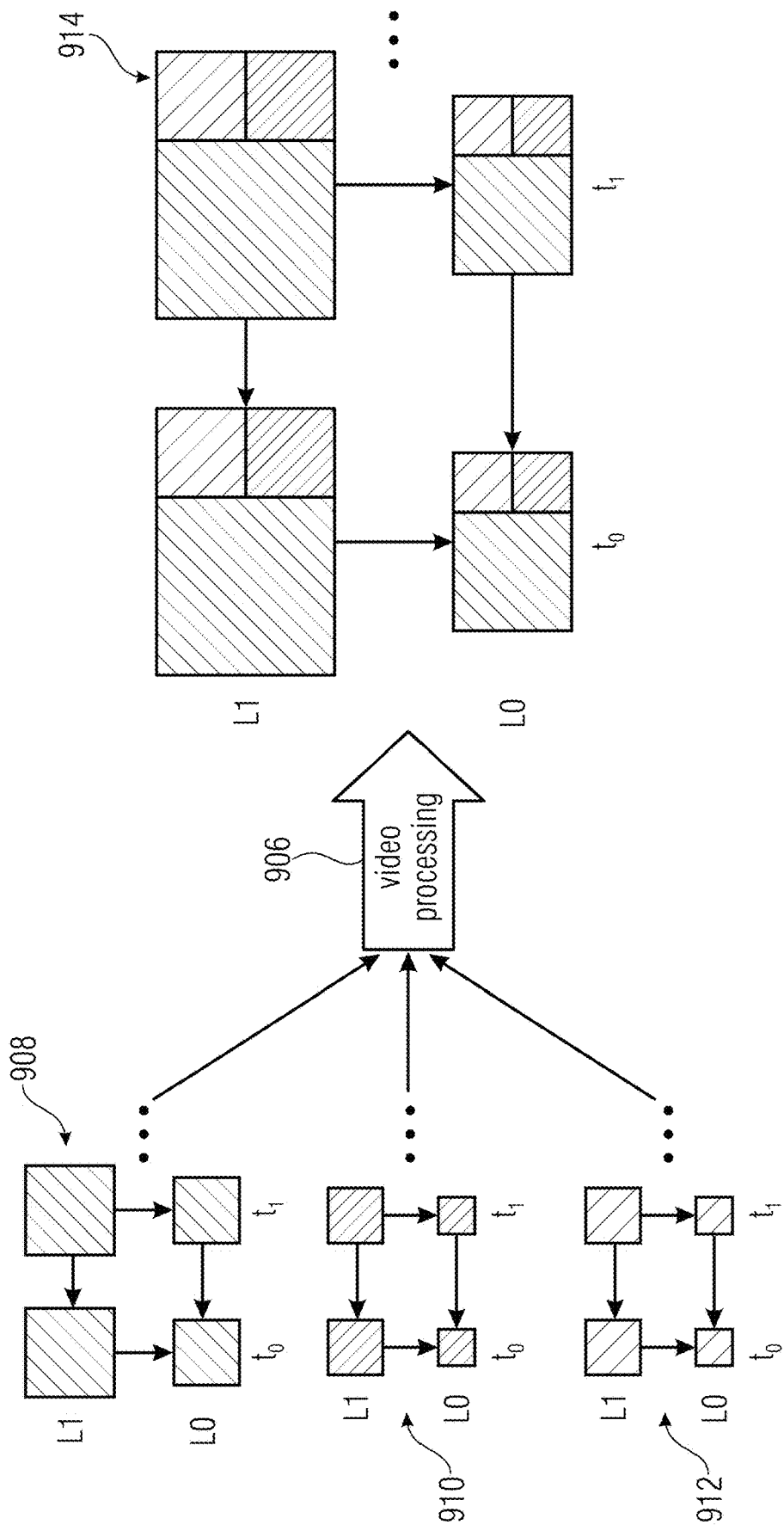
FIG. 24 shows a schematic diagram illustrating a bitstream stitching for three input streams with two layers in the compressed domain as in [3]

FIG. 22 shows a video streaming apparatus 200 construed in accordance with the third aspect of the present application in a situation where the apparatus 200 receives a coded version 212 of a video content 214 encompassing at least one video $216_1, 216_2 \ldots 216_{N, \text{ with } N=}3$ exemplarily chosen in FIG. 22. The coded version 212 comprises, for each video $216_i$, a respective portion $218_i$ into which the respective video $216_i$ is coded using temporal prediction. The temporal prediction dependencies among the pictures of videos $216_i$ are illustrated in FIG. 22 again using curved errors pointing from the reference sink, i.e. the picture currently coded using temporal prediction, to reference source or reference picture from which the just mentioned temporally predictively coded picture is predicted. The coding order arrow in FIG. 22 indicates that the pictures of videos $216_1$ to $216_3$ are shown in their sequential coding order, which however deviates from the presentation time order of the pictures, this being true for each video $216_i$. In particular, FIG. 22 illustrates a temporal interval out of videos $216_i$ encompassing three pictures. In FIG. 22, pictures of video $216_1$ are indicated using A. Pictures of video $216_2$ are indicated using B and pictures of video $216_3$ are indicated using C. The digit immediately following the capital letter shall distinguish the three pictures within the exemplarily shown temporal interval out of each video $216_i$. In coding order, the pictures follow each other in accordance with a digit, e.g. A1, A2, A3. In presentation time order, the order among these pictures differs: in accordance with the presentation time order picture A3 is located between pictures A1 and A2. FIG. 22 exemplarily assumes that all videos $216_i$ have the same temporal interdependency structure and accordingly the just mentioned difference between coding order and presentation order of the pictures is true for all videos $216_i$. It should be additionally noted that the advantageous aspects of the apparatus 200 of FIG. 22 would also be effective if the number of videos $216_i$, i.e. N, in the video content 214 would be merely 1. In general, N may be any number. The just mentioned GOP structure, which the videos $216_i$ are using may be an open or a closed GOP structure. The portions $218_i$ may, similar to the description of the embodiments described above with respect to FIGS. 1 and 14, be individual data streams together forming coded version 212. For the ease of explanation, the videos $216_i$ are shown as single-layered videos, but multi-layered videos or a mixture of single-layered and multi-layered videos would be feasible as well.

Internally, video streaming apparatus 200 comprises a copy former 222 and a synthesizer 224. Regarding implementation possibilities, the statements made above with respect to FIG. 1 hold true. That is, apparatus 200 may be implemented using hardware, programmable hardware or software with modules 222 and 224 being implemented accordingly.

The video streaming apparatus is configured to compose a video stream 220 out of the coded version 212 and to this end copy former 222 forms a non-output portion of data stream 220 while synthesizer 224 synthesizes the actual composition of the video content 214 by inserting output pictures into data stream 220 derived, at least partially, via temporal prediction from the non-output portion. In doing so, the video streaming apparatus 200 acts as motivated with respect to FIGS. 18 to 21, i.e. the output pictures are inserted into the data stream 220 so that the output pictures are arranged in the data stream 220 in presentation time order.

FIG. 22 illustrates three alternatives of the cooperation between copy former 220 and synthesizer 224. It should be clear, however, that even these three alternatives illustrated in FIG. 22 and distinguished in FIG. 22 using roman numbers I to III merely form a subset of the possibilities how the advantageous concept underlying the apparatus 200 of FIG. 22 may be embodied.

In accordance with all alternatives shown in FIG. 22, access units or pictures of data stream 220 being of the type non-output, i.e. being part of the non-output portion of data stream 220, are those which contain the picture content indicated using A1 to C3 in continuous lines. The no-output pictures stemming from synthesizer 224, i.e. being inserted into data stream 220 interspersed between the non-output pictures of the non-output portion of the data stream 220, are indicated using a "CP #" and sometimes the inserted output pictures are multi-layered output pictures comprising, in subordinated or lower layers, copy pictures which, via temporal prediction, copy any of the no-output pictures with the circumstance being illustrated using the copied pictural portion indicated using A1 to B3 in dotted lines. In the alternatives I to III shown in FIG. 22 as a possibility for construing data stream 220, the pictures of data stream 220 are sequentially ordered along the coding order, again as illustrated using a respective arrow entitled "coding order".

In accordance with the alternative I, the copy former 222 forms the non-output portion of data stream 220, i.e. the non-output pictures of data stream 220, in a manner similar to the formation of the enhancement layer of the multi-layered output data stream shown in FIG. 15a, namely by multiplexing the videos $216_i$ onto respective tiles into which the pictures of data stream 220 are spatially subdivided. That is, in accordance with alternative I, the pictures of data stream 220 are, for instance, spatially subdivided into N tiles, each tile being associated with a respective one of the N videos $216_1$ to $216_N$, with N=3 being exemplarily chosen and illustrated in FIG. 22. Owing to the tile subdivision, the coding order traverses the pictures of data stream 220 tile-wise and accordingly, owing to the 1:1 association between tiles and videos, video-wise. Accordingly, copy former 222 is able to fill the tiles of the non-output pictures in the compressed or coded domain. Details in this regard were presented above with respect to FIGS. 1 and 14, for instance, which details shall be valid for copy former 222 as well. Within data stream 220, the pictures thus filled by the picture content of the pictures of videos $216_i$ are indicated as being not to be output.

The synthesizer 224 is, in accordance with the alternative I, responsible for interspersing between these spatially stitched non-output pictures, i.e. the pictures being composed by spatially stitching the picture content of the pictures of the input videos $216_i$, output pictures. These output pictures synthesize the actual composition of the video content to be conveyed via output data stream 220. To this end, synthesizer 224 codes these output pictures at least partially by use of temporal prediction from the non-output pictures. In accordance with the embodiments shown in FIG. 22, each output picture CP # exclusively uses one of the non-output pictures as a temporal reference picture basis. Accordingly, the digit after "CP" in FIG. 22 shall note the non-output picture from which the pictural content of the respective output picture CP # is at least partially construed or synthesized using temporal prediction, namely from the non-output picture containing pictural content A #, B # and C #. The synthesizer 224 may thus code picture or output picture CP1, for instance, using blocks among which all or a contiguous cluster thereof translatory copies a respective portion of non-output pictures A1 to C1. Other blocks of picture CP1 may be coded by synthesizer 224 using intra-prediction, for instance, or without prediction. In order to save bitrate, some of the blocks may be coded using skip mode, thereby adopting the motion vector for temporal prediction from a spatially neighboring block, without the need to code any residual data. This is also described with respect to the embodiments of the other two aspects and is also true for these embodiments of the other two aspects. In this manner, synthesizer 224 also inserts output pictures CP2 and CP3 into data stream 220. The order among these output pictures is, however, chosen to follow the presentation time order, i.e. the output pictures are sequentially ordered in data stream 220 according to CP1, CP3 and CP2. These pictures are inserted into data stream 220 in such a manner that the respective referenced non-output picture x of output picture CPx precedes the respective output picture CPx in accordance with a coding order in a data stream 220. This is depicted in FIG. 22.

The other two alternatives shown in FIG. 22 reveal that copy former 220 may multiplex the videos $216_i$ into the non-output portion of data stream 220 in a manner different than multiplexing these videos onto spatially neighboring tiles of the non-output pictures. For example, the copy former 220 could use temporal multiplexing instead. In accordance with alternative II, for instance, copy former 220 multiplexes the pictures of the input videos into data stream 220 according to A1, B1, C1, A2, B2, C3, A3, B3, C3 . . . . That is, the pictures of the N inbound videos are copied into a sequence of non-output pictures of data stream 220 and then sequentially distributing the next pictures of the inbound videos in coding order onto a subsequent subsequence of non-output pictures of data stream 220, with the subsequences thus filled by copy former 220 not being interleaved. However, copy former 222 takes care that, in multiplexing the pictures of the inbound videos onto the non-output pictures of data stream 222, the temporal prediction inter-dependencies among the pictures of each video are maintained. The copy former 222 may perform the filling of the non-output pictures in the compressed or coded domain. The synthesizer inserts the output pictures in between the just mentioned subsequences of non-output pictures belonging to one access unit or picture count, i.e. any of {A1, B1, C1}, {A2, B2, C2} and {A3, B3, C3}. The insertion and the construction is done as in alternative I: that is, the insertion is done such that the output pictures are sequentially ordered in data stream 220 according to the presentation time order, CP1 preceding CP3 preceding CP2. Further, each output picture follows, in coding order, within data stream 220, the respective subsequence of non-output pictures from which the respective output picture is, as far as temporal prediction is concerned, exclusively temporally predicted.

Alternative III illustrates that it would even be feasible for copy former 222 to multiplex the inbound videos $216_i$ onto different layers L0 to L2 of data stream 220, namely multilayered non-output pictures with synthesizer 224 inserting their between multi-layered output pictures. For example, layer L0 is associated with one of the videos, layer L1 with another video and so forth. In the non-highest layers of data stream 220, i.e. L0 and L1 in the embodiment of FIG. 22, the output multi-layered picture copy the content of the associated multi-layered non-output picture using temporal prediction (motion vectors of zero), while the highest layer, L2 in FIG. 22, carries within multi-layered output pictures the actual synthesized video composition, i.e. they carry the output pictures CP #. The latter are construed by synthesizer 224 using, for instance, both inter-layer prediction of the temporally predicted/copied content of the lower layers of the same multi-layered output picture and temporal prediction/copying from the associated multi-layered non-output picture. For instance, synthesizer 224 composes the composed video content in picture CP2 using temporal prediction/copying from lower layer pictures of the same multi-layered output picture, thereby inheriting pictural content of pictures B2 and A2, and using temporal prediction from the highest layer of multi-layered non-output picture concerning picture count 3, thereby inheriting pictural content of picture C2.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] Sullivan, Gary J., et al. "Overview of the high efficiency video coding (HEVC) standard." Circuits and Systems for Video Technology, IEEE Transactions on 22.12 (2012): 1649-1668.
[2] Sanchez, Y., et al. "Video Compositing", WO Patent App. PCT/EP2014/067757.
[3] Eleftheriadis, A., et al. "System and method for videoconferencing using scalable video coding and compositing scalable video conferencing servers." U.S. Pat. No. 8,436,889. 7 May 2013.
[4] Sanchez, Y., et al. "Low complexity cloud-video-mixing using HEVC." Consumer Communications and Networking Conference (CCNC), 2014 IEEE 11th. IEEE, 2014.
[5] Grunheit, C., et. al. "Efficient representation and interactive streaming of high-resolution panoramic views.", Image Processing. 2002. Proceedings. 2002 International Conference on. Vol. 3. IEEE, 2002.
[6] A. Fujibayashi, TK Tan (NTT DOCOMO), "Random access support for HEVC", JCTVC-D234, 4th JCT-VC Meeting, Daegu, January 2011.
[7] Skupin, R., et al. "Compressed Domain Video Compositing with HEVC", Picture Coding Symposium (PCS), 2015 IEEE 31th. IEEE, 2015.

The invention claimed is:

1. Apparatus for processing a video stream which comprises multiple layers and a signaling indicating predetermined multi-layered pictures of the video stream not using in a predetermined layer TMVP, the apparatus configured to
for at least one of further multi-layered pictures of the video stream other than the predetermined multi-layered pictures,
replace a picture of a predetermined layer of the at least one further multi-layered picture, by a picture of a lower layer of the at least one multi-layered picture, and
replace a picture of the predetermined layer also for one or more—in coding order—immediately subsequent further multi-layered pictures.

2. Apparatus according to claim 1, configured to
read, in addition to the signaling, a further signaling indicating for the at least one further multi-layered picture as to how far, measured in multi-layered pictures of the video stream in coding order, the next predetermined multi-layered picture is away, from a portion of the video stream representing the at least one further multi-layered picture, or upstream to said portion, and
use the further signaling to determine a number of the one or more immediately subsequent further multi-layered pictures.

3. Apparatus according to claim 1, configured to
compose a composed data stream out of the video stream, the composed data stream comprising the video stream, and
in the replacing, code portions of the composed data stream, associated with a picture to be replaced, by lower-to-higher copying using inter-layer prediction.

4. Apparatus according to claim 1, configured to
output a video represented by the predetermined layer.

5. Method for processing a video stream which comprises multiple layers and a signaling indicating predetermined multi-layered pictures of the video stream not using in a predetermined layer TMVP, the method comprising
for at least one of further multi-layered pictures of the video stream other than the predetermined multi-layered pictures,
replacing a picture of a predetermined layer of the at least one further multi-layered picture, by a picture of a lower layer of the at least one multi-layered picture, and
replacing a picture of the predetermined layer also for one or more—in coding order—immediately subsequent further multi-layered pictures.

6. Method according to claim 5, comprising
reading, in addition to the signaling, a further signaling indicating for the at least one further multi-layered picture as to how far, measured in multi-layered pictures of the video stream in coding order, the next predetermined multi-layered picture is away, from a portion of the video stream representing the at least one further multi-layered picture, or upstream to said portion, and
using the further signaling to determine a number of the one or more immediately subsequent further multi-layered pictures.

7. Method according to claim 5, comprising
composing a composed data stream out of the video stream, the composed data stream comprising the video stream, and
in the replacing, coding portions of the composed data stream, associated with a picture to be replaced, by lower-to-higher copying using inter-layer prediction.

8. A scalable video encoder configured to encode a video into a video stream in multiple layers, the scalable video encoder configured to
provide the video stream with a signaling indicating predetermined multi-layered pictures among multi-layered pictures of the video stream, which do not use in a predetermined layer TMVP (temporal motion vector prediction),
determine, for at least one of further predetermined multi-layered pictures of among the multi-layered pictures of the video stream, other than the predetermined multi-layered pictures of the video stream, as to how far, measured in the multi-layered pictures of the video stream in coding order, the next predetermined multi-layered picture of the video stream is away to obtain a distance, and
provide the video stream with, in addition to the signaling, a further signaling indicating for the at least one further multi-layered picture, the distance, wherein the scalable video encoder is configured to insert the further signaling into a portion of the video stream which represents the at least one further predetermined multi-layered picture, or upstream to said portion.

9. The scalable video encoder according to claim 8, the encoder configured to provide the video stream, in addition to the signaling and the further signaling, with an even further signaling indicating multi-layered pictures of the video stream coded using without motion-compensated temporal prediction.

10. A scalable video encoding method for encoding a video into a video stream in multiple layers, the scalable video encoding method comprising providing the video stream with a signaling indicating predetermined multi-layered pictures among multi-layered pictures of the video stream, which do not use in a predetermined layer TMVP (temporal motion vector prediction), determining, for at least one of further predetermined multi-layered pictures among multi-layered pictures of the video stream other than the predetermined multi-layered pictures of the video stream, as to how far, measured in the multi-layered pictures of the video stream in coding order, the next predetermined multi-layered picture of the video stream is away to obtain a distance, and providing the video stream with, in addition to the signaling, a further signaling indicating for the at least one further predetermined multi-layered picture, the distance, wherein the further signaling is inserted into a portion of the video stream which represents the at least one further predetermined multi-layered picture, or upstream to said portion.

* * * * *